US012517300B2

(12) United States Patent
Shih et al.

(10) Patent No.: US 12,517,300 B2
(45) Date of Patent: Jan. 6, 2026

(54) SEMICONDUCTOR PACKAGE COMPRISING OPTICALLY COUPLED IC CHIPS

(71) Applicant: Taiwan Semiconductor Manufacturing Company, Ltd., Hsinchu (TW)

(72) Inventors: Chih-Tsung Shih, Hsinchu (TW); Hau-Yan Lu, Hsinchu (TW); Wei-Kang Liu, Taichung (TW); Yingkit Felix Tsui, Cupertino, CA (US)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 112 days.

(21) Appl. No.: 18/625,342

(22) Filed: Apr. 3, 2024

(65) Prior Publication Data

US 2024/0264371 A1 Aug. 8, 2024

Related U.S. Application Data

(62) Division of application No. 17/750,862, filed on May 23, 2022, now Pat. No. 11,977,256.

(Continued)

(51) Int. Cl.
*G02B 6/12* (2006.01)
*G02B 6/13* (2006.01)

(52) U.S. Cl.
CPC ........... *G02B 6/12004* (2013.01); *G02B 6/13* (2013.01); *G02B 2006/12104* (2013.01); *G02B 2006/12121* (2013.01); *G02B 2006/12142* (2013.01)

(58) Field of Classification Search
CPC .................. G02B 6/12004; G02B 6/13; G02B 2006/12104; G02B 2006/12121; G02B 2006/12142

(Continued)

(56) References Cited

U.S. PATENT DOCUMENTS 10,243,322 B2 3/2019 Mahgerefteh et al.
10,333,623 B1 6/2019 Liao et al.

(Continued)

FOREIGN PATENT DOCUMENTS

KR 20050006547 A 1/2005
WO 03003420 A1 1/2003

OTHER PUBLICATIONS

Marchetti et al. "Coupling strategies for silicon photonics integrated chips" Photonics Research, vol. 7, No. 2 / Feb. 2019, published on Jan. 31, 2019.

(Continued)

*Primary Examiner* — Jerry M Blevins
(74) *Attorney, Agent, or Firm* — Eschweiler & Potashnik, LLC

(57) ABSTRACT

Various embodiments of the present disclosure are directed towards a semiconductor package comprising optically coupled integrated circuit (IC) chips. A first IC chip and a second IC chip overlie a substrate at a center of the substrate. A photonic chip overlies the first and second IC chips and is electrically coupled to the second IC chip. A laser device chip overlies the substrate, adjacent to the photonic chip and the second IC chip, at a periphery of the substrate. The photonic chip is configured to modulate a laser beam from the laser device chip in accordance with an electrical signal from the second IC chip and to provide the modulated laser beam to the first IC chip. This facilitates optical communication between the first IC chip to the second IC chip. Various embodiments of the present disclosure are further directed towards simultaneously aligning and bonding constituents of the semiconductor package.

20 Claims, 37 Drawing Sheets

Related U.S. Application Data

(60) Provisional application No. 63/313,973, filed on Feb. 25, 2022.

(58) Field of Classification Search
USPC ........................................................ 385/14
See application file for complete search history.

(56) References Cited

U.S. PATENT DOCUMENTS

| | | | |
|---|---|---|---|
| 10,585,250 | B2 | 3/2020 | Jou et al. |
| 10,996,410 | B2 | 5/2021 | Wang et al. |
| 2018/0275359 | A1 | 9/2018 | Ding et al. |
| 2021/0202562 | A1 | 7/2021 | Chang et al. |

OTHER PUBLICATIONS

Gartenberg, Chaim. "A New Standard Could Let Companies Build Processors Out of Lego-Like Chiplets" The Verge, published on Mar. 2, 2022.
Pal, Uttam. "Silicon Photonics: Designing and Prototyping Silicon Waveguides" Comsol, published on Sep. 19, 2017.
Wikipedia.org. "Chiplet" Published on Apr. 1, 2022.
Offrein, Bert. "Chip and system-level integration technologies for silicon photonics" 5th International Symposium for Optical Interconnect in Data Centres, published in 2017.
Notice of Allowance dated Jan. 10, 2024 for U.S. Appl. No. 17/750,862.

SEMICONDUCTOR PACKAGE COMPRISING OPTICALLY COUPLED IC CHIPS

REFERENCE TO RELATED APPLICATIONS

This Application is a Divisional of U.S. patent application Ser. No. 17/750,862, filed on May 23, 2022, which claims the benefit of U.S. Provisional Application No. 63/313,973, filed on Feb. 25, 2022. The contents of the above-referenced Patent Applications are hereby incorporated by reference in their entirety.

BACKGROUND

A system-on-a-chip (SoC) has traditionally been formed from a single integrated circuit (IC) chip containing all functionality. However, more recently, a chiplet design has emerged. Instead of one large IC chip, multiple smaller IC chips are packaged together to form the SoC. The smaller IC chips are more aptly referred to as chiplets and implement individual functional blocks of the SoC. Among other things, the chiplet design may reduce waste/increase yields, allow smaller components, and enable bigger chips.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
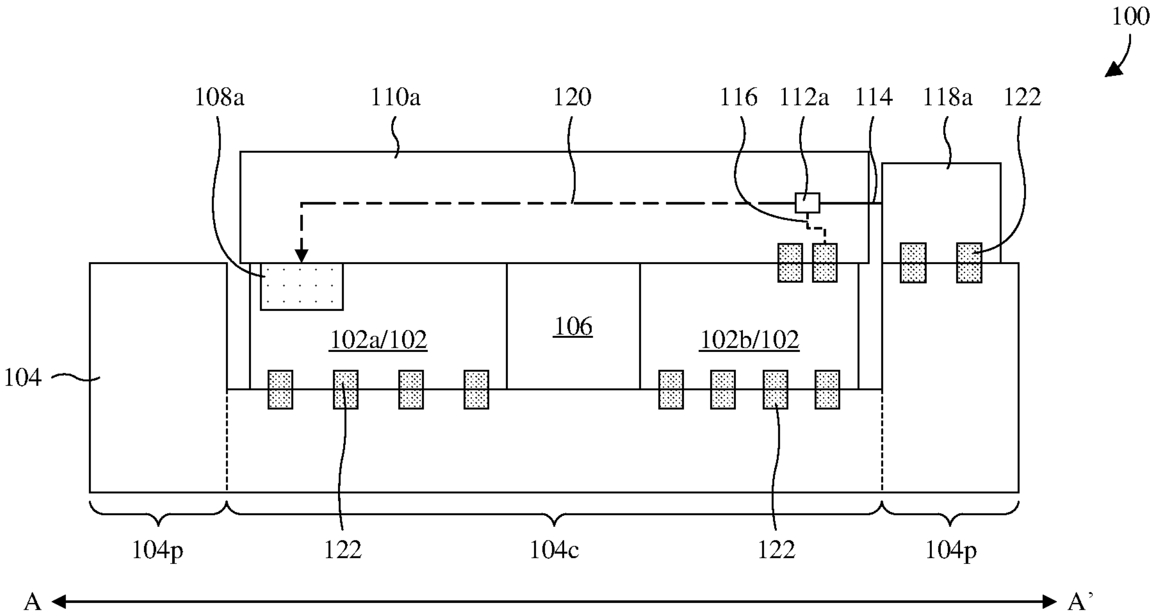
FIG. 1 illustrates a cross-sectional view of some embodiments of a semiconductor package comprising integrated circuit (IC) chips optically coupled together.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A system-on-a-chip (SoC) with a chiplet design may comprise a plurality of integrated circuit (IC) chiplets packaged together. For example, the SoC may comprise a memory controller chiplet and a memory chiplet packaged together. The IC chiplets implement individual functional blocks of the SoC and communicate electrically.

Because the functional blocks are distributed amongst the IC chiplets, electrical paths between functional blocks may be longer than they otherwise would be if the functional blocks were integrated into a single IC chip. Longer electrical paths lead to higher resistance, higher latency, and higher power consumption. Further, longer electrical paths lead to noise and signal loss along the electrical paths. As such, the chiplets may have individual circuits to filter noise, amplify signals, and so on. However, these circuits increase the size of the chiplets, add complexity to the chiplets, and add cost to the chiplets.

Various embodiments of the present disclosure are directed towards a semiconductor package comprising optically coupled IC chips. In some embodiments, the semiconductor package corresponds to a SoC with a chiplet design, whereby the optically coupled IC chips may also be referred to as optically coupled IC chiplets.

A first IC chip and a second IC chip overlie a carrier substrate, adjacent to each other, at a center of the carrier substrate. A photonic chip overlies the first and second IC chips and is electrically coupled to the second IC chip. A laser device chip overlies the carrier substrate, adjacent to the photonic chip and the second IC chip, at a periphery of the carrier substrate. The photonic chip is configured to modulate a laser beam from the laser device chip in accordance with an electrical signal from the second IC chip and to provide the modulated laser beam to the first IC chip. The first IC chip comprises a photodetector configured to convert the modulated laser beam into an electrical signal. Accordingly, the second IC chip may communication optically with the first IC chip.

Optical signals may be communicated longer distances, and with lower power consumption and less delay, than electrical signals. Therefore, the optical communication allows the first and second IC chips to communicate with lower power consumption and less delay than would otherwise be possible with electrical communication. Further, optical signals are less prone to noise and signal loss than electrical signals. Therefore, the first and second IC chips may omit circuits for filtering noise, amplifying signals, and so on, or may otherwise have simpler circuits for carrying out such functions than would otherwise be possible with electrical communication. This, in turn, allows the first and second IC chips to have reduced size or higher functional density, reduced complexity, and reduced the costs.

With reference to FIG. 1, a cross-sectional view 100 of some embodiments of a semiconductor package comprising a plurality of IC chips 102 optically coupled together is provided. The IC chips 102 overlie a carrier substrate 104 at center portion 104*c* of the carrier substrate 104 and implement individual functional blocks of the semiconductor package. Further, the IC chips 102 comprise a first IC chip 102*a* and a second IC chip 102*b*. In some embodiments, the semiconductor package corresponds to a SoC with a chiplet design, whereby the IC chips 102 may also be referred to as IC chiplets.

The first and second IC chips 102*a*, 102*b* border in a recess 106 of the carrier substrate 104, and the first IC chip 102*a* further comprises a photodetector 108*a*. The photodetector 108*a* is configured to receive an optical signal and to convert the optical signal to an electrical signal. As seen hereafter, the optical signal is modulated in accordance with an electrical signal from the second IC chip 102*b*, thereby allowing the second IC chip 102*b* to communicate with the first IC chip 102*a*.

A photonic chip 110*a* overlies the first and second IC chips 102*a*, 102*b*, and is electrically coupled to the second IC chip 102*b*. The photonic chip 110*a* comprises a light modulator 112*a* and a plurality of waveguides and couplers (not illustrated). The light modulator 112*a* is configured to modulate a laser beam 114 in accordance with an electrical signal 116 received from the second IC chip 102*b*. An input coupler is configured to receive the laser beam 114 from a laser device chip 118*a*, and an input waveguide is configured to guide the laser beam 114 from the input coupler to an input of the light modulator 112*a*. Further, an output waveguide is configured to guide a modulated laser beam 120 from an output of the light modulator 112*a*, and an output coupler is configured to couple the modulated laser beam 120 from the output waveguide to the photodetector 108*a*.

The laser device chip 118*a* borders the second IC chip 102*b* and the photonic chip 110*a* at a peripheral portion 104*p* of the carrier substrate 104. Further, the laser device chip 118*a* is outside the recess 106, level with the photonic chip 110*a*. The laser device chip 118*a* is configured to generate the laser beam 114, which is modulated at the photonic chip 110*a* according to the electrical signal 116 received from the second IC chip 102*b*. Such modulation allows the second IC chip 102*b* to optically communicate with the first IC chip 102*a*. Because the laser device chip 118*a* is configured to emit the laser beam 114, the laser device chip 118*a* may also be referred to as a laser emission chip or the like.

Optical signals may be communicated longer distances, and with lower power consumption and less delay, than electrical signals. Therefore, the optical communication allows the first and second IC chips 102*a*, 102*b* to communicate with lower power consumption and less delay than would otherwise be possible with electrical communication. Further, optical signals are less prone to noise and signal loss than electrical signals. Therefore, the first and second IC chips 102*a*, 102*b* may omit circuits for filtering noise, amplifying signals, and so on, or may otherwise have simpler circuits for carrying out such functions than would otherwise be possible with electrical communication. This allows the first and second IC chips 102*a*, 102*b* to have reduced size or higher functional density, reduced complexity, and reduced the costs.

With continued reference to FIG. 1, a plurality of pads 122 are in and/or on the photonic chip 110*a*, the IC chips 102, the laser device chip 118*a*, and the carrier substrate 104 to facilitate electrical coupling therebetween. For example, pads 122 at a boundary between the photonic chip 110*a* and the second IC chip 102*b* facilitate electrical coupling between the photonic chip 110*a* and the second IC chip 102*b*. As another example, pads 122 at a boundary between the carrier substrate 104 and the laser device chip 118*a* facilitate electrical coupling between the carrier substrate 104 and the laser device chip 118*a*. The pads 122 are conductive and may for example, be or comprise a metal, a metal alloy, some other suitable conductive material(s), or any combination of the foregoing.

Note that for simplicity, only some of the pads 122 are illustrated. Further, while not illustrated, additional conductive features may be in and/or on the photonic chip 110*a*, the IC chips 102, the laser device chip 118*a*, and the carrier substrate 104. The additional conductive features define conductive paths leading from the pads 122 to electrically couple the pads 122 to devices and/or structures in and/or on the photonic chip 110*a*, the IC chips 102, the laser device chip 118*a*, and the carrier substrate 104. The additional conductive features may for example, include wires, vias, contacts, and so on. Further, the additional conductive features may for example, also be referred to as interconnect features.

In some embodiments, the first and second IC chips 102*a*, 102*b* have individual top surfaces level with or about level with a top surface of the carrier substrate 104. Further, in some embodiments, the first and second IC chips 102*a*, 102*b* are spaced from each other and/or are spaced from sidewalls of the carrier substrate 104 in the recess 106. In some embodiments, the first and second IC chips 102*a*, 102*b* respectively implement functional blocks of a SoC. For example, the first IC chip 102*a* may implement a memory controller, whereas the second IC chip 102*b* may implement Double Data Rate 2 (DDR2) memory, or vice versa. As another example, the first IC chip 102*a* may implement a memory controller, whereas the second IC chip 102*b* may implement a central processing unit (CPU), or vice versa.

In some embodiments, the carrier substrate 104 is a bulk substrate of monocrystalline silicon or some other semiconductor material. In other embodiments, the carrier substrate 104 is a glass substrate or the like. In yet other embodiments, the carrier substrate 104 comprises a semiconductor substrate and an interconnect structure on the semiconductor substrate. In some embodiments in which the carrier substrate 104 is or comprises a semiconductor material, the semiconductor material is undoped. For example, the carrier substrate 104 may be undoped monocrystalline silicon.

In some embodiments, the laser device chip 118*a* is or comprises a laser diode or the like configured to generate the laser beam 114. In some embodiments, a bottom surface of the laser device chip 118*a* is level with or about level with a bottom surface of the photonic chip 110*a*. Further, in some embodiments, the bottom surface of the laser device chip 118*a* is level with or about level with individual top surfaces of the first and second IC chips 102*a*, 102*b*.

Figure 2A:
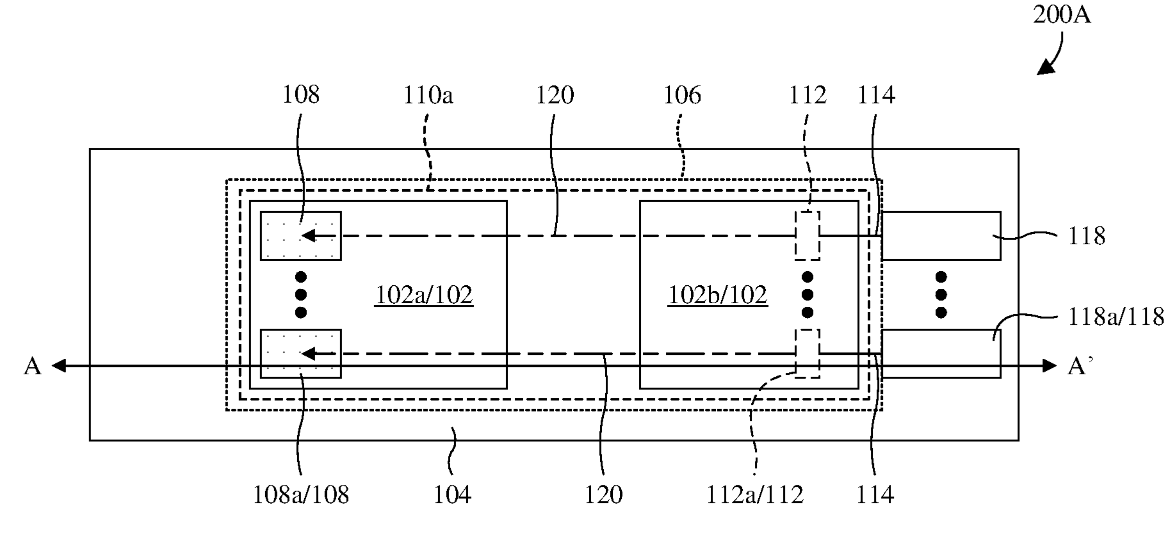
FIGS. 2A and 2B illustrate various top layout views of some embodiments of the semiconductor package of FIG. 1 in which the IC chips have one-directional communication.
Figure 2B:
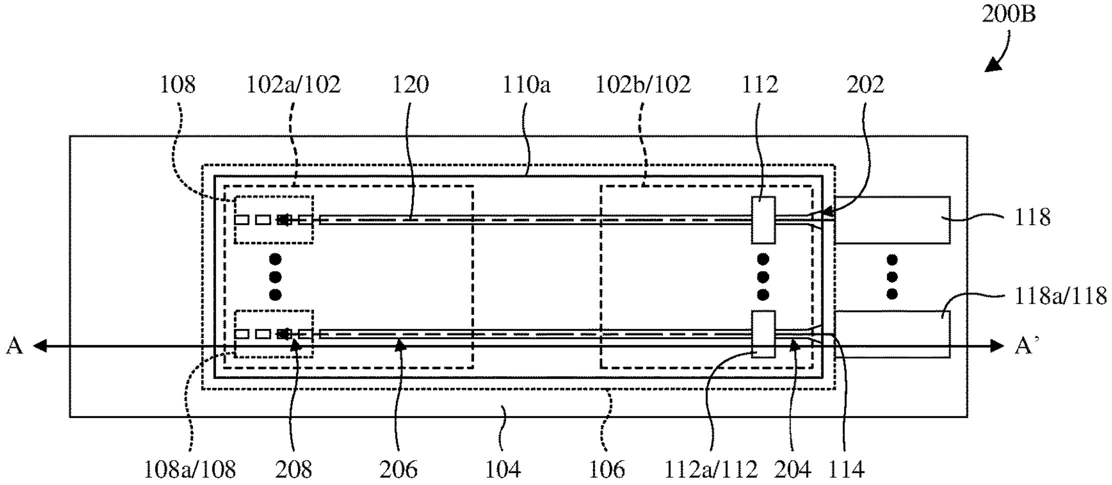

With reference to FIGS. 2A and 2B, various top layout views 200A, 200B of some embodiments of the semiconductor package of FIG. 1 are provided in which the first and second IC chips 102*a*, 102*b* have one-directional communication. The cross-sectional view 100 of FIG. 1 may, for example, be taken along line A-A' or along some other suitable line. As seen and described hereafter, FIG. 2A a directed towards a level of the first and second IC chips 102*a*, 102*b*, and FIG. 2B is directed towards a level of the photonic chip 110*a*.

Focusing on the top layout view 200A of FIG. 2A, the first IC chip 102*a* comprises a plurality of photodetectors 108, including the photodetector 108*a* of FIG. 1. Further, each of the photodetectors 108 is as the photodetector 108*a* of FIG. 1 is described. Hence, the photodetectors 108 are configured to receive respective optical signals and to convert the optical signals respectively into electrical signals.

A plurality of laser device chips 118, including the laser device chip 118*a* of FIG. 1, border the second IC chip 102*b* and the photonic chip 110*a* outside the recess 106. The laser device chips 118 correspond to the photodetectors 108 and are each as the laser device chip 118*a* of FIG. 1 is described. Hence, the laser device chips 118 are configured to generate laser beams 114 directed towards the photonic chip 110*a*. In some embodiments, the laser device chips 118 correspond to the photodetectors with a one-to-one correspondence.

Focusing on the top layout view 200B of FIG. 2B, the photonic chip 110*a* comprises a plurality of light modulators 112, including the light modulator 112*a* of FIG. 1. Further, the photonic chip 110 comprises a plurality of input couplers 202, a plurality of input waveguides 204, a plurality of output waveguides 206, and a plurality of output couplers 208 that together form a plurality of input and output light paths.

The light modulators 112 correspond to the photodetectors 108 and further correspond to the laser device chips 118. In some embodiments, the light modulators 112 correspond to the photodetectors 108 with a one-to-one correspondence and/or correspond to the laser device chips 118 with a one-to-one correspondence. Further, the light modulators 112 are each as the light modulator 112*a* of FIG. 1 is described. Hence, the light modulators 112 are configured to respectively receive the laser beams 114 from the laser device chips 118 and to modulate the laser beams 114 respectively into modulated laser beams 120 in accordance with respective electrical signals received from the second IC chip 102*b*.

The input couplers 202 and the input waveguides 204 form a plurality of input light paths corresponding to the light modulators 112, and the output waveguides 206 and the output couplers 208 form a plurality of output light paths corresponding to the light modulators 112. Each of the input light paths comprises a respective input coupler 202 and a respective input waveguide 204 arranged in series. Further, each of the output light paths comprises a respective output waveguide 206 and a respective output coupler 208 arranged in series.

The input couplers 202 are configured to receive the laser beams 114 from the laser device chips 118, and the input waveguides 204 are configured to guide the laser beams 114 from the input couplers 202 to inputs of the light modulators 112. In some embodiments, the input couplers 202 correspond to the light modulators 112 with a one-to-one correspondence, and the input waveguides 204 correspond to the light modulators 112 with a one-to-one correspondence. As such, the input light paths correspond to the light modulators 112 with a one-to-one corresponded in some embodiments.

The output waveguides 206 are configured to guide the modulated laser beams 120 from outputs of the light modulators 112 to the output couplers 208, and the output couplers 208 are configured to couple the modulated laser beams 120 from the output waveguides 206 to the photodetectors 108 of the first IC chip 102*a*. The output couplers 208 may for example, be grating couplers or some other suitable type of coupler. In some embodiments, the output waveguides 206 correspond to the light modulators 112 with a one-to-one correspondence, and the output couplers 208 correspond to the light modulators 112 with a one-to-one correspondence. As such, the output light paths correspond to the light modulators 112 with a one-to-one corresponded in some embodiments.

While FIGS. 2A and 2B illustrate two photodetectors 108, two light modulators 112, and two laser device chips 118, additional photodetectors, additional light modulators, and additional laser device chips are amenable. Each of the ellipses is used to represent zero or more of the corresponding structure. In some embodiments, the semiconductor package comprises twenty photodetectors 108, twenty light modulators 112, and twenty laser device chips 118. Other suitable numbers are, however, amenable in alternative embodiments.

Figure 3A:
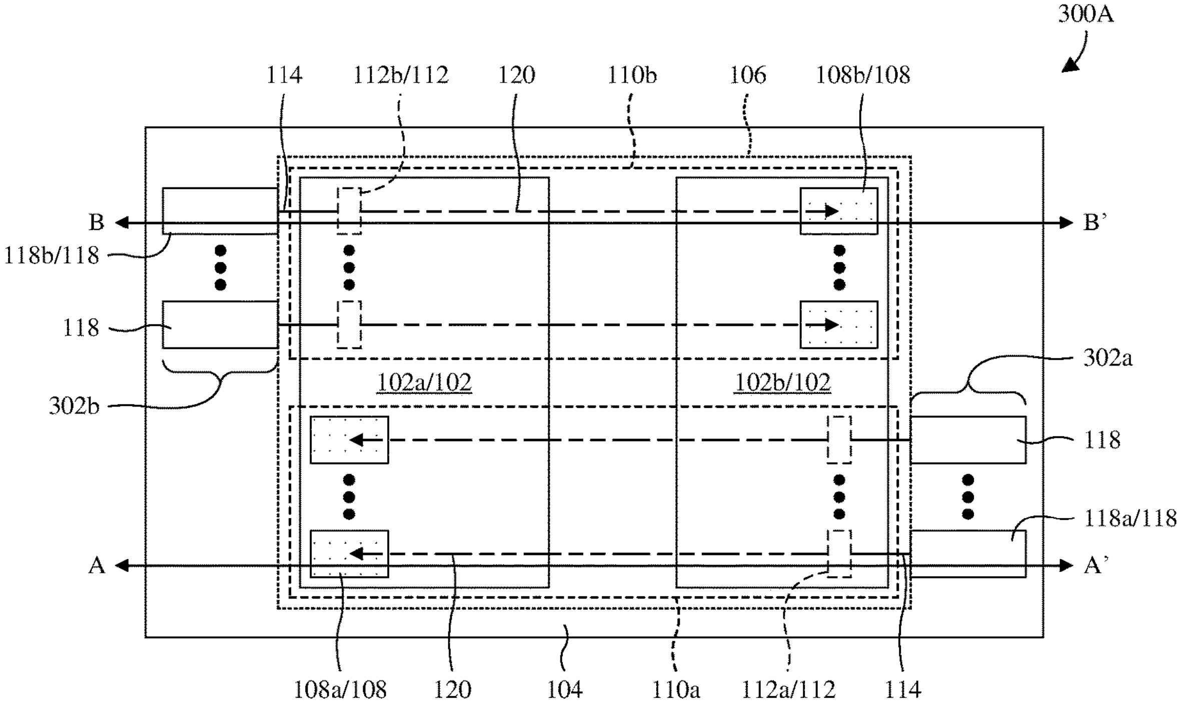
FIGS. 3A and 3B illustrate various top layout views of some embodiments of the semiconductor package of FIG. 1 in which the IC chips have two-directional communication.
Figure 3B:
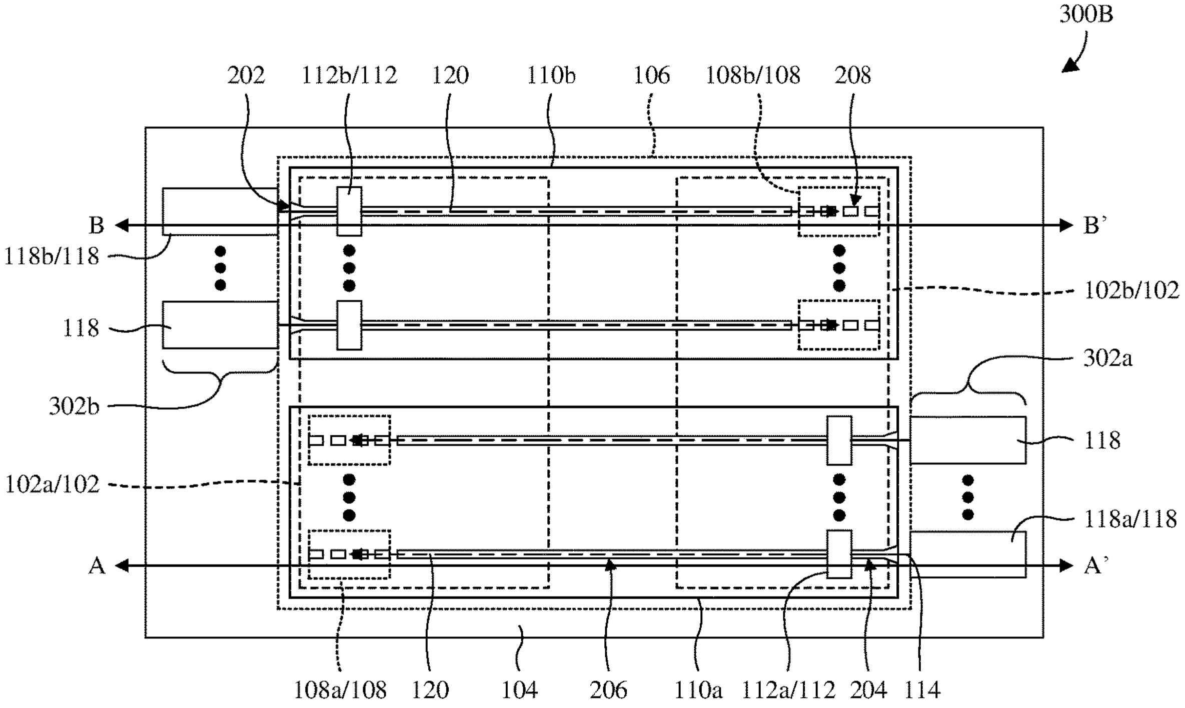

With reference to FIGS. 3A and 3B, various top layout views 300A, 300B of some embodiments of the semiconductor package of FIG. 1 are provided in which the first and second IC chips 102*a*, 102*b* have two-directional communication. The cross-sectional view 100 of FIG. 1 may, for example, be taken along line A-A' or along some other suitable line. FIG. 3A a directed towards a level of the first and second IC chips 102*a*, 102*b*, and FIG. 3B is directed towards a level of the first photonic chip 110*a* and a second photonic chip 110*b*. As seen hereafter, the structure illustrated and described with regard to FIGS. 2A and 2B is replicated for each communication direction, thereby allowing two-directional communication.

Focusing on the top layout view 300A of FIG. 3A, the first and second IC chips 102*a*, 102*b* each comprises a plurality of photodetectors 108. The plurality of photodetectors 108 of the first IC chip 102*a* includes the first photodetector 108*a* of FIG. 1, and the plurality of photodetectors 108 of the second IC chip 102*b* includes a second photodetector 108*b*. Further, the photodetectors 108 of the first and second IC chips 102*a*, 102*b* are each as the first photodetector 108*a* of FIG. 1 is described and are hence configured to receive respective optical signals and to convert the optical signals respectively into electrical signals.

A plurality of laser device chips 118 are grouped into a first group 302*a* and a second group 302*b* respectively on opposite sides of the recess 106. The first group 302*a* includes the first laser device chip 118*a* of FIG. 1 and borders the second IC chip 102*b* and the first photonic chip 110*a* outside the recess 106. The second group 302*b* includes a second laser device chip 118*b* and borders the first IC chip 102*a* and the second photonic chip 110*b* outside the recess 106. When viewed in cross-section, the second photonic chip 110*b* overlies the first and second IC chips 102*a*, 102*b* as shown for the first photonic chip 110*a* in FIG. 1.

The laser device chips 118 are each as the first laser device chip 118*a* of FIG. 1 is described and hence are configured to generate laser beams 114 directed towards a photonic chip (e.g., the first or second photonic chip 110*a*, 110*b*). The laser device chips 118 of the first group 302*a* correspond to the photodetectors 108 of the first IC chip 102*a*, whereas the laser device chips 118 of the second group 302*b* correspond to the photodetectors 108 of the second IC chip 102*b*. In some embodiments, the laser device chips 118 of the first group 302*a* correspond to the photodetectors 108 of the first IC chip 102*a* with a one-to-one correspondence, and/or the laser device chips 118 of the second group 302*b* correspond to the photodetectors 108 of the second IC chip 102*b* with a one-to-one correspondence.

Focusing on the top layout view 300B of FIG. 3B, the first and second photonic chips 110*a*, 110*b* each comprises a plurality of light modulators 112. The plurality of light modulators 112 of the first photonic chip 110*a* includes the first light modulator 112*a* of FIG. 1, whereas the plurality of light modulators 112 of the second photonic chip 110*b* includes a second light modulator 112*b*. Further, the first and second photonic chips 110*a*, 110*b* each comprises a plurality of input couplers 202, a plurality of input waveguides 204, a plurality of output waveguides 206, and a plurality of output couplers 208.

The light modulators 112 of the first photonic chip 110*a* correspond to the photodetectors 108 of the first IC chip 102*a* and further correspond to the laser device chips 118 of the first group 302*a*. In some embodiments, such correspondences are one-to-one. Similarly, the light modulators 112 of the second photonic chip 110*b* correspond to the photodetectors 108 of the second IC chip 102*b* and further correspond to the laser device chips 118 of the second group 302*b*. In some embodiments, such correspondences are one-to-one. Further, the light modulators 112 of the first and second photonic chips 110*a*, 110*b* are each as the light modulator 112*a* of FIG. 1 is described, except that the light modulators 112 of the second photonic chip 110*b* receive electrical signals from the first IC chip 102*a*. Hence, the light modulators 112 are configured to respectively receive the laser beams 114 and to modulate the laser beams 114 respectively into modulated laser beams 120 in accordance with respective electrical signals received from the first and second IC chips 102*a*, 102*b*.

The input couplers 202 of the first and second photonic chips 110*a*, 110*b* and the input waveguides 204 of the first and second photonic chips 110*a*, 110*b* are as their counterparts are described with regard to FIG. 2B and hence define input light paths. The input couplers 202 receive the laser beams 114 from corresponding laser device chips 118, and the input waveguides 204 guide the laser beams 114 to corresponding light modulators 112. Similarly, the output couplers 208 of the first and second photonic chips 110*a*, 110*b* and the output waveguides 206 of the first and second photonic chips 110*a*, 110*b* are as their counterparts are described with regard to FIG. 2B and hence define output light paths. The output waveguides 206 guide the modulated laser beams 120 to corresponding output couplers 208, and the output couplers 208 couple the modulated laser beams 120 to corresponding photodetectors 108.

Figure 4A:
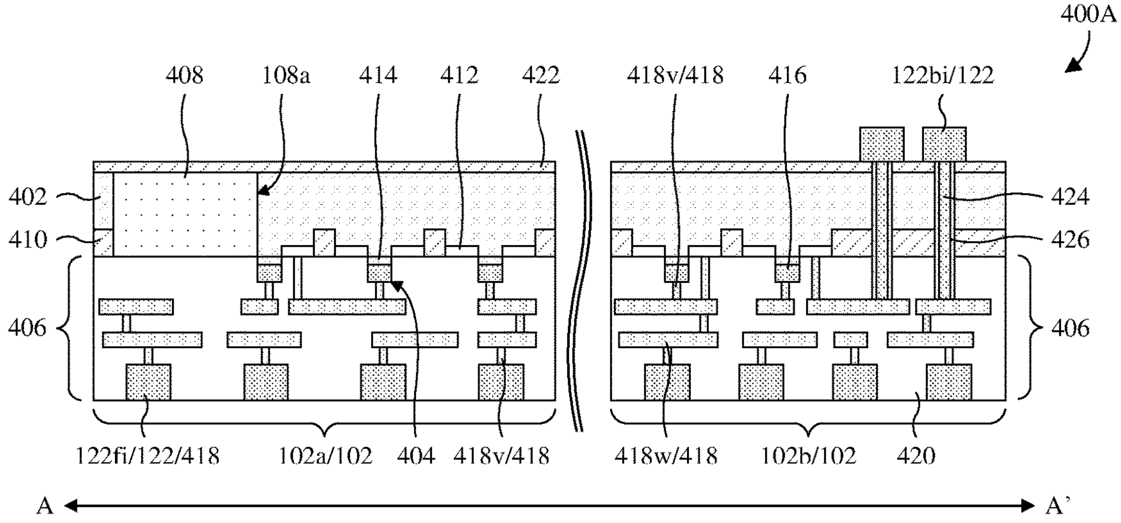
FIGS. 4A and 4B illustrate various cross-sectional views of some embodiments of the IC chips of FIG. 1.
Figure 4B:
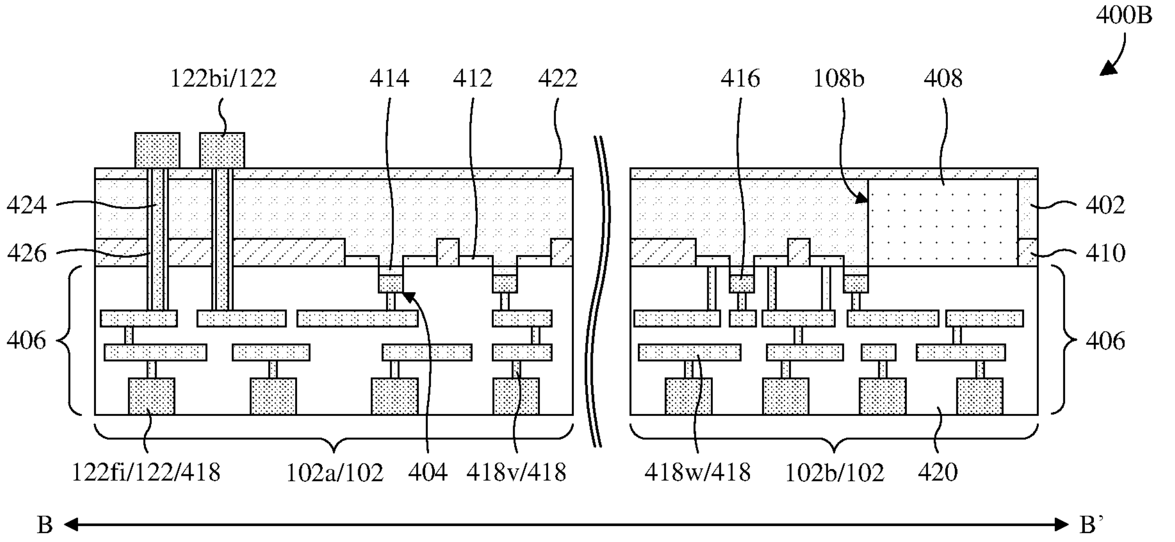

With reference to FIGS. 4A and 4B, various cross-sectional views 400A, 400B of some embodiments of the first and second IC chips 102*a*, 102*b* of FIG. 1 are provided. FIG. 4A may for example, be taken along line A-A' in FIGS. 2A and 2B or FIGS. 3A and 3B, whereas FIG. 4B may for example, be taken along line B-B' in FIGS. 3A and 3B.

Focusing on the cross-sectional view 400A of FIG. 4A, the first and second IC chips 102*a*, 102*b* comprise individual semiconductor substrates 402, individual semiconductor devices 404 (other than the photodetector 108*a*), and individual interconnect structures 406. Further, the first IC chip 102*a* further includes the photodetector 108*a*.

The semiconductor devices 404 and the interconnect structures 406 are on frontsides of corresponding semiconductor substrates 402, and the semiconductor devices 404 are between the corresponding semiconductor substrates 402 and corresponding interconnect structures 406. Further, the photodetector 108*a* is in the semiconductor substrate 402 of the first IC chip 102*a* and adjoins and partially forms a corresponding one of the semiconductor devices 404. The semiconductor substrates 402 may for example, be bulk substrates of monocrystalline silicon, silicon-on-insulator substrates, or some other suitable type of substrate.

The photodetector 108*a* comprises a collector region 408 in the semiconductor substrate 402 of the first IC chip 102*a*.

The collector region 408 is a doped semiconductor region having an opposite doping type as adjoining semiconductor regions, such that a boundary of the collector region 408 is demarcated in part by a PN junction. The photodetector 108*a* may for example, be a photodiode or some other suitable type of photodetector.

The semiconductor devices 404 are separated from each other by corresponding trench isolation structure 410 extending into the frontsides of corresponding semiconductor substrates 402. The trench isolation structures 410 are or comprise dielectric material and may for example, be or comprise shallow trench isolation (STI) structures or like. Further, the semiconductor devices 404 may for example, be transistors, memory cells, other suitable types of semiconductor devices, or any combination of the foregoing. The transistors may for example, be planar field-effect transistors (FETs), fin FETs, gate-all-around (GAA) FETs, some other suitable transistor type, or any combination of the foregoing.

In some embodiments, the semiconductor devices 404 comprise individual pairs of source/drain regions 412, individual gate dielectric layers 414, and individual gate electrodes 416. The gate dielectric layers 414 respectively separate the gate electrodes 416 from corresponding semiconductor substrates 402. The pairs of source/drain regions 412 are in corresponding semiconductor substrates 402 and are doped semiconductor regions. The gate electrodes 416 are between corresponding source/drain regions 412 and, in the case of the semiconductor device 404 adjoining the photodetector 108*a*, a source/drain region of that semiconductor device is formed wholly or partially by the collector region 408.

The interconnect structures 406 comprises a plurality of conductive features 418 grouped into levels and stacked to form conductive paths leading from the semiconductor devices 404. Further, the conductive features 418 are embedded in corresponding interconnect dielectric layers 420 individual to the interconnect structures 406. The conductive features 418 may for example, include vias 418*v*, wires 418*w*, frontside IC pads 122*fi*, other suitable conductive features, or any combination of the foregoing.

Backside IC pads 122*bi* of the second IC chip 102*b* and a plurality of backside dielectric layers 422 are on backsides of corresponding semiconductor substrates 402. Further, the backside IC pads 122*bi* of the second IC chip 102*b* are separated from the semiconductor substrate 402 of the second IC chip 102*b* by a corresponding backside dielectric layer 422 and are electrically coupled to the interconnect structure 406 of the second IC chip 102*b*. The electrical coupling is by a plurality of through substrate vias (TSVs) 424 extending between the backside IC pads 122*bi* of the second IC chip 102*b* and the interconnect structure 406 of the second IC chip 102*b*. Further, the TSVs 424 are separated from the semiconductor substrate 402 of the second IC chip 102*b* by TSV dielectric layers 426.

Focusing on the cross-sectional view 400B of FIG. 4B, the first and second IC chips 102*a*, 102*b* are generally as described with to regard to FIG. 4A. However, the second IC chip 102*b* includes the second photodetector 108*b*, and the first photodetector 108*a* is omitted from the first IC chip 102*a*. Further, the first IC chip 102*a* has TSVs 424 and backside IC pads 122*bi*, whereas the second IC chip 102*b* does not. The second photodetector 108*b* may for example, be as the first photodetector 108*a* is described above.

While FIGS. 2A and 2B are described together, it is to be appreciated that FIGS. 2A and 2B may stand alone. In other words, FIGS. 2A and 2B may but do not necessarily, correspond to the same embodiments. Similarly, while FIGS. 3A and 3B are described together, it is to be appreciated that FIGS. 3A and 3B may stand alone. Further, while FIGS. 4A and 4B are described together, it is to be appreciated that FIGS. 4A and 4B may stand alone.

Figure 5:
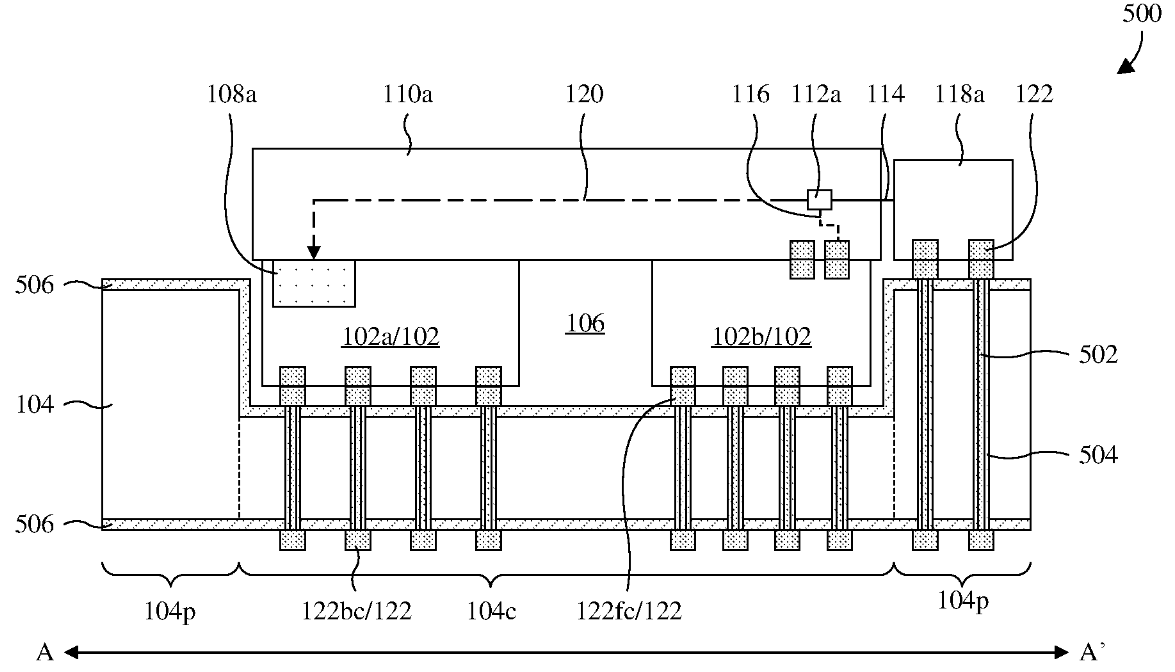
FIG. 5 illustrates a cross-sectional view of some embodiments of the semiconductor package of FIG. 1 in which through substrate vias (TSV) extend through a carrier substrate.

With reference to FIG. 5, a cross-sectional view 500 of some embodiments of the semiconductor package of FIG. 1 is provided in which TSVs 502 extend through the carrier substrate 104. The TSVs 502 extend through the carrier substrate 104 respectively from frontside carrier pads 122*fc* on a frontside of the carrier substrate 104 to backside carrier pads 122*bc* on a backside of the carrier substrate 104, thereby electrically coupling the first and second IC chips 102*a*, 102*b* and the laser device chip 118*a* to the backside carrier pads 122*bc*. The TSVs 502 are separated from the carrier substrate 104 by corresponding TSV dielectric layers 504. Similarly, the frontside carrier pads 122*fc* and the backside carrier pads 122*bc* are separated from the carrier substrate 104 by corresponding dielectric layers 506.

Figure 6:
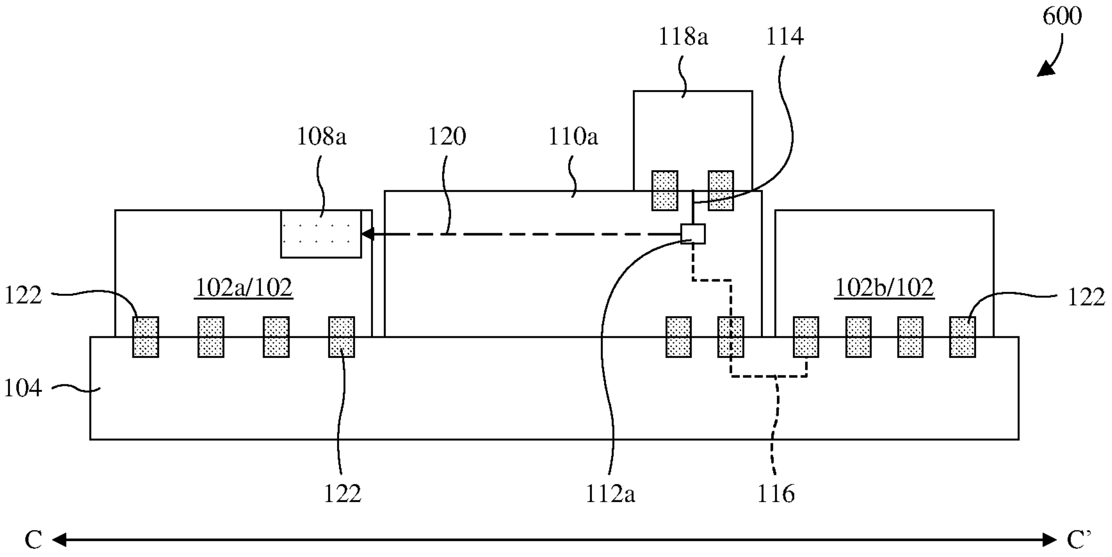
FIG. 6 illustrates a cross-sectional view of some alternative embodiments of the semiconductor package of FIG. 1 in which a photonic chip is between the IC chips.

With reference to FIG. 6, a cross-sectional view 600 of some alternative embodiments of the semiconductor package of FIG. 1 is provided in which the photonic chip 110*a* is between the first and second IC chips 102*a*, 102*b* instead of over the first and second IC chips 102*a*, 102*b*. As a result, the recess 106 is omitted and the light modulator 112*a* is electrically coupled to the second IC chip 102*b* through the carrier substrate 104. Additionally, the laser device chip 118*a* overlies the photonic chip 110*a*. In alternative embodiment embodiments, the laser device chip 118*a* is at a side of the photonic chip 110*a*.

Figure 7A:
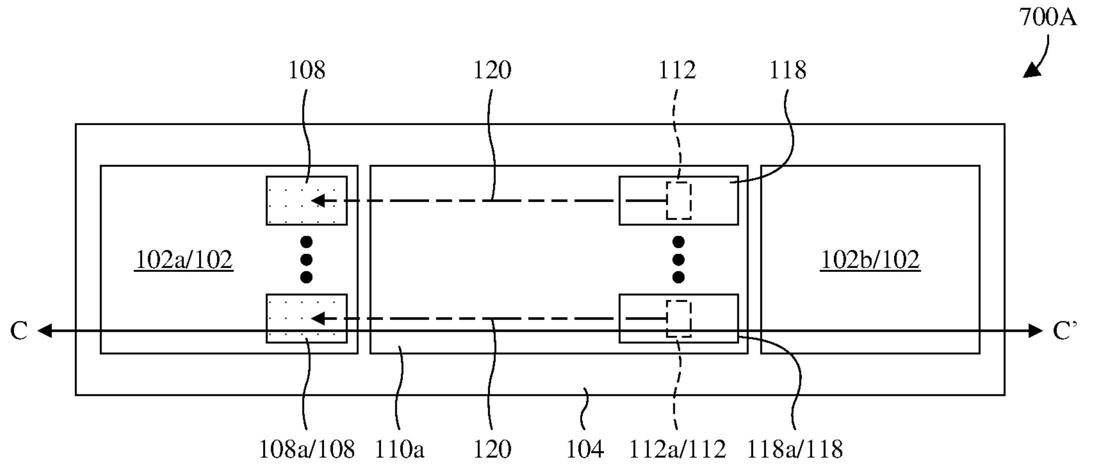
FIGS. 7A and 7B illustrate various top layout views of some embodiments of the semiconductor package of FIG. 6 in which the IC chips respectively have one-directional communication and two-directional communication.
Figure 7B:
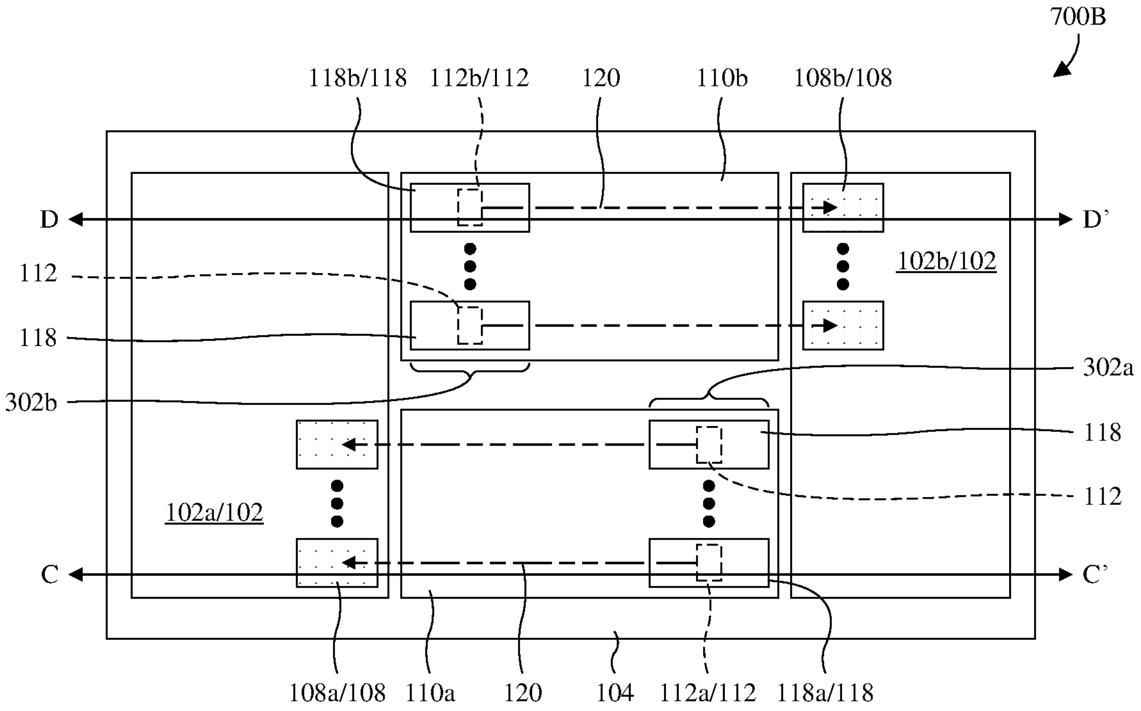

With reference to FIGS. 7A and 7B, various top layout views 700A, 700B of some embodiments of the semiconductor package of FIG. 6 are provided in which the first and second IC chips 102*a*, 102*b* respectively have one-directional communication and two-directional communication. The cross-sectional view 600 of FIG. 6 may, for example, be taken along line C-C' or along some other suitable line.

Focusing on the top layout view 700A of FIG. 7A, the semiconductor package of FIG. 7A is largely as the semiconductor package of FIG. 2A and/or FIG. 2B is described with a few exceptions. The recess 106 is omitted, and the photonic chip 110*a* is between the first and second IC chips 102*a*, 102*b*. Further, the laser device chips 118 overlap with the second IC chip 102*b*, and the photodetectors 108 are closer to the second IC chip 102*b*. In some embodiments, the cross-sectional view 400A of FIG. 4A may be taken along line C-C'.

Focusing on the top layout view 700B of FIG. 7B, the structure illustrated and described with regard to FIG. 7A is replicated for each communication direction. Further, the semiconductor package of FIG. 7B is largely as the semiconductor package of FIG. 3A and/or FIG. 3B is described with a few exceptions. The recess 106 is omitted, and the first and second photonic chips 110*a*, 110*b* are between the first and second IC chips 102*a*, 102*b*. Further, the laser device chips 118 of the first group 302*a* overlap with the first photonic chip 110*a*, the laser device chips 118 of the second group 302*b* overlap with the second photonic chip 110*b*, the photodetectors 108 of the first IC chip 102*a* are closer to the second IC chip 102*b*, and the photodetectors 108 of the second IC chip 102*b* are closer to the first IC chip 102*a*. In some embodiments, the cross-sectional view 400A of FIG. 4A may be taken along line C-C', and/or the cross-sectional view 400B of FIG. 4B may be taken along line D-D'.

Figure 8:
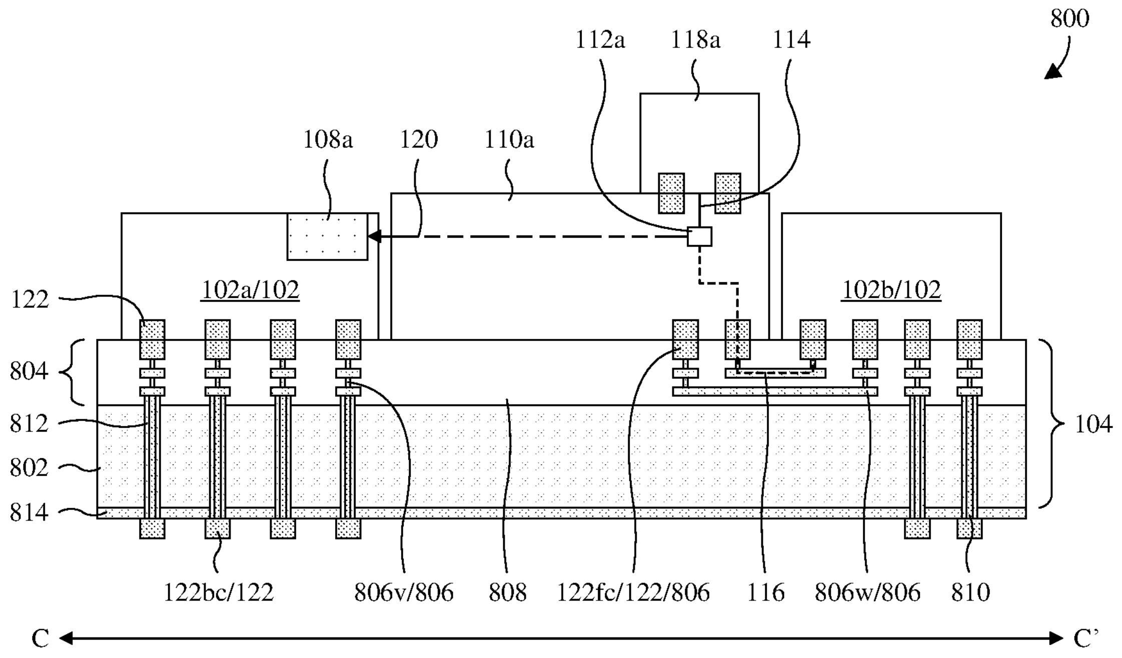
FIG. 8 illustrates a cross-sectional view of some embodiments of the semiconductor package of FIG. 6 in which TSVs extend through a carrier substrate.

With reference to FIG. 8, a cross-sectional view 800 of some embodiments of the semiconductor package of FIG. 6 is provided in which the carrier substrate 104 comprises a semiconductor substrate 802 and an interconnect structure 804 overlying the semiconductor substrate 802. In some embodiments, the semiconductor substrate 802 is a bulk substrate of monocrystalline silicon or some other semiconductor material. In other embodiments, the semiconductor substrate 802 is a glass substrate or some other type of substrate.

The interconnect structure 804 comprises a plurality of conductive features 806 grouped into levels and stacked to form conductive paths. For example, such a conductive path may electrically couple the second IC chip 102*b* to the photonic chip 110*a*. Further, the conductive features 806 are embedded in an interconnect dielectric layer 808. The conductive features 806 may for example, include vias 806*v*, wires 806*w*, frontside carrier pads 122*fc*, other suitable conductive features, or any combination of the foregoing.

TSVs 810 extend through the semiconductor substrate 802 respectively from the interconnect structure 804, which is on a frontside of the semiconductor substrate 802, to backside carrier pads 122*bc* on a backside of the semiconductor substrate 802. This provides electrically coupling from the first and second IC chips 102*a*, 102*b* and the photonic chip 110*a* to the backside carrier pads 122*bc*. The TSVs 810 are separated from the semiconductor substrate 802 by corresponding TSV dielectric layers 812. Similarly, the backside carrier pads 122*bc* are separated from the carrier substrate 104 by a dielectric layer 814.

Figure 9:
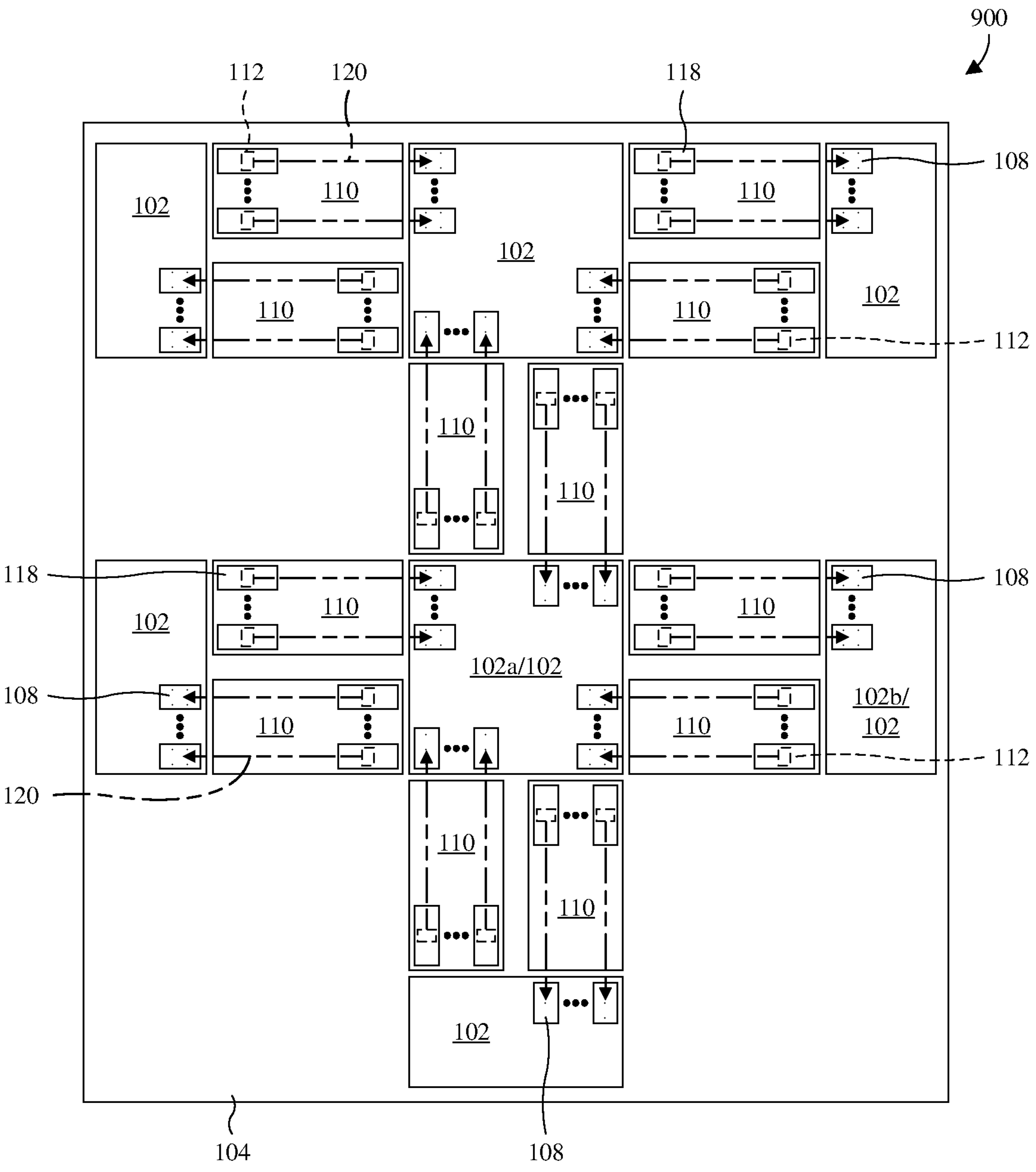
FIG. 9 illustrates a top layout view of some embodiments of the semiconductor package of FIG. 6 in which the semiconductor package comprises additional IC chips.

With reference to FIG. 9, a top layout view 900 of some alternative embodiments of the semiconductor package of FIG. 6 is provided in which the plurality of IC chips 102 comprises additional IC chips. Further, the IC chips 102 in each neighboring pair of IC chips 102 are optically coupled together through corresponding photonic chips 110. The photonic chips 110 are each as the first photonic chip 110*a* and/or the second photonic chip 110*b* is/are described with regard to FIGS. 6, 7A, and 7B.

A pair of photonic chips 110 is between the IC chips 102 in each neighboring pair of IC chips 102 to provide two-directional optical coupling between those IC chips 102 as described with regard to FIG. 7B. In alternative embodiments, a single photonic chip 110 is between the IC chips 102 in each neighboring pair of IC chips 102 to provide one-directional optical coupling between those IC chips 102 as described with regard to FIG. 7A. In alternative embodiments, some neighboring pairs of IC chips 102 have two-directional optical coupling as described with regard to FIG. 7B, whereas other neighboring pairs of IC chips 102 have one-directional coupling as described with regard to FIG. 7A.

Figure 10A:
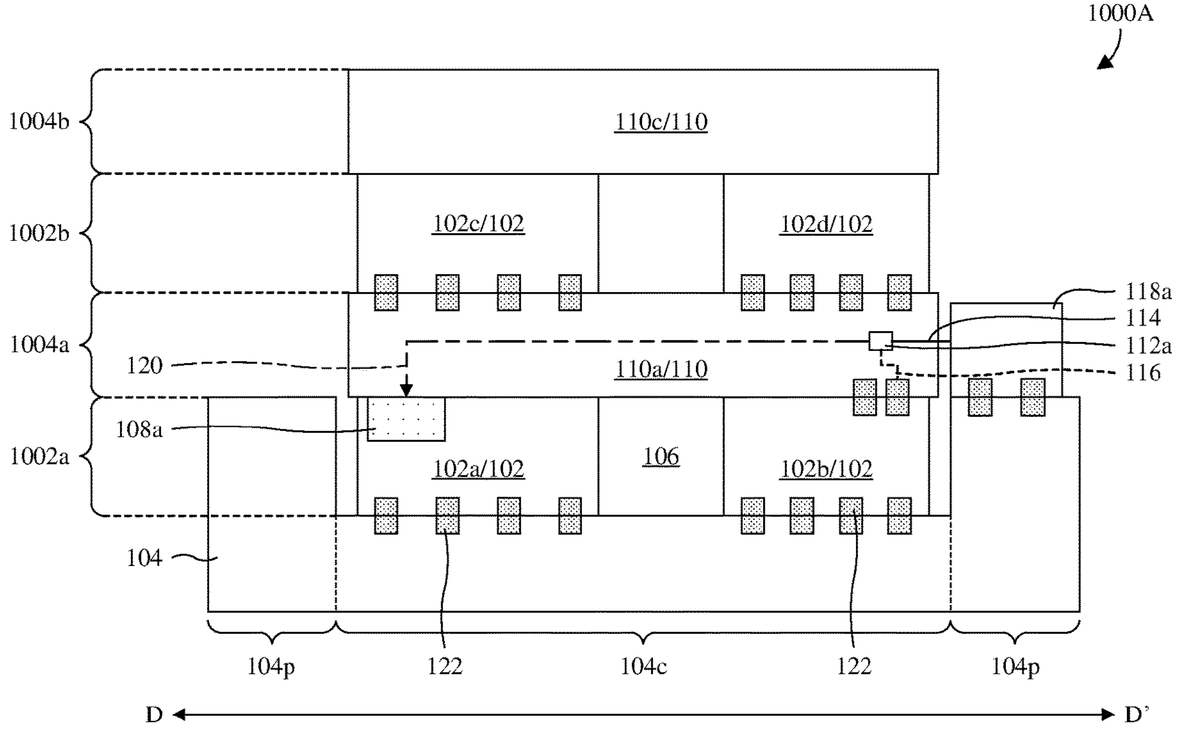
FIGS. 10A and 10B illustrate various cross-sectional views of some alternative embodiments of the semiconductor package of FIG. 1 in which the semiconductor package has multiple IC chip levels and multiple photonic chip levels.
Figure 10B:
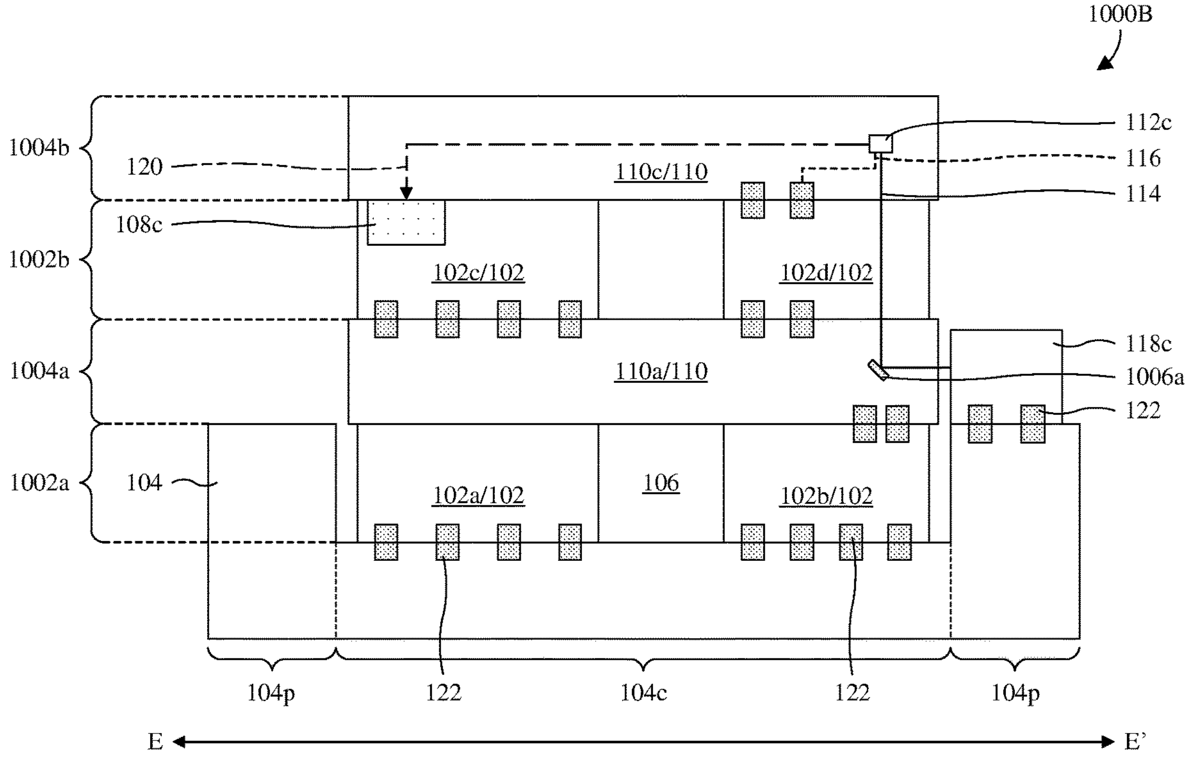

With reference to FIGS. 10A and 10B, various cross-sectional views 1000A, 1000B of some alternative embodiments of the semiconductor package of FIG. 1 are provided in which the semiconductor package has multiple IC chip levels and multiple photonic chip levels. As seen hereafter, the cross-sectional views 1000A, 1000B may for example, extend in parallel and may for example, be separated in a direction extending into and out of the page.

The plurality of IC chips 102 is grouped into a first IC chip level 1002*a* and a second IC chip level 1002*b* overlying the first IC chip level 1002*a*. Further, the plurality of IC chips 102 are grouped, such that each IC chip level comprises a pair of IC chips. The first IC chip level 1002*a* comprises a first level-one IC chip 102*a* and a second level-one IC chip 102*b*, and the second IC chip level 1002*b* comprises a first level-two IC chip 102*c* and a second level-two IC chip 102*d* respectively overlying the first level-one IC chip 102*a* and the second level-one IC chip 102*b*. The first and second level-two IC chips 102*c*, 102*d* may for example, be as the first and second level-one IC chips 102*a*, 102*b* are described.

A plurality of photonic chips 110 is grouped into a first photonic chip level 1004*a* and a second photonic chip level 1004*b* overlying the first photonic chip level 1004*a*. The first photonic chip level 1004*a* comprises a level-one photonic chip 110*a*, whereas the second photonic chip level 1004*b* comprises a level-two photonic chip 110*c*. Further, the first and second photonic chip levels 1004*a*, 1004*b* are alternatingly stacked with the first and second IC chip levels 1002*a*, 1002*b*. Additional photonic and IC chip levels are amenable.

Focusing on the cross-sectional view 1000A of FIG. 10A, the level-one photonic chip 110*a* borders a level-one laser device chip 118*a*, which is configured to generate a laser beam 114 directed towards the level-one photonic chip 110*a*. Further, the level-one photonic chip 110*a* comprises a level-one light modulator 112*a*, as well as a plurality of waveguides and couplers (not illustrated). The level-one light modulator 112*a* is configured to modulate the laser beam 114 into a modulated laser beam 120 in accordance with an electrical signal 116 from the second level-one IC chip 102*b*. The waveguides and couplers are configured to form an input light path guiding the laser beam 114 to an input of the level-one light modulator 112*a* and are further configured to form an output light path guiding the modulated laser beam 120 to a level-one photodetector 108*a* of the first level-one IC chip 102*a*.

Focusing on the cross-sectional view 1000B of FIG. 10B, the level-one photonic chip 110*a* further comprises a reflector 1006*a*. The reflector 1006*a* borders a level-two laser device chip 118*c* and is configured to reflect a laser beam 114 from the level-two laser device chip 118*c* to the level-two photonic chip 110*c*. Note that "level-two" in the name of the level-two laser device chip 118*c* refers to the photonic chip level to which optical power of the level-two laser device chip 118*c* is finally provided and/or at which the optical power is modulated.

The level-two photonic chip 110*c* comprises a level-two light modulator 112*c*, as well as a plurality of waveguides and couplers (not illustrated). The level-two light modulator 112*c* is configured to modulate the laser beam 114 from the reflector 1006*a* respectively into a modulated laser beam 120 in accordance with an electrical signal 116 from the second level-two IC chip 102*d*. The waveguides and couplers are configured to form an input light path guiding the laser beam 114 to an input of the level-two light modulator 112*c* and are further configured to form an output light path guiding the modulated laser beam 120 to a level-two photodetector 108*c* of the first level-two IC chip 102*c*.

Figure 11A:
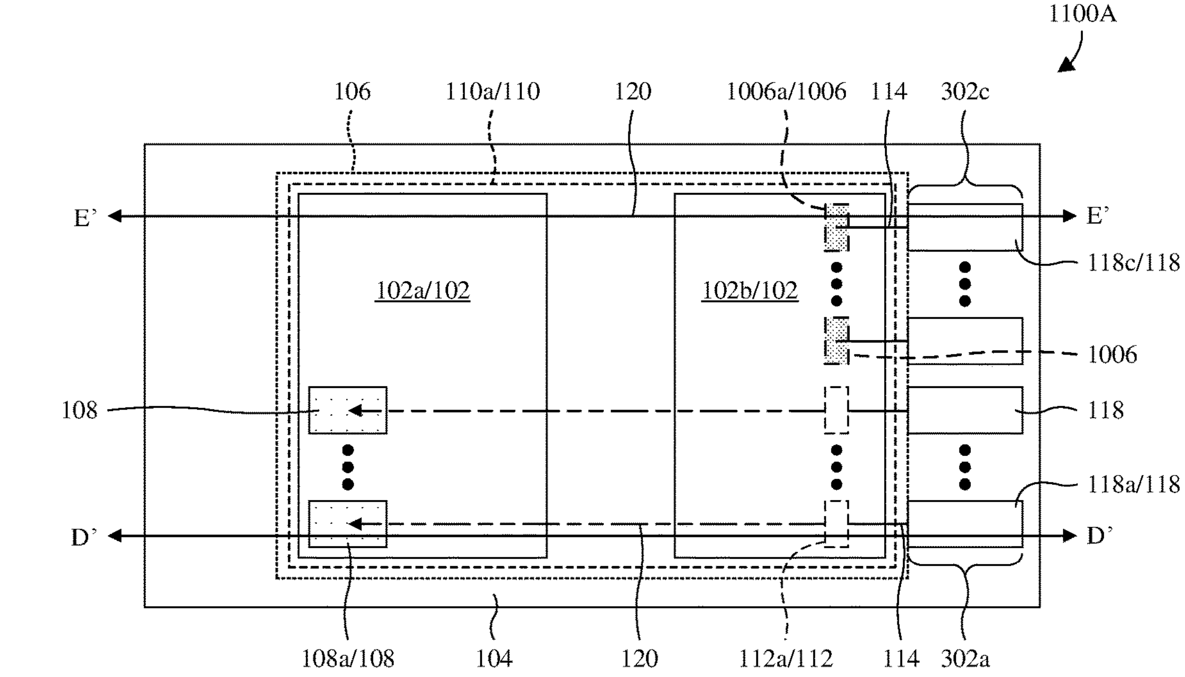
FIGS. 11A and 11B illustrate various top layout views of some embodiments of the semiconductor package of FIGS. 10A and 10B in which the IC chips have one-directional communication.
Figure 11B:
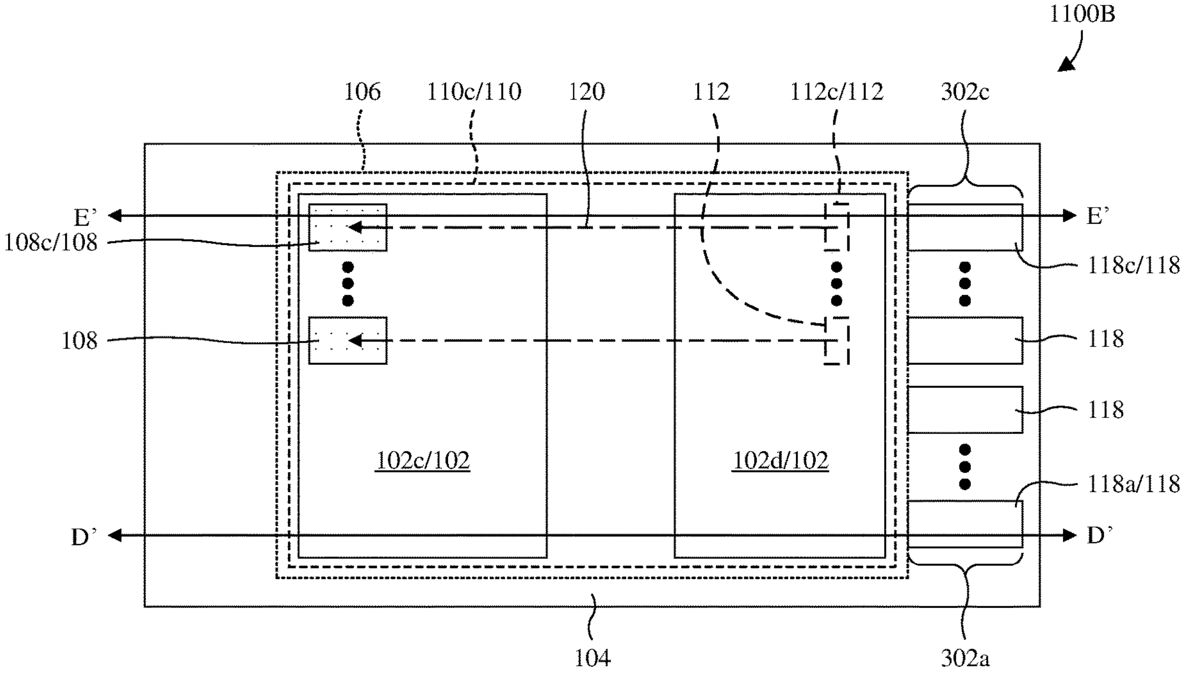

With reference to FIGS. 11A and 11B, various top layout views 1100A, 1100B of some embodiments of the semiconductor package of FIGS. 10A and 10B are provided in which the IC chips 102 have one-directional communication. The cross-sectional view 1000A of FIG. 10A may for example, be taken along line D-D' or along some other suitable line, and/or the cross-sectional view 1000B of FIG. 10B may for example, be taken along line E-E' or along some other suitable line. As seen and described hereafter, FIG. 11A is a directed towards a level of the first and second level-one IC chips 102*a*, 102*b*, whereas FIG. 11B is directed towards a level of the first and second level-two IC chips 102*c*, 102*d*.

Focusing on the top layout view 1100A of FIG. 11A, a plurality of laser device chips 118 are grouped into a level-one group 302*a* and a level-two group 302*c*, both bordering the level-one photonic chip 110*a* on a common side of the recess 106. Similar to the level-two laser device chip 118*c*, "level-two" in the name of the level-two group

302*c* refers to the photonic chip level to which optical power of the level-two group 302*c* is finally provided and/or at which the optical power is modulated. The laser device chips 118 of the level-one group 302*a* are each as the level-one laser device chip 118*a* is described above, and the laser device chips 118 of the level-two group 302*c* are each as the level-two laser device chip 118*c* is described above. Hence, the laser device chips 118 of the level-one and level-two groups 302*a*, 302*c* are configured to generate laser beams 114 directed towards the first level-one photonic chip 110*a*.

The level-one photonic chip 110*a* comprises a plurality of light modulators 112 corresponding to the laser device chips 118 of the level-one group 302*a*, and further comprises a plurality of reflectors 1006 corresponding to the laser device chips 118 of the level-two group 302*c*. In some embodiments, there is a one-to-one correspondence between the laser device chips 118 of the level-one group 302*a* and the light modulators 112 of the level-one photonic chip 110*a*. In some embodiments, there is a one-to-one correspondence between the laser device chips 118 of the level-two group 302*c* and the reflectors 1006. Further, the level-one photonic chip 110*a* comprises a plurality of waveguides and/or couplers (not shown).

The light modulators 112 of the level-one photonic chip 110*a* are configured to modulate corresponding laser beams 114 from the level-one group 302*a* in accordance with electrical signals from the second level-one IC chip 102*b*. Further, the waveguides and/or couplers of the level-one photonic chip 110*a* are configured to guide the laser beams 114 from the level-one group 302*a* to the light modulators 112 of the level-one photonic chip 110*a* and/or to guide the modulated laser beams 120 from the light modulators 112 to corresponding photodetectors 108 of the first level-one IC chip 102*a*.

The reflectors 1006 are configured to reflect corresponding laser beams 114 from the level-two group 302*c* towards the level-two photonic chip 110*c*. Further, the waveguides and/or couplers of the level-one photonic chip 110*a* are configured to guide the laser beams 114 from the level-two group 302*c* to the reflectors 1006 and/or to guide the laser beams 114 after reflection from the reflectors 1006 to the level-two photonic chip 110*c*.

Focusing on the top layout view 1100B of FIG. 11B, the level-two photonic chip 110*c* comprises a plurality of light modulators 112 corresponding to the reflectors 1006 of the level-one photonic chip 110*a*. In some embodiments, there is a one-to-one correspondence between the light modulators 112 of the level-two photonic chip 110*c* and the reflectors 1006. Further, the level-two photonic chip 110*c* comprises a plurality of waveguides and/or couplers (not shown) similar to the level-one photonic chip 110*a*.

The light modulators 112 of the level-two photonic chip 110*c* are configured to modulate corresponding laser beams 114 from the level-two group 302*c* in accordance with electrical signals from the second level-two IC chip 102*d*. Further, the waveguides and/or couplers of the level-two photonic chip 110*c* are configured to guide the laser beams 114 from the level-two group 302*c* to the light modulators 112 of the level-two photonic chip 110*c* and/or to guide the modulated laser beams 120 from the light modulators 112 to corresponding photodetectors 108 of the first level-two IC chip 102*c*.

Figure 12A:
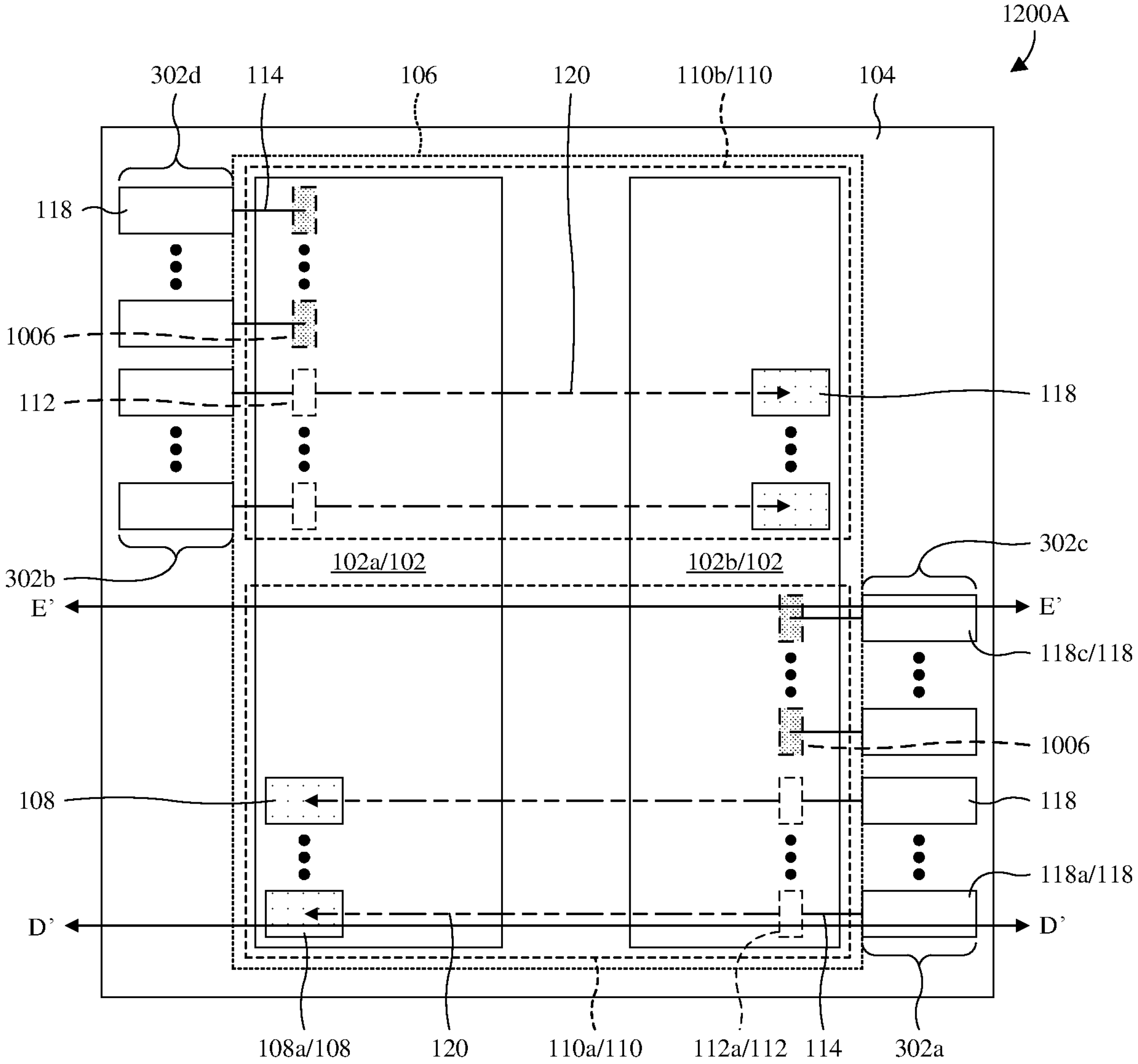
FIGS. 12A and 12B illustrate various top layout views of some embodiments of the semiconductor package of FIGS. 10A and 10B in which the IC chips have two-directional communication.
Figure 12B:
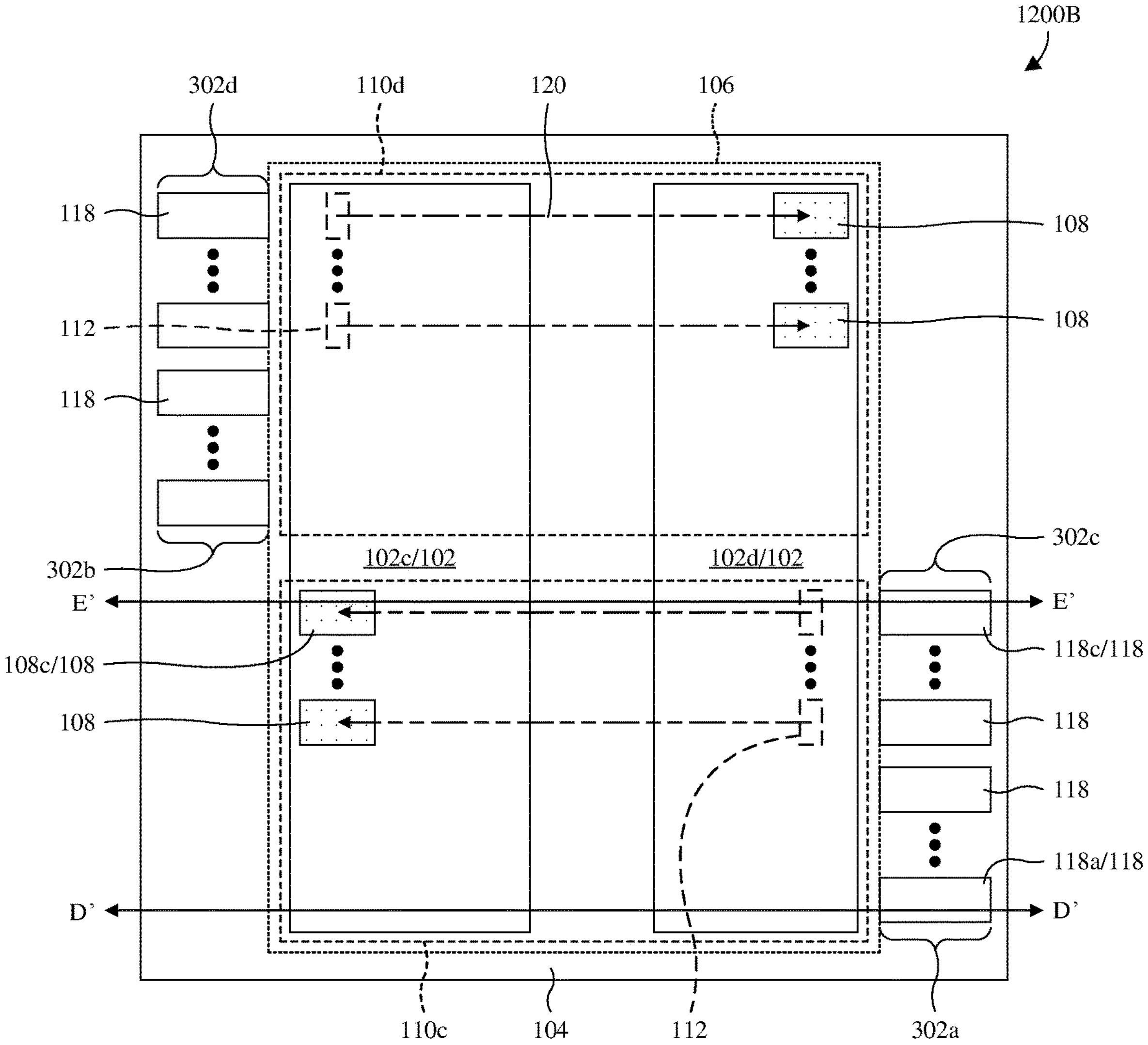

With reference to FIGS. 12A and 12B, various top layout views 1200A, 1200B of some embodiments of the semiconductor package of FIGS. 10A and 10B are provided in which the IC chips 102 have two-directional communication. The cross-sectional view 1000A of FIG. 10A may for example, be taken along line D-D' or along some other suitable line, and/or the cross-sectional view 1000B of FIG. 10B may for example, be taken along line E-E' or along some other suitable line. As seen and described hereafter, FIG. 12A is a directed towards a level of the first and second level-one IC chips 102*a*, 102*b*, whereas FIG. 12B is directed towards a level of the first and second level-two IC chips 102*c*, 102*d*. Further, as seen and described hereafter, the structure of FIGS. 11A and 11B is replicated for each communication direction, thereby allowing two-directional communication.

Focusing on the top layout view 1200A of FIG. 12A, the plurality of laser device chips 118 are further grouped into a second level-one group 302*b* and a second level-two group 302*d*. The first level-one group 302*a* and the first level-two group 302*c* border the second level-one IC chip 102*b*, as well as the first level-one photonic chip 110*a*, on a first side of the recess 106. Further, the second level-one group 302*b* and the second level-two group 302*d* border the first level-one IC chip 102*a*, as well as a second level-one photonic chip 110*b*, on a second side of the recess 106 that is opposite the first side.

The first photonic chip level 1004*a* (see, e.g., FIGS. 10A and 10B) comprises the second level-one photonic chip 110*b*, and the second level-one photonic chip 110*b* is as the first level-one photonic chip 110*a* is described. Hence, the second level-one photonic chip 110*b* comprises a plurality of light modulators 112 corresponding to the laser device chips 118 of the second level-one group 302*b*, and further comprises a plurality of reflectors 1006 corresponding to the laser device chips 118 of the second level-two group 302*d*. The light modulators 112 of the second level-one photonic chip 110*b* are configured to modulate corresponding laser beams 114 from the second level-one group 302*b* in accordance with electrical signals from the first level-one IC chip 102*a*. The reflectors 1006 of the second level-one photonic chip 110*b* are configured to reflect corresponding laser beams 114 from the second level-two group 302*d* towards a second level-two photonic chip 110*d* (see, e.g., FIG. 12B).

Focusing on the top layout view 1200B of FIG. 12B, the second photonic chip level 1004*b* (see, e.g., FIGS. 10A and 10B) further comprises the second level-two photonic chip 110*d*. The second level-two photonic chip 110*d* is as the first level-two photonic chip 110*c* is described. Hence, the second level-two photonic chip 110*d* comprises a plurality of light modulators 112 corresponding to the reflectors 1006 of the second level-one photonic chip 110*b*. The light modulators 112 of the second level-two photonic chip 110*d* are configured to modulate corresponding laser beams 114 from the second level-two group 302*d* in accordance with electrical signals from the first level-two IC chip 102*c*.

Figure 13A:
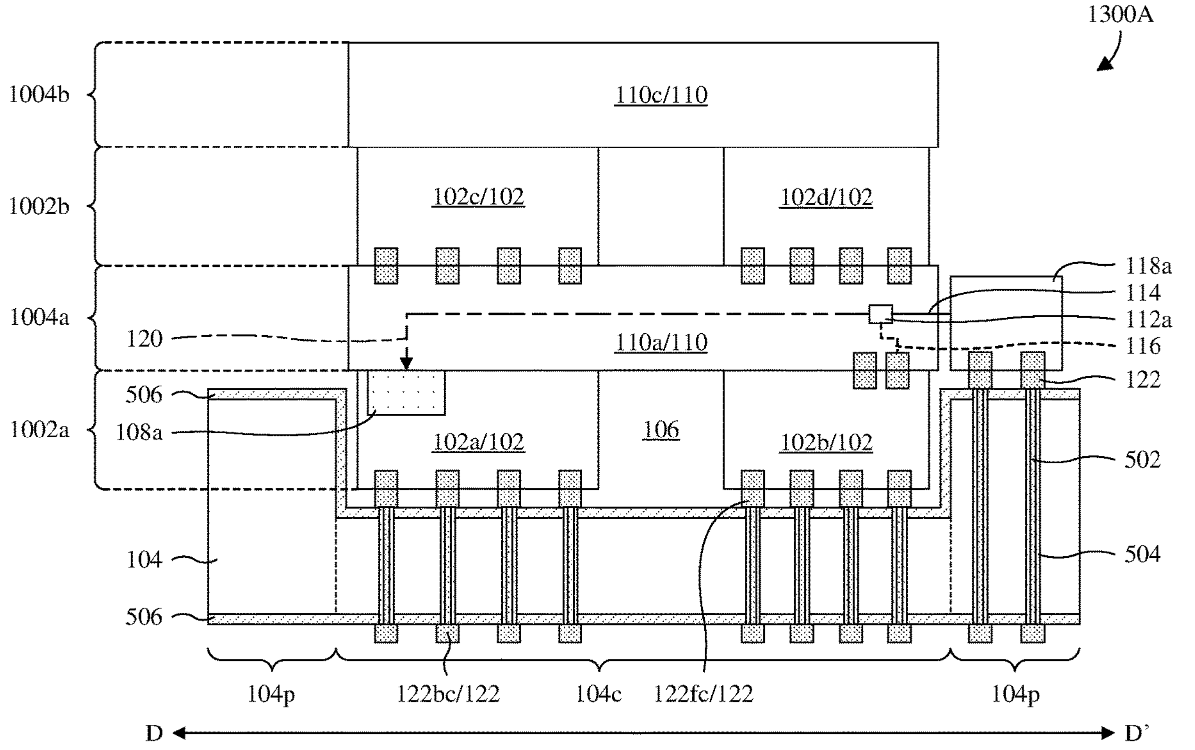
FIGS. 13A and 13B illustrate cross-sectional views of some embodiments of the semiconductor package of FIGS. 10A and 10B in which TSVs extend through a carrier substrate.
Figure 13B:
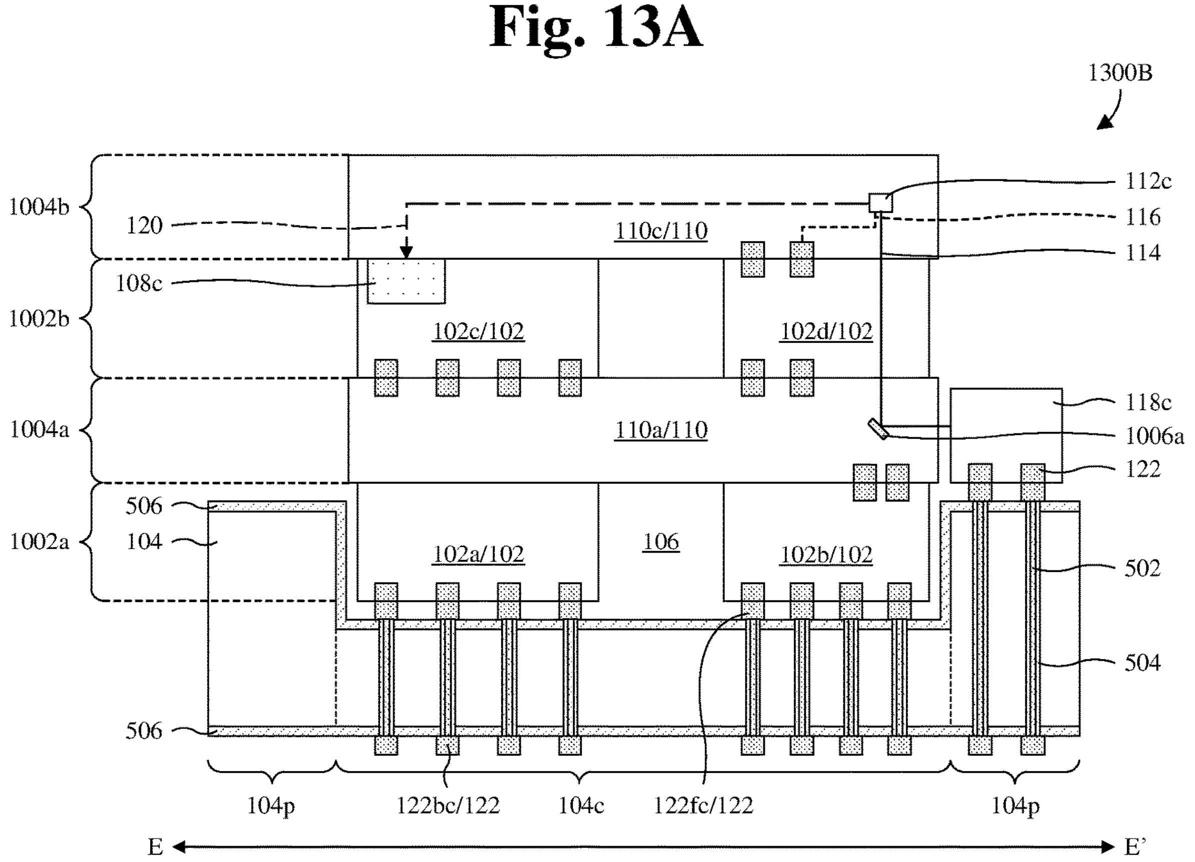

With reference to FIGS. 13A and 13B, cross-sectional views 1300A, 1300B of some embodiments of the semiconductor package of FIGS. 10A and 10B are provided in which TSVs 502 extend through the carrier substrate 104 as described with regard to FIG. 5.

Figure 14:
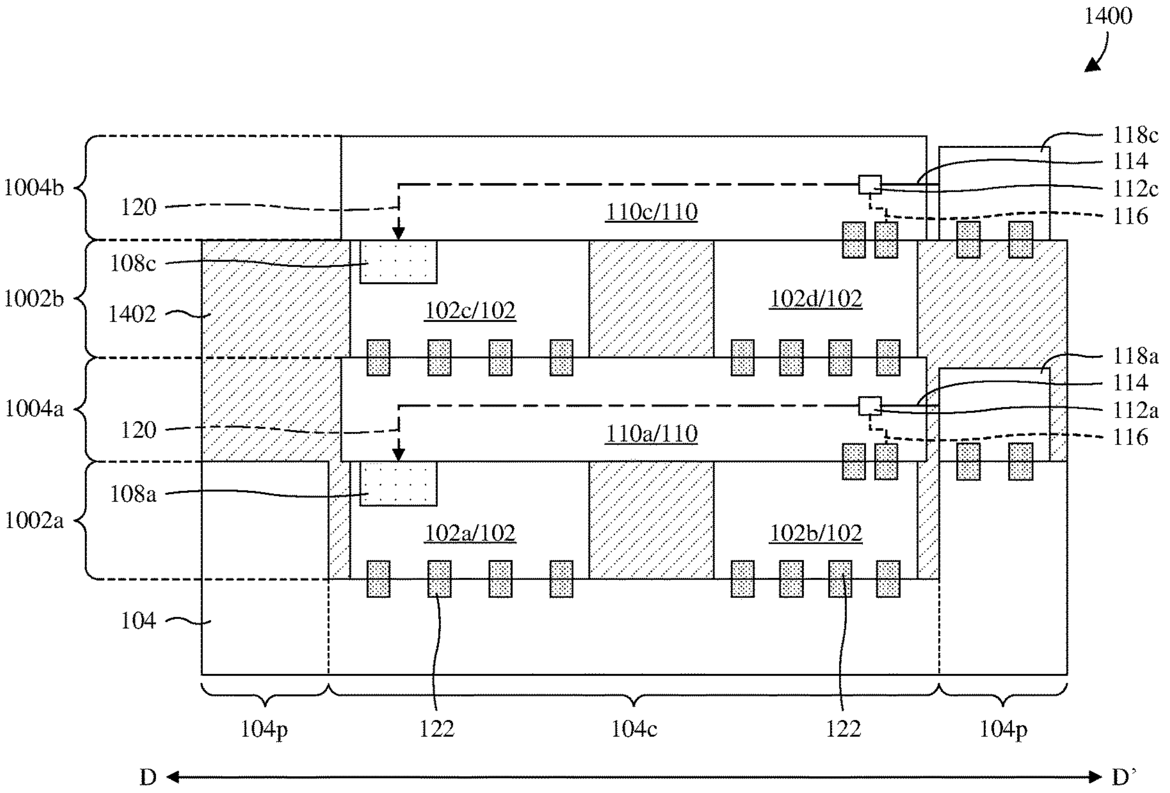
FIG. 14 illustrates a cross-sectional view of some alternative embodiments of the semiconductor package of FIGS. 10A and 10B in which the semiconductor package has multiple laser device chip levels.

With reference to FIG. 14, a cross-sectional view 1400 of some alternative embodiments of the semiconductor package of FIGS. 10A and 10B is provided in which the semiconductor package has multiple laser device chip levels. In particular, the level-two laser device chip 118*c* is at the second photonic chip level 1004*b*. As such, the reflector 1006*a* (see, e.g., FIG. 10B) may be omitted and the level-two laser device chip 118*c* overlies the level-one laser device chip 118*a*. Additionally, a dielectric layer 1402 fills gaps in the recess 106 (see, e.g., FIGS. 10A and 10B) and around the IC chips 102, and further accommodates conductive features (not shown) leading from the pads 122 at the level-two laser device chip 118$c$ to electrically couple those pads 122 to other devices and/or structures. The additional conductive features may for example, include wires, vias, and so on.

Figure 15A:
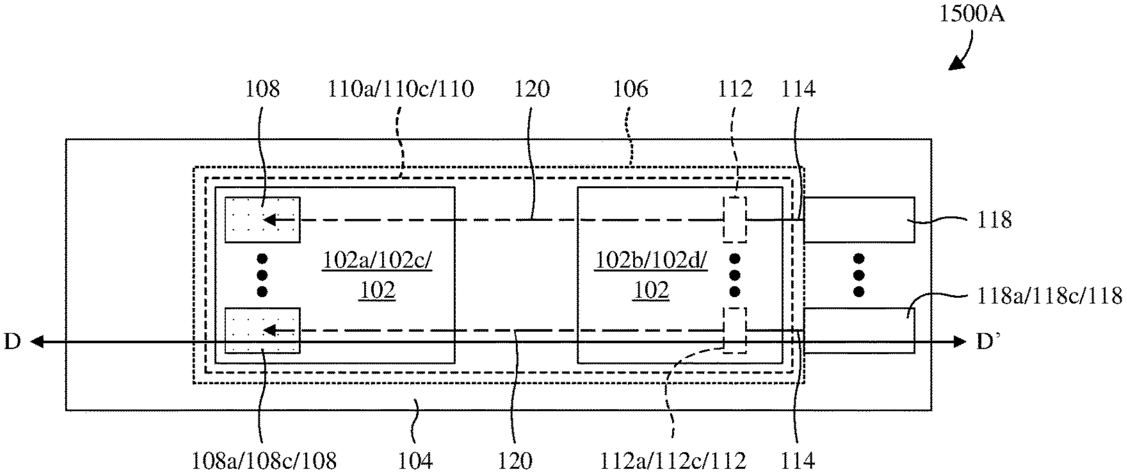
FIGS. 15A and 15B illustrate various top layout views of some embodiments of the semiconductor package of FIG. 14 in which the IC chips respectively have one-directional communication and two-directional communication.
Figure 15B:
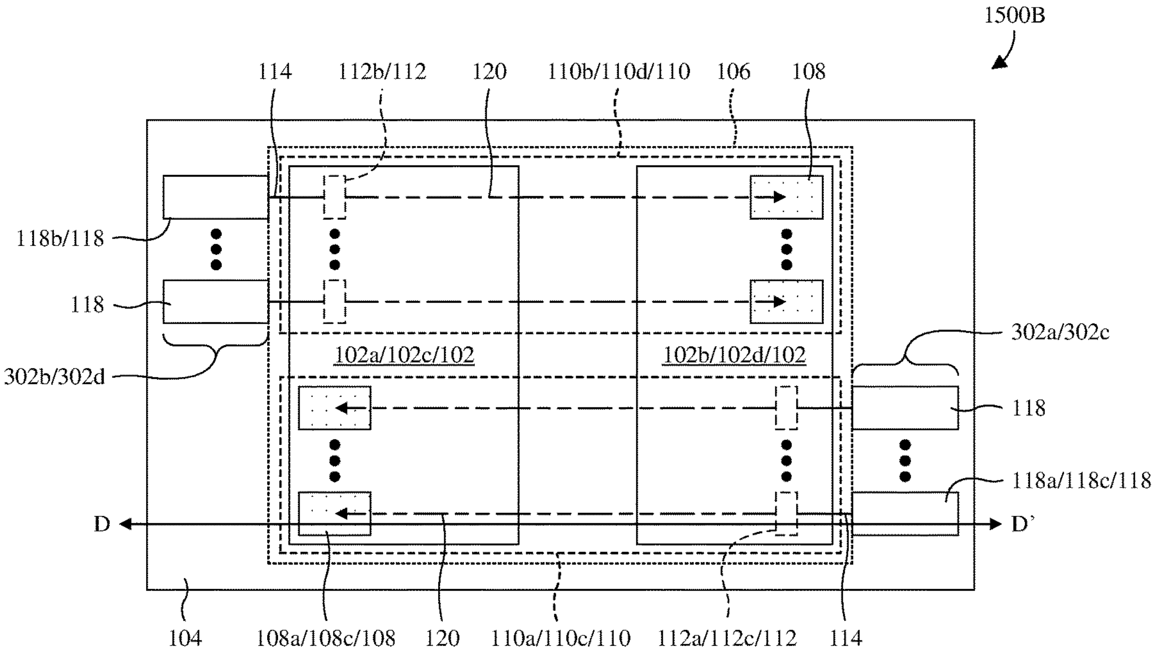

With reference to FIGS. 15A and 15B, various top layout views 1500A, 1500B of some embodiments of the semiconductor package of FIG. 14 are provided in which the IC chips 102 respectively have one-directional communication and two-directional communication. FIG. 15A focuses on one-directional communication, whereas FIG. 15B focuses on two-directional communication. The cross-sectional view 1400 of FIG. 14 may, for example, be taken along line D-D' or along some other suitable line.

Focusing on the top layout view 1500A of FIG. 15A, FIG. 2A is representative of each IC chip level, including the first IC chip level 1002$a$ and the second IC chip level 1002$b$, and FIG. 2B is representative of each photonic chip level, including the first photonic chip level 1004$a$ and the second photonic chip level 1004$b$. Focusing on the top layout view 1500B of FIG. 15B, FIG. 3A is representative of each IC chip level, including the first IC chip level 1002$a$ and the second IC chip level 1002$b$, and FIG. 3B is representative of each photonic chip level, including the first photonic chip level 1004$a$ and the second photonic chip level 1004$b$.

Figure 16:
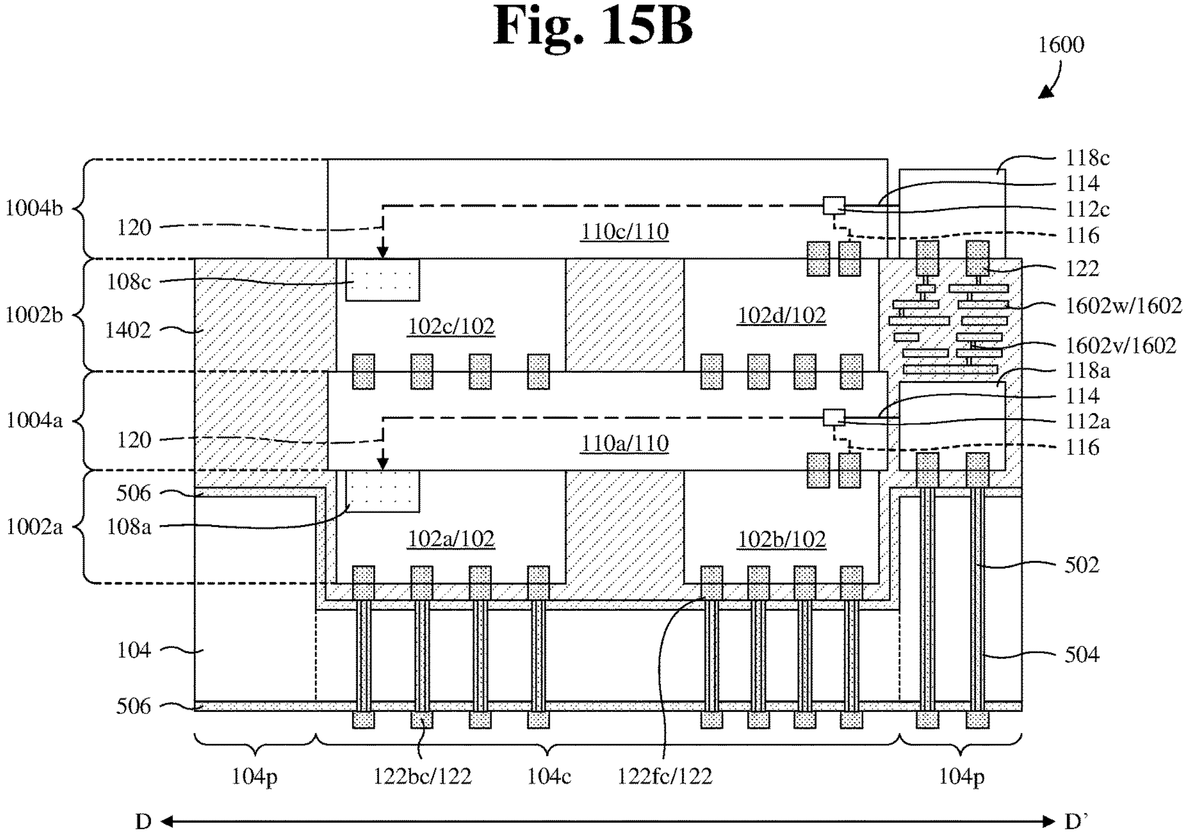
FIG. 16 illustrates a cross-sectional view of some embodiments of the semiconductor package of FIG. 14 in which TSVs extend through a carrier substrate.

With reference to FIG. 16, a cross-sectional view 1600 of some embodiments of the semiconductor package of FIG. 14 is provided in which TSVs 502 extend through the carrier substrate 104 as described with regard to FIG. 5. Further, the dielectric layer 1402 accommodates a plurality of conductive features 1602. The conductive features 1602 are stacked to form an interconnect structure electrically coupling the pads 122 at the level-two laser device chip 118$c$ to other devices and/or structures. The conductive features 1602 may 1602 may, for example, include wires 1602$w$, vias 1602$v$, contacts, and so on.

While the embodiments of the semiconductor package in FIGS. 10A to 16 illustrate two IC chip levels and two photonic chip levels, more IC chip level and more photonic chip levels are amenable. For example, there may be N number of IC chip level and N number of photonic chip levels alternatingly stacked, where N is an integer greater than two. In such alternative embodiments, the semiconductor package comprises additional groups of laser device chips corresponding to the additional photonic chip levels. To the extent that these alternative embodiments correspond to FIGS. 10A to 13B, photonic chips at a bottommost level comprise additional reflectors to reflect laser beams to overlying photonic chips. To the extent that these alternative embodiments correspond to FIGS. 14 to 16, the semiconductor package comprises additional laser device chip levels for a total of N laser device chip levels.

The present disclosure has thus far focused on general layouts for the semiconductor packages. However, as may be appreciated, challenges may arise from aligning and bonding constituents of the semiconductor packages together. For example, tolerances in X, Y, and Z dimensions of a cartesian coordinate system may be small when aligning an output of a laser device chip (e.g., the laser device chip 118$a$ of FIG. 1) to an input of a corresponding photonic chip (e.g., the photonic chip 110$a$ of FIG. 1). Such small tolerances may for example, be about +/−1 micrometer or the like. Difficulty aligning and bonding constituents of the semiconductor packages together may reduce yields, increase costs, and so on.

The present disclosure further provides alignment features and methods for simultaneously aligning and bonding constituents of a semiconductor package together. As seen hereafter, the alignment features and methods may for example, improve alignment accuracy, alignment speed, increase yields, reduce costs, and so on. The semiconductor package may for example, be a semiconductor package according to any of the embodiments described with regard to FIGS. 1 to 16. As seen hereafter, the alignment features may for example, include openings and/or protrusions.

The alignment features and methods may for example, be employed to simultaneously align and bond a laser device chip (e.g., the laser device chip 118$a$ of FIG. 1) to a corresponding carrier substrate (e.g., the carrier substrate 104 of FIG. 1). As another example, the alignment features and methods may for example, be employed to simultaneously align and bond a photonic chip (e.g., the photonic chip 110$a$ of FIG. 1) to corresponding IC chips (e.g., the first and second IC chips 102$a$, 102$b$ of FIG. 1). As yet another example, the alignment features and methods may for example, be employed to simultaneously align and bond IC chips (e.g., first and second level-two IC chips 102$c$, 102$d$ of FIGS. 10A and 10B) to a corresponding photonic chip (e.g., the level-one photonic chip 110$a$ of FIGS. 10A and 10B).

With reference to FIGS. 17A, 17B, 18A, 18B, and 19-21, a series of cross-sectional and top views of some embodiments of a method for simultaneously aligning and bonding a chip 1802 to a substrate 1702 is provided. Figures labeled with a suffix of A or with no suffix letter correspond to cross-sectional views, whereas figures labeled with a suffix of B correspond to top layout views for like numbered figures labeled with a suffix of A. Further, figures labeled with a suffix of A may be taken along line F-F' or line G-G' (whichever is present) in like numbered figures labeled with a suffix of B.

Figure 17A:
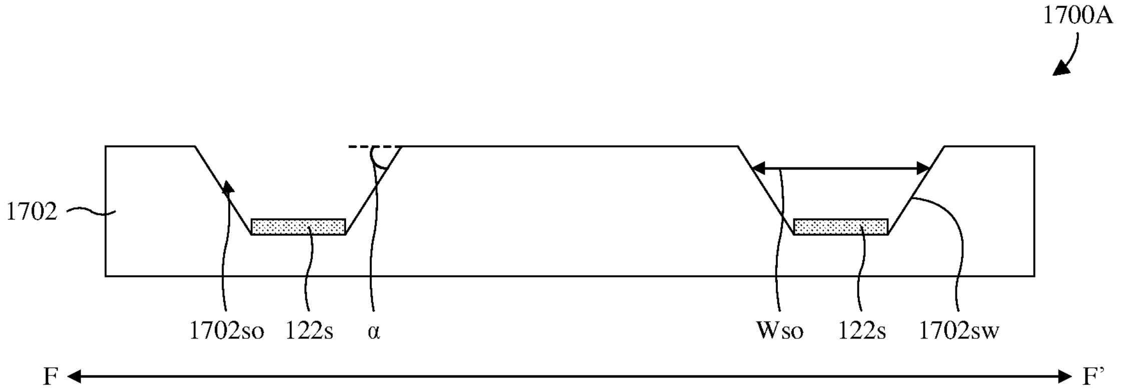
FIGS. 17A, 17B, 18A, 18B, and 19-21 illustrate a series of views of some embodiments of a method for simultaneously aligning and bonding a chip to a substrate.
Figure 17B:
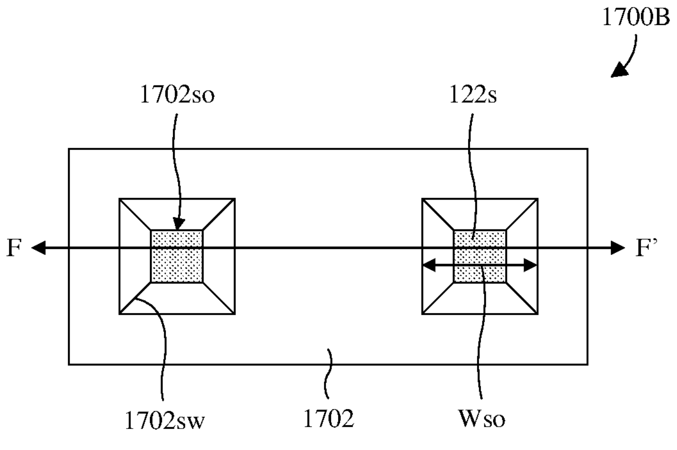

Focusing on a cross-sectional view 1700A of FIG. 17A, and a top layout view 1700B of FIG. 17B, the substrate 1702 is provided or otherwise formed. In some embodiments, the substrate 1702 is a carrier substrate 104, an IC chip (e.g., 102, 102$a$, 102$b$, 102$c$, or 102$d$), or a photonic chip (e.g., 110, 110$a$, 110$b$, 110$c$, 110$d$) in any of the semiconductor packages described above. In alternative embodiments, the substrate 1702 is some other structure to which the chip 1802 hereafter described may be bonded.

A top of the substrate 1702 has a plurality of substrate openings 1702$so$, which accommodate a plurality of substrate pads 122$s$ respectively at bottoms of the substrate openings 1702$so$. The substrate openings 1702$so$ have individual widths Wso that decrease from a top surface of the substrate 1702 to bottoms of the substrate openings 1702$so$. In other words, the substrate openings 1702$so$ have profiles with an inverse taper or the like. Further, the substrate openings 1702$so$ have square top geometries. In alternative embodiments, the substrate openings 1702$so$ have other suitable top geometries and/or profiles. The substrate openings 1702$so$ may for example, be formed by wet or dry etching the substrate 1702. In some embodiments, the widths Wso are about 50 micrometers, about 40-70 micrometers, about 40-55 micrometers, or about 55-70 micrometers at tops of the substrate openings 1702$so$. However, other suitable values are amenable in alternative embodiments.

Because the widths Wso of the substrate openings 1702$so$ decrease from top to bottom, sidewalls 1702$sw$ of the substrate 1702 in the substrate openings 1702$so$ are angled and form an angle $\alpha$ relative with a top surface of the substrate 1702. In some embodiments, the angle $\alpha$ is about 54.74 degrees, about 40-70 degrees, about 40-55 degrees, or about 55-70 degrees. Other suitable values are, however, amenable in alternative embodiments. Further, the sidewalls

1702*sw* extend outward away from corresponding substrate pads 122*s* to the top surface of the substrate 1702.

Figure 18A:
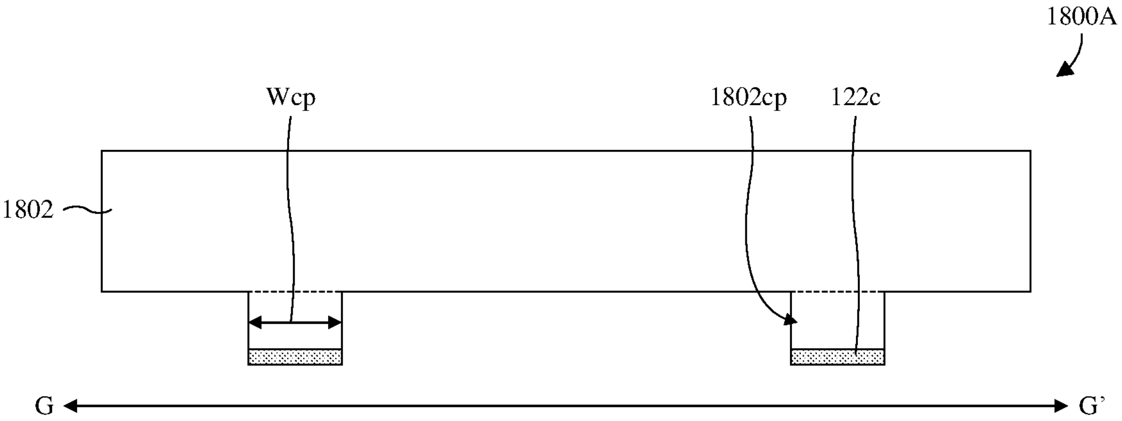
Figure 18B:
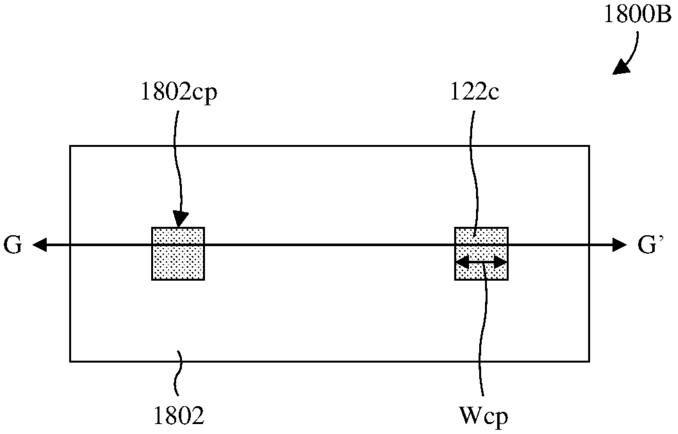

Focusing on a cross-sectional view 1800A of FIG. 18A, and a top layout view 1800B of FIG. 18B, the chip 1802 is provided or otherwise formed. In some embodiments, the chip 1802 is a laser device chip (e.g., 118, 118*a*, 118*b*, or 118*c*), a photonic chip (e.g., 110, 110*a*, 110*b*, 110*c*, or 110*d*), or an IC chip (e.g., 102, 102*a*, 102*b*, 102*c*, or 102*d*) in any of the semiconductor packages described above. In alternative embodiments, the chip 1802 is some other structure to be bonded to the substrate 1702.

A bottom of the chip 1802 has a plurality of chip protrusions 1802*cp* corresponding to the substrate openings 1702*so* of FIGS. 17A and 17B. In some embodiments, the chip protrusions 1802*cp* correspond to the substrate openings 1702*so* with a one-to-one correspondence. The chip protrusions 1802*cp* accommodate a plurality of chip pads 122*c* respectively at bottoms or ends of the chip protrusions 1802*cp*, and have lesser widths Wcp than the widths Wso of the substrate openings 1702*so*. Further, the chip protrusions have rectangular profiles and square top geometries, the latter of which are the same or substantially the same as top geometries of the chip pads 122*c*. In alternative embodiments, the chip protrusions 1802*cp* have wedge shaped profiles or some other suitable profiles, and/or have some other suitable top geometries. In some embodiments, the chip protrusions 1802*cp* and the chip pads 122*c* have a same size and/or a same top geometry as the substrate pads 122*s*.

Figure 19:
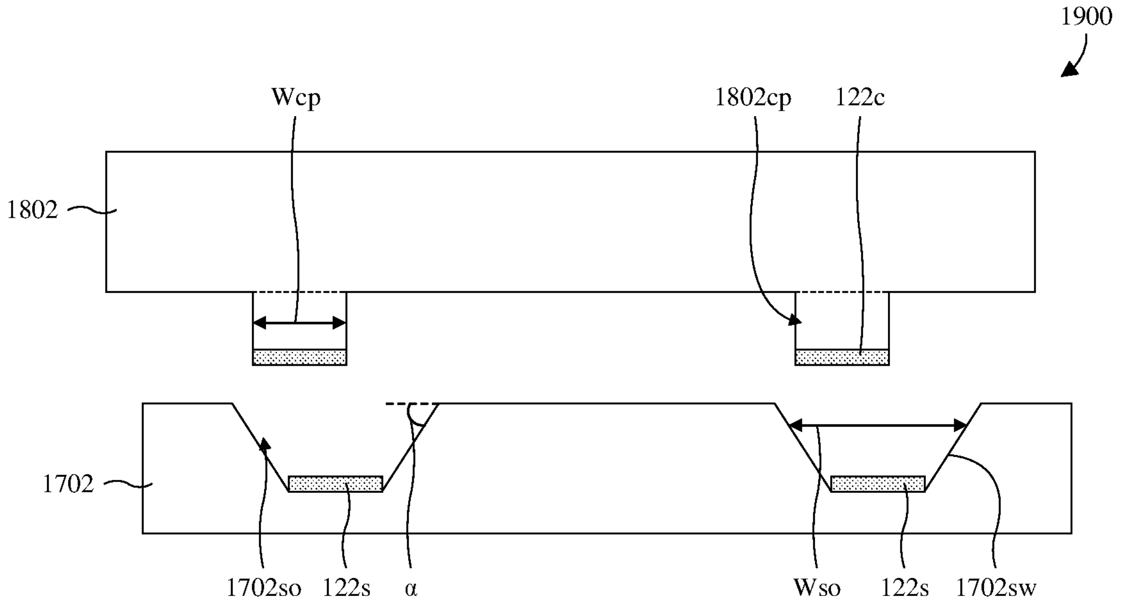

Focusing on a cross-sectional view 1900 of FIG. 19, the chip 1802 of FIGS. 18A and 18B is arranged over the substrate 1702 of FIGS. 17A and 17B, such that a bottom of the chip 1802 faces a top of the substrate 1702. Further, the chip 1802 and the substrate 1702 are coarsely aligned, such that the chip protrusions 1802*cp* and the chip pads 122*c* respectively overlie the substrate openings 1702*so*. Because the substrate openings 1702*so* are wider at tops than at bottoms, such coarse alignment may be easier than it would otherwise be if top widths of the substrate openings 1702*so* were the same as bottom widths of the substrate openings 1702*so*.

Figure 20:
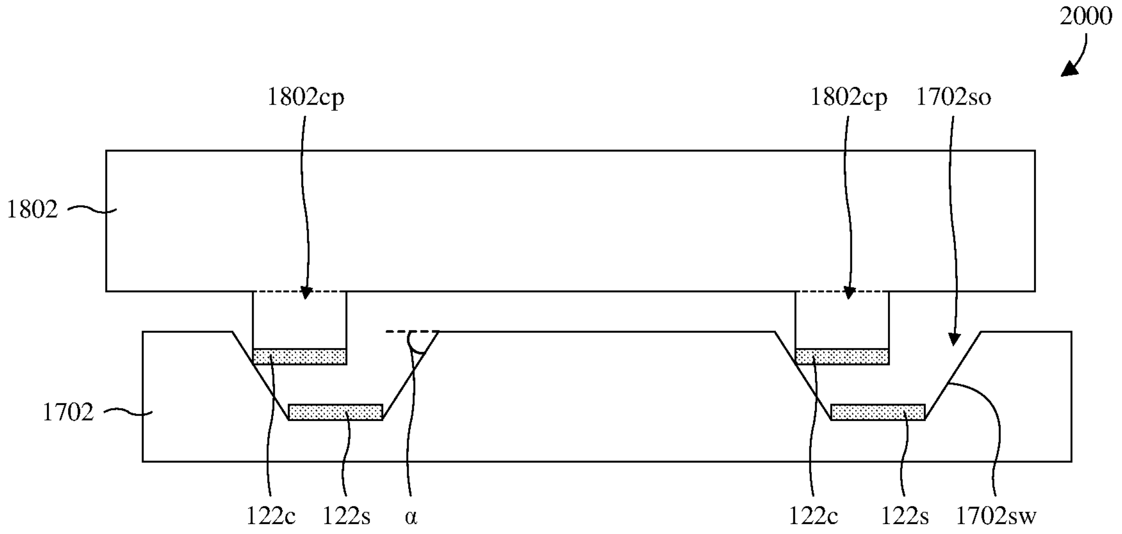

Focusing on a cross-sectional view 2000 of FIG. 20, the chip 1802 is lowered, such that that the chip protrusions 1802*cp* and the chip pads 122*c* enter the corresponding substrate openings 1702*so* of the substrate 1702. Further, the chip pads 122*c* come into contact with the sidewalls 1702*sw* of the substrate 1702.

Figure 21:
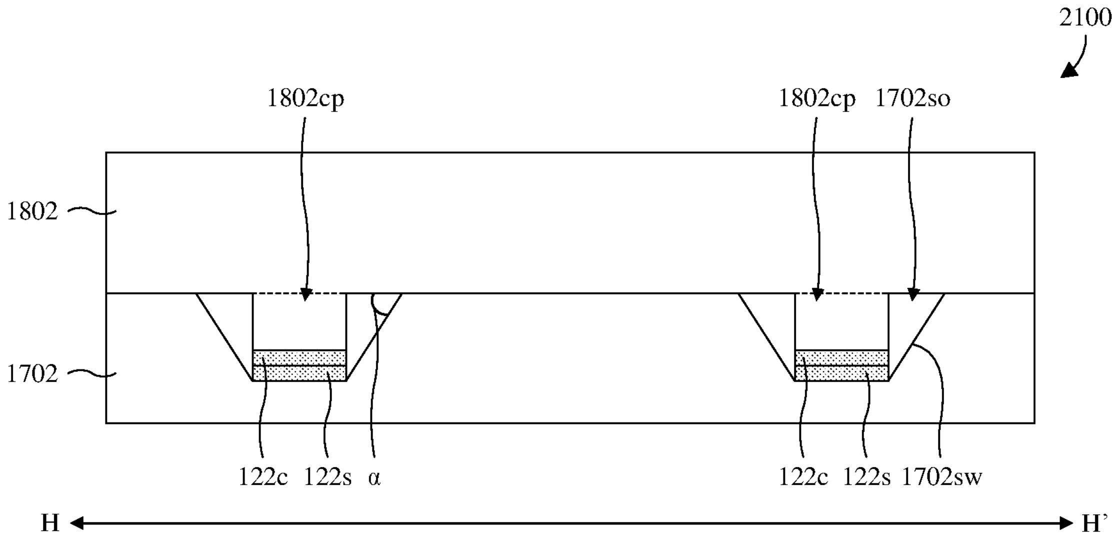

Focusing on a cross-sectional view 2100 of FIG. 21, the slant of the sidewalls 1702*sw* of the substrate 1702 is used to guide the chip pads 122*c* into fine alignment and direct contact with the substrate pads 122*s*. For example, the chip 1802 may be laterally moved in the direction that allows the chip 1802 to continue being lowered until the substrate and chip pads 122*s*, 122*c* are in direct contact. Accordingly, the slant of the sidewalls 1702*sw* facilitate aligning the chip 1802 to the substrate 1702 while simultaneously bonding and electrically coupling the chip 1802 to the substrate 1702. In some embodiments, after the substrate and chip pads 122*s*, 122*c* are into direct contact, an annealing process and/or some other suitable process may be performed to strengthen the bond between the substrate and chip pads 122*s*, 122*c*.

Figure 22A:
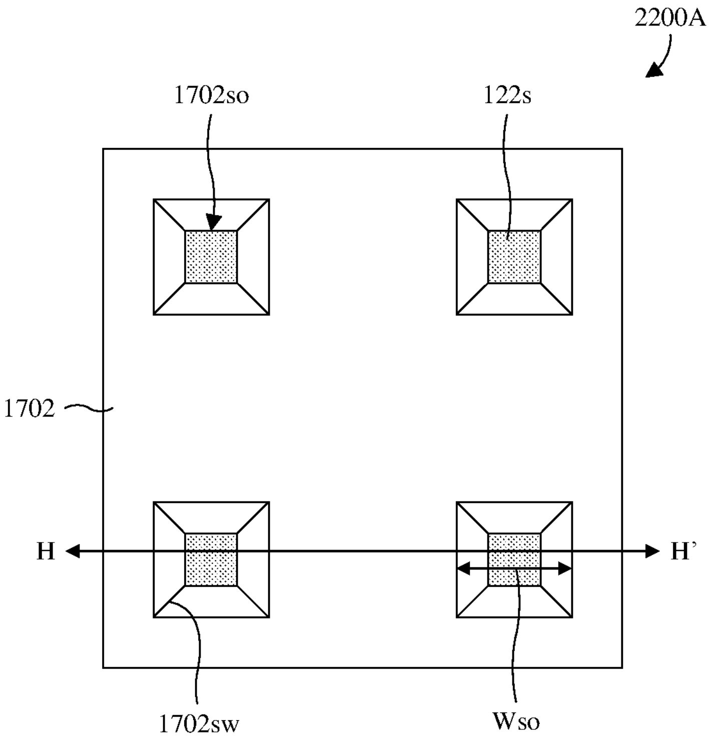
FIGS. 22A and 22B illustrate various top layout views of some alternative embodiments of the substrate and the chip at FIGS. 17A, 17B, 18A, 18B, and 19-21.
Figure 22B:
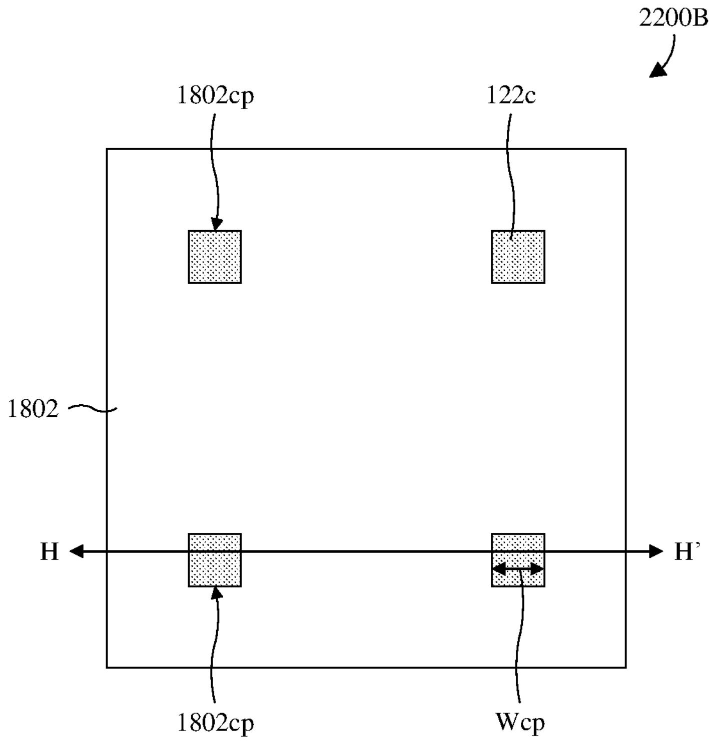

With reference to FIGS. 22A and 22B, various top layout views 2200A, 2200B of some alternative embodiments of the substrate 1702 and the chip 1802 at FIGS. 17A, 17B, 18A, 18B, and 19-21 are provided in which the substrate 1702 has additional substrate openings 1702*so* and the chip 1802 has additional chip protrusions 1802*cp* corresponding to the additional substrate openings 1702*so*. FIG. 22A corresponds to the substrate 1702, whereas FIG. 22B corresponds to the chip 1802. Further, the cross-sectional view 2100 of FIG. 21 may, for example, be taken along line H-H' in FIGS. 22A and 22B.

With reference to FIGS. 23A, 23B, 24A, 24B, 25, 26, 27A, 27B, 28, and 29, a series of cross-sectional and top views of some alternative embodiments of the method of FIGS. 17A, 17B, 18A, 18B, and 19-21 is provided in which the substrate openings 1702*so* have stepped profiles (see, e.g., cross-sectional views hereafter described) and stepped top geometries (see, e.g., top layout views hereafter described). Figures labeled with a suffix of A or with no suffix letter correspond to cross-sectional views, whereas figures labeled with a suffix of B correspond to top layout views for like numbered figures labeled with a suffix of A. Further, figures labeled with a suffix of A may be taken along line I-I', line J-J', or line K-K' (whichever is present) in like numbered figures labeled with a suffix of B.

Figure 23A:
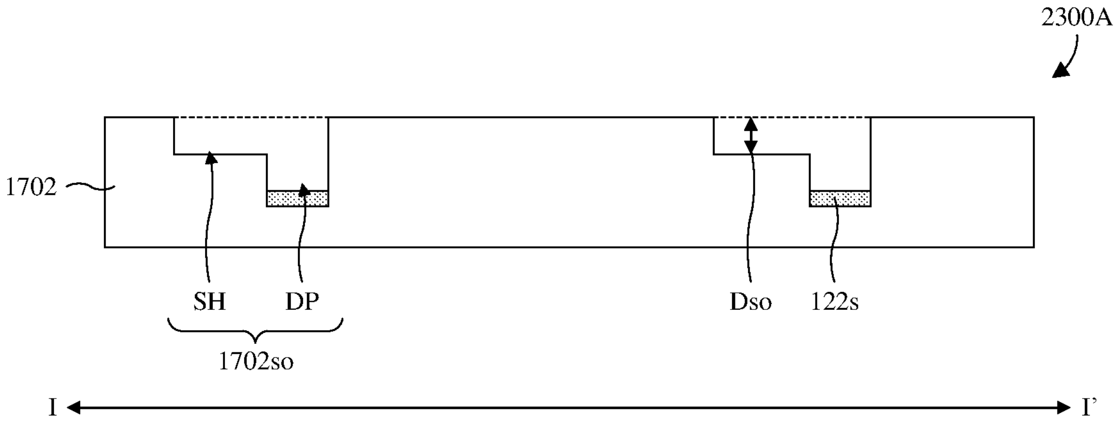
FIGS. 23A, 23B, 24A, 24B, 25, 26, 27A, 27B, 28, and 29 illustrate a series of views of some alternative embodiments of the method of FIGS. 17A, 17B, 18A, 18B, and 19-21 in which substrate openings have stepped profiles and stepped top geometries.
Figure 23B:
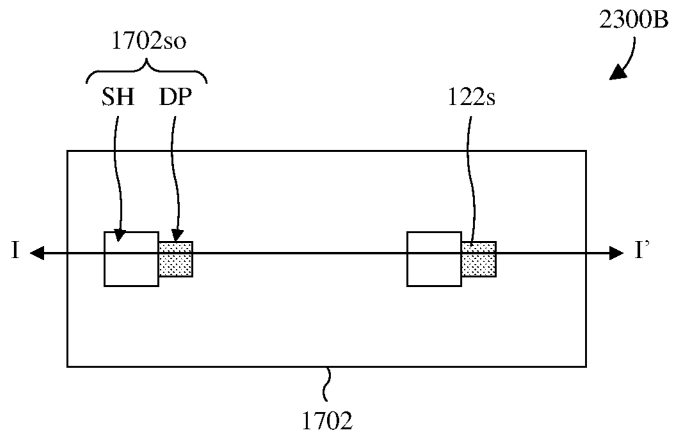

Focusing on a cross-sectional view 2300A of FIG. 23A, and a top layout view 2300B of FIG. 23B, the substrate 1702 is provided or otherwise formed. The substrate 1702 is as described with regard to FIGS. 17A and 17B, except that the substrate openings 1702*so* have stepped profiles (see, e.g., FIG. 23A) and stepped top geometries (see, e.g., FIG. 23B).

As best seen in FIG. 23A, because of the stepped profiles, the substrate openings 1702*so* extend into the substrate 1702 with individual depths Dso, and the depth Dso of each substrate openings 1702*so* discretely increases from a first side of that substrate opening 1702*so* to a second side of that substrate opening 1702*so* opposite the first side. Further, the substrate openings 1702*so* have individual shallow portions SH and individual deep portions DP. The shallow portions SH extend into the substrate 1702 to a lesser depth than the deep portions DP, and the substrate pads 122*s* are at bottoms respectively of the deep portions DP.

As best seen in FIG. 23B, the shallow portions SH have larger top geometries than top geometries of the deep portions DP. For example, top areas of the shallow portions SH may be larger than top areas of the deep portions DP. As another example, widths and lengths of the shallow portions SH may be larger (e.g., 1.5, 2, 3, or more times larger) than corresponding widths and lengths of the deep portions DP. Further, the shallow portions SH and the deep portions DP have square or rectangular top geometries. In alternative embodiments, the shallow portions SH and/or the deep portions DP have other suitable top geometries.

Figure 24A:
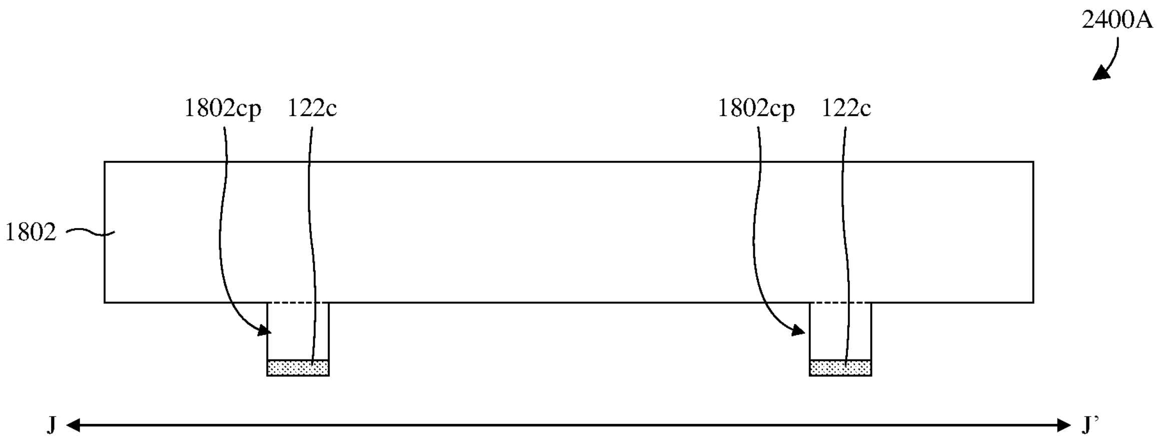
Figure 24B:
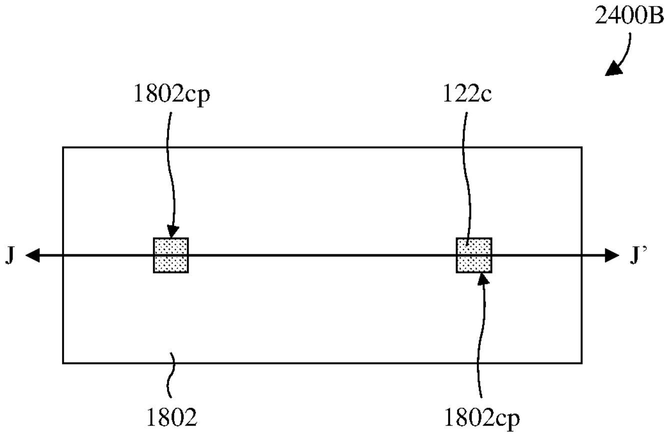

Focusing on a cross-sectional view 2400A of FIG. 24A, and a top layout view 2400B of FIG. 24B, the chip 1802 is provided or otherwise formed. The chip 1802 is as described with regard to FIGS. 18A and 18B, except that the chip protrusions 1802*cp* and the chip pads 122*c* are sized to fit in the deep portions DP of the substrate openings 1702*so* of FIGS. 23A and 23B. In other words, top geometries of the chip protrusions 1802*cp* and top geometries of the chip pads 122*c* are the same or about the same as the top geometries of the deep portions DP so the deep portions DP may receive the chip protrusions 1802*cp* and the chip pads 122*c*. Further, because the shallow portions SH of the substrate openings 1702*so* of FIGS. 23A and 23B have larger top geometries than top geometries of the deep portions DP, the shallow portions SH may also receive the chip protrusions 1802*cp* and the chip pads 122*c*.

Figure 25:
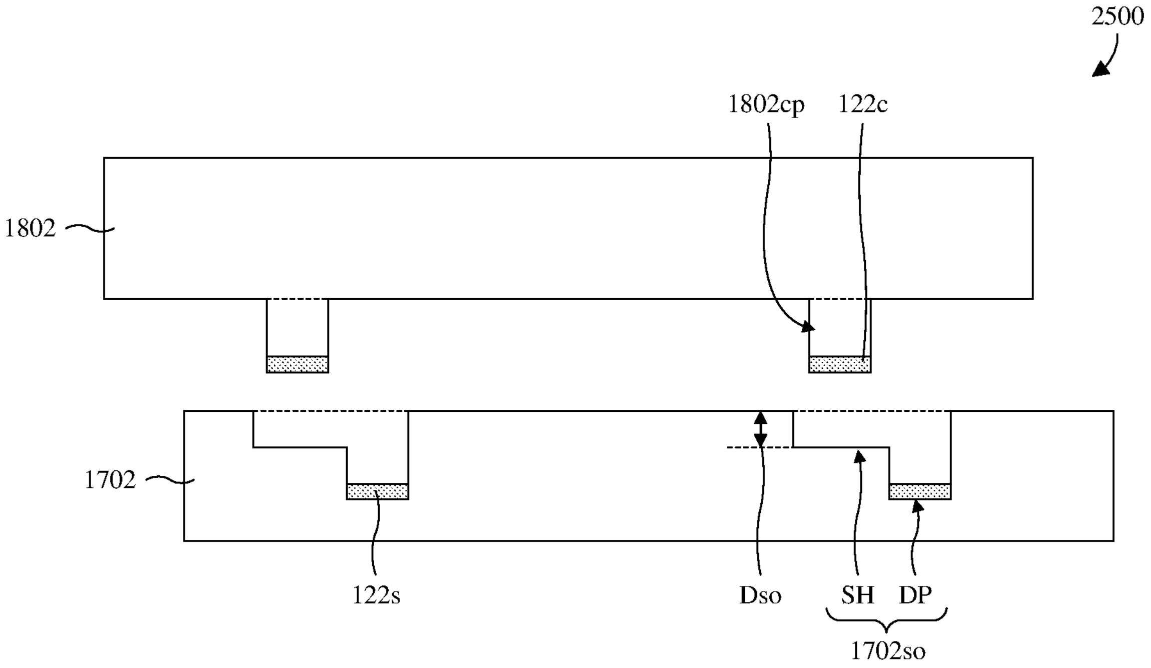

Focusing on a cross-sectional view 2500 of FIG. 25, the chip 1802 of FIGS. 24A and 24B is arranged over the substrate 1702 of FIGS. 23A and 23B. Further, the chip 1802 and the substrate 1702 are coarsely aligned, such that the chip protrusions 1802*cp* and the chip pads 122*c* respectively overlie the shallow portions SH of the substrate openings 1702*so*. Because top geometries of the shallow portions SH are larger than top geometries of the deep portions DP, such coarse alignment may be easier than it would otherwise be if shallow portions SH were omitted and alignment was to the deep portions DP.

Figure 26:
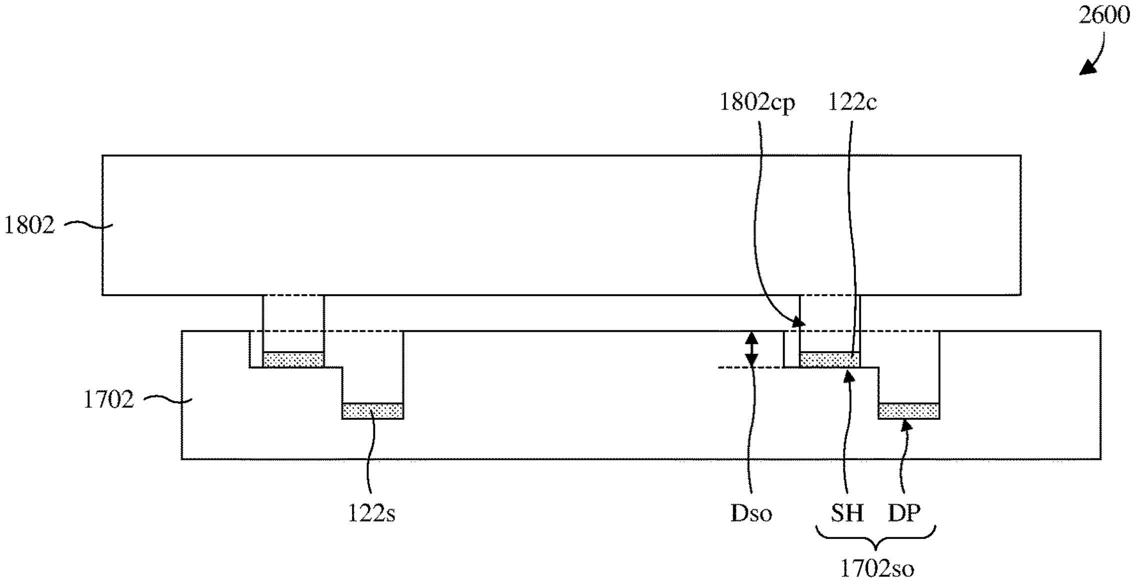

Focusing on a cross-sectional view 2600 of FIG. 26, the chip 1802 is lowered, such that that the chip protrusions 1802*cp* and the corresponding chip pads 122*c* enter the shallow portions SH of the corresponding substrate openings 1702*so*. Further, the chip pads 122*c* come into contact with the substrate 1702.

Figure 27A:
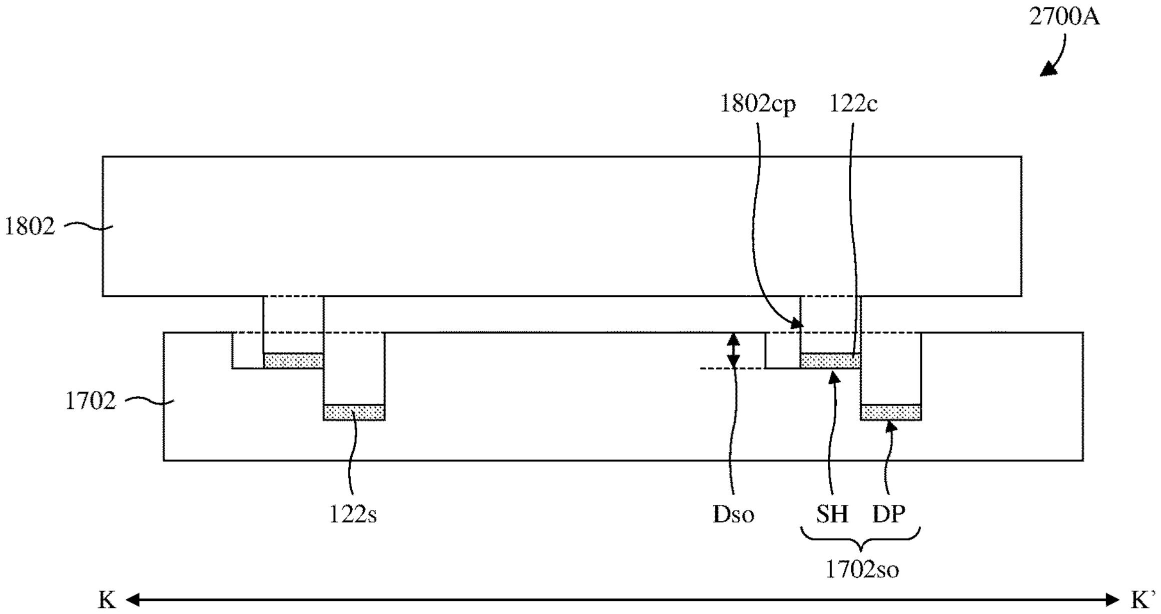
Figure 27B:
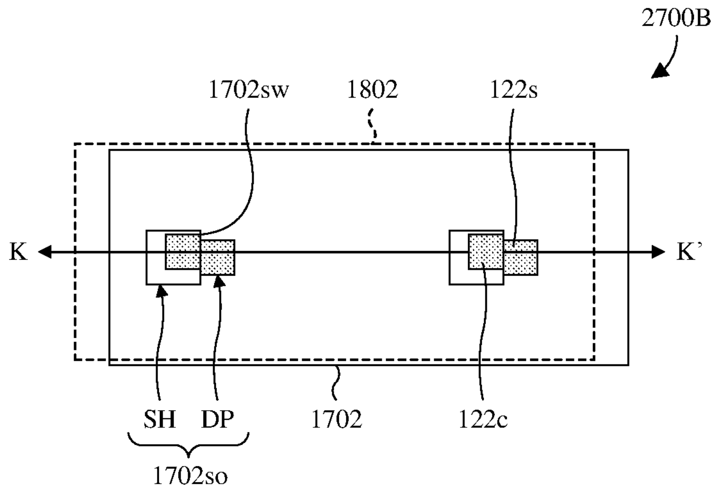

Focusing on a cross-sectional view 2700A of FIG. 27A, and a top layout view 2700B of FIG. 27B, the chip protrusions 1802*cp* and the chip pads 122*c* are moved laterally in a first direction towards the deep portions DP until the chip protrusions 1802*cp* and the chip pads 122*c* enter the deep portions DP or, as illustrated, are stopped by sidewalls 1702*sw* of the substrate 1702 in the substrate openings 1702*so*. Such sidewalls 1702*sw* are best seen in FIG. 27B.

Figure 28:
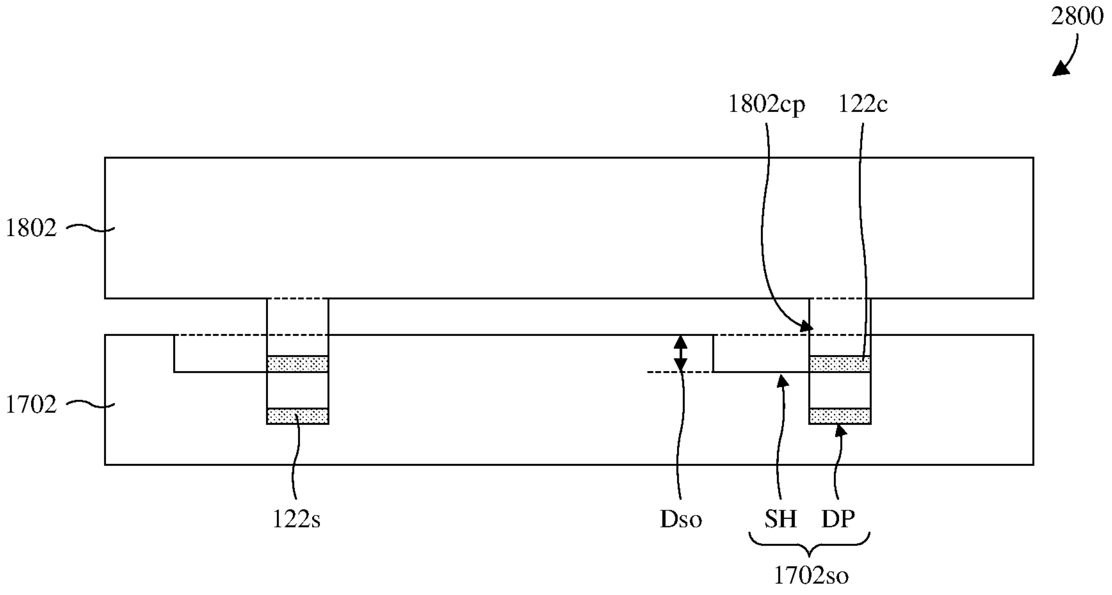

Focusing on a cross-sectional view 2800 of FIG. 28, the stepped top geometry (see, e.g., FIG. 27B) of the substrate openings 1702*so* is used to guide the chip pads 122*c* into fine alignment with the substrate pads 122*s*. For example, a small amount of lateral force may push the chip pads 122*c* and the chip protrusions 1802*cp* towards the deep portions DP while the chip pads 122*c* and the chip protrusions 1802*cp* move back and forth along the sidewalls 1702*sw* (see, e.g., FIG. 27B) that stopped the lateral movement described with regard to FIGS. 27A and 27B. This may continue until the chip pads 122*c* and the chip protrusions 1802*cp* enter the deep portions DP. Because the deep portions DP have top geometries that are about the same as top geometries of the chip protrusions 1802*cp* and top geometries of the chip pads 122*c*, the chip pads 122*c* move into alignment with the substrate pads 122*s* once the chip pads 122*c* enter the deep portions DP. Further, the chip 1802 more generally moves into alignment with the substrate 1702.

Figure 29:
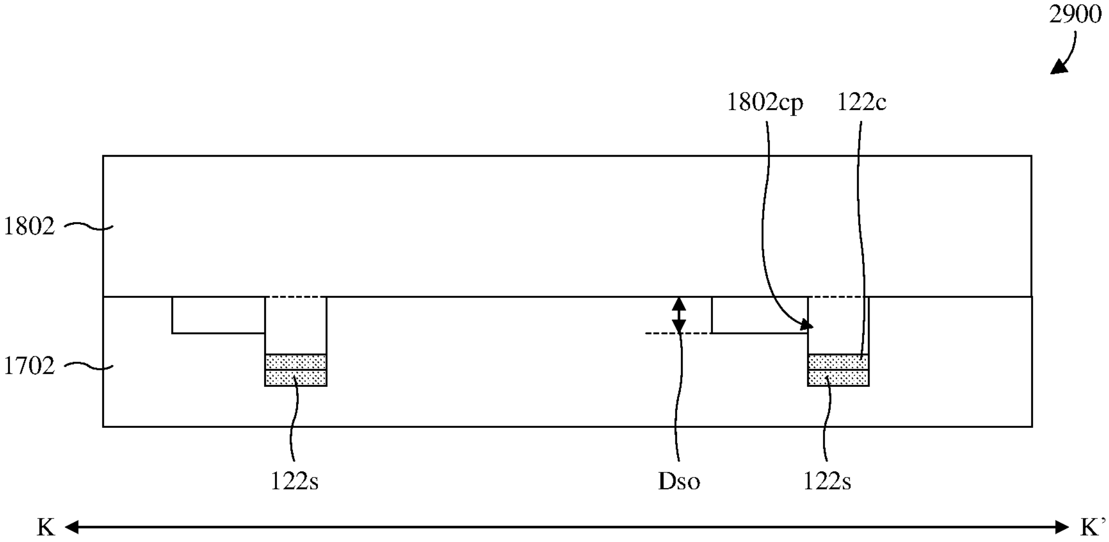

Focusing on a cross-sectional view 2900 of FIG. 29, the chip 1802 is lowered until the substrate and chip pads 122*s*, 122*c* are in direct contact. Accordingly, as seen above, the substrate openings 1702*so* facilitate aligning the chip 1802 to the substrate 1702 while simultaneously bonding and electrically coupling the chip 1802 to the substrate 1702. In some embodiments, after the substrate and chip pads 122*s*, 122*c* are into direct contact, an annealing process and/or some other suitable process may be performed to strengthen the bond between the substrate and chip pads 122*s*, 122*c*.

Figure 30A:
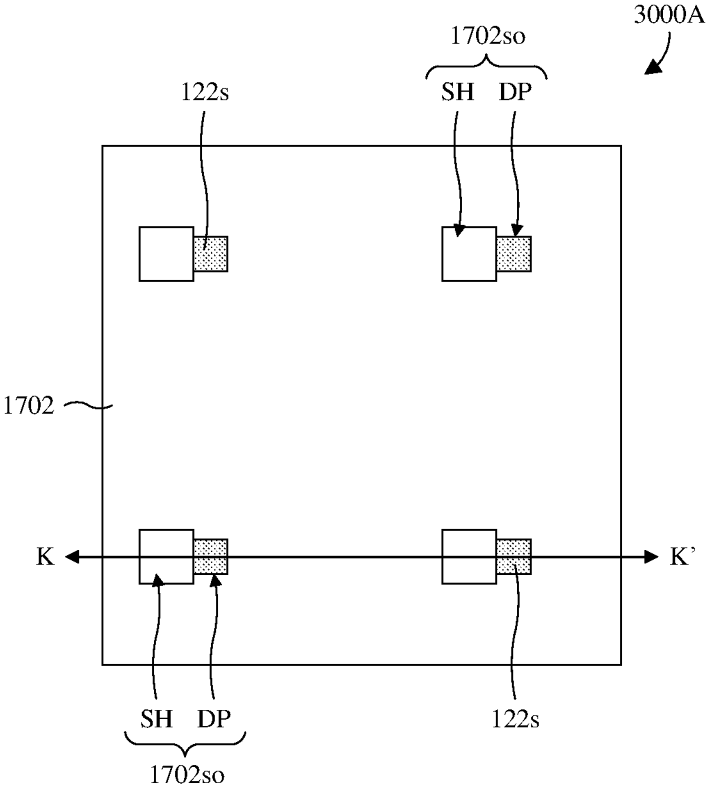
FIGS. 30A and 30B illustrate various top layout views of some alternative embodiments of the substrate and the chip at FIGS. 23A, 23B, 24A, 24B, 25, 26, 27A, 27B, 28, and 29.
Figure 30B:
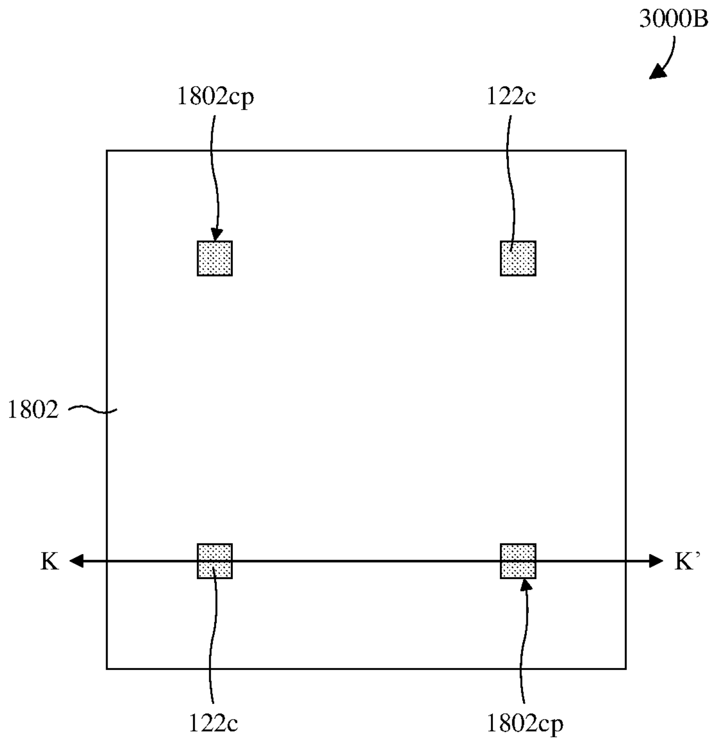

With reference to FIGS. 30A and 30B, various top layout views 3000A, 3000B of some alternative embodiments of the substrate 1702 and the chip 1802 at FIGS. 23A, 23B, 24A, 24B, 25, 26, 27A, 27B, 28, and 29 are provided in which the substrate 1702 has additional substrate openings 1702*so* and the chip 1802 has additional chip protrusions 1802*cp* corresponding to the additional substrate openings 1702*so*. FIG. 30A corresponds to the substrate 1702, whereas FIG. 30B corresponds to the chip 1802. Further, the cross-sectional view 2900 of FIG. 29 may, for example, be taken along line K-K' in FIGS. 30A and 30B.

With reference to FIGS. 31A, 31B, 32A, 32B, 33A, 33B, 34, 35A, and 35B, a series of cross-sectional and top views of some alternative embodiments of the method of FIGS. 17A, 17B, 18A, 18B, and 19-21 is provided in which the substrate openings 1702*so* are replaced by substrate protrusions 1702*sp*. Figures labeled with a suffix of A or with no suffix letter correspond to cross-sectional views, whereas figures labeled with a suffix of B correspond to top layout views for like numbered figures labeled with a suffix of A. Further, figures labeled with a suffix of A may be taken along line M-M', line N-N', line O—O', or Q-Q' (whichever is present) in like numbered figures labeled with a suffix of B.

Figure 31A:
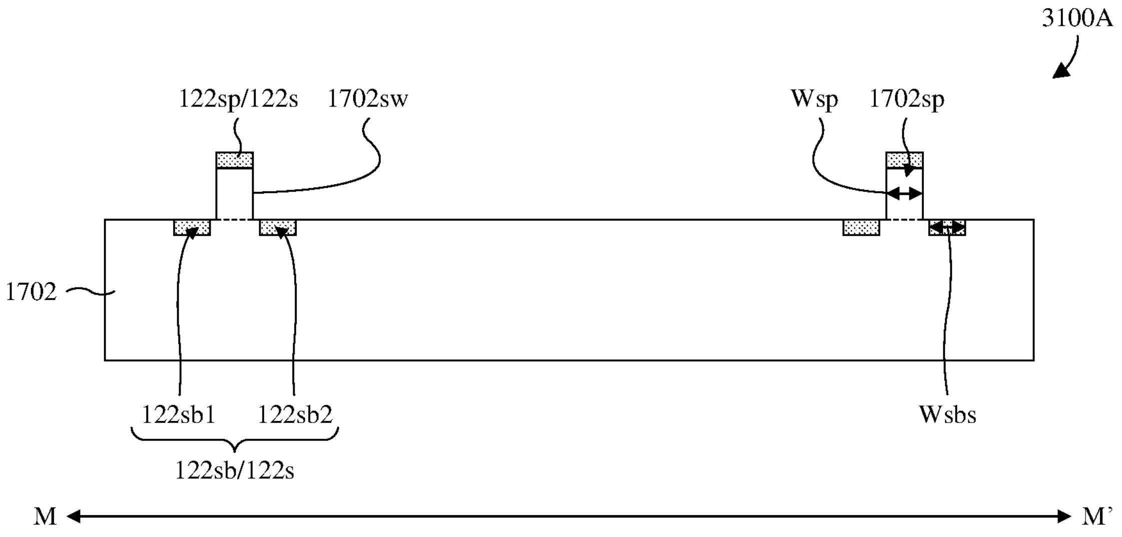
FIGS. 31A, 31B, 32A, 32B, 33A, 33B, 34, 35A, and 35B illustrate a series of views of some alternative embodiments of the method of FIGS. 17A, 17B, 18A, 18B, and 19-21 in which substrate openings are replaced by substrate protrusions.
Figure 31B:
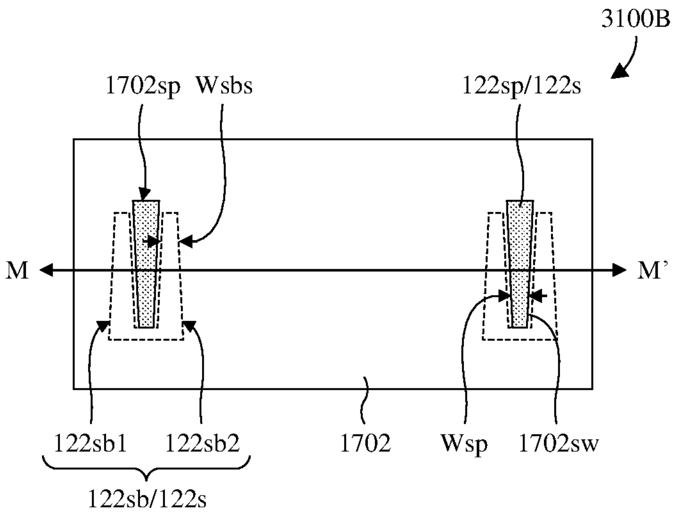

Focusing on a cross-sectional view 3100A of FIG. 31A, and a top layout view 3100B of FIG. 31B, the substrate 1702 is as described with regard to FIGS. 17A and 17B, except that the substrate openings 1702*so* are replaced with the substrate protrusions 1702*sp*. The substrate protrusions 1702*sp* accommodate substrate protrusion pads 122*sp* respectively at tops or ends of the substrate protrusions 1702*sp*. Further, the substrate protrusions 1702*sp* have the same top geometries as corresponding substrate protrusion pads 122*sp*. Top geometries of the substrate protrusions 1702*sp* have an isosceles trapezoid shape and hence have widths Wsp that taper (see, e.g., FIG. 31B). In alternative embodiments, top geometries of the substrate protrusions 1702*sp* may be square, rectangular, triangular, rhombic, a trapezoid shape other than an isosceles trapezoid shape, or some other suitable shape. Further, because the widths Wsp taper, sidewalls 1702*sw* of the substrate protrusions 1702*sp* are angled.

In addition to the substrate protrusion pads 122*sp*, substrate body pads 122*sb* corresponding to the substrate protrusions 1702*sp* are in and/or on a body of the substrate 1702, at a base of the corresponding substrate protrusions 1702*sp*. The substrate body pads 122*sb* have individual first body segments 122*sb*1 and individual second body segments 122*sb*2. For each substrate body pad 122*sb*, the first body segment 122*sb*1 of that substrate body pad 122*sb* and the second body segment 122*sb*2 of that substrate body pad 122*sb* are elongated in parallel with, and respectively on opposite sides of, a corresponding substrate protrusion 1702*sp*. Further, the first body segment 122*sb*1 of that substrate body pad 122*sb* and the first body segment 122*sb*2 of that substrate body pad 122*sb* have individual ends that are connected on one side of the corresponding substrate protrusion 1702*sp*. As such, the substrate body pads 122*sb* wrap around the corresponding substrate protrusions 1702*sp*. In alternative embodiments, the first and second body segments 122*sb*1, 122*sb*2 are disconnected.

Top geometries of the first and second body segments 122*sb*1, 122*sb*2 have an isosceles trapezoid shape and hence have widths Wsbs that taper in a common direction. In alternative embodiments, top geometries of the first and second body segments 122*sb*1, 122*sb*2 may be square, rectangular, triangular, rhombic, a trapezoid shape other than an isosceles trapezoid shape, or some other suitable shape. Further, top geometries of the first and second body segments 122*sb*1, 122*sb*2 are the same as those of the substrate protrusions 1702*sp*, albeit rotated 180 degrees when viewed top down. As such the widths Wsbs of the first and second body segments 122*sb*1, 122*sb*2 taper in an opposite direction as the widths Wsp of the substrate protrusions 1702*sp*. In alternative embodiments, top geometries of the first and second body segments 122*sb*1, 122*sb*2 are different than those of the substrate protrusions 1702*sp*.

Figure 32A:
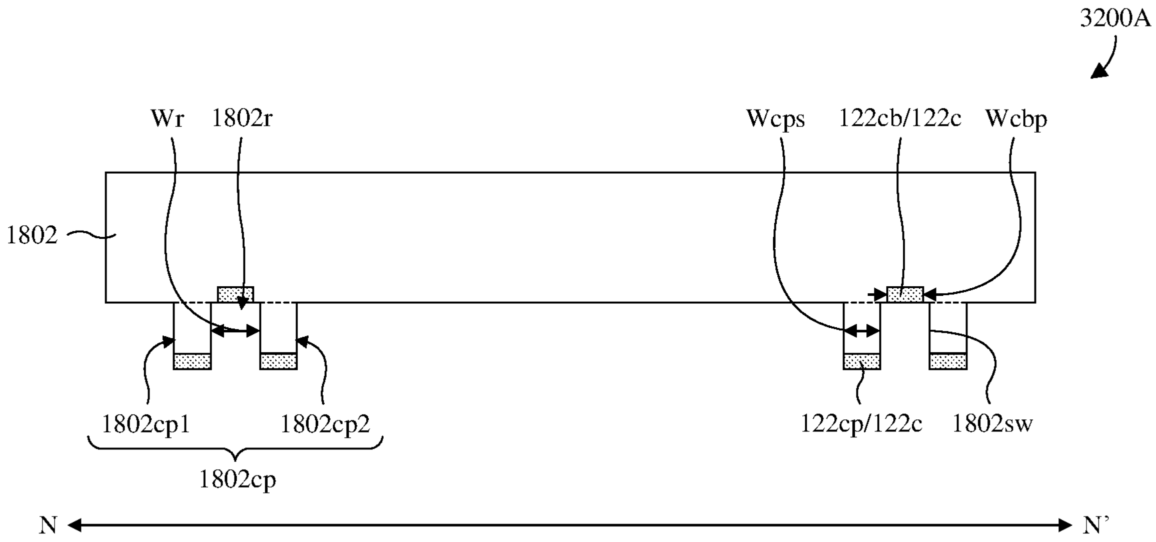
Figure 32B:
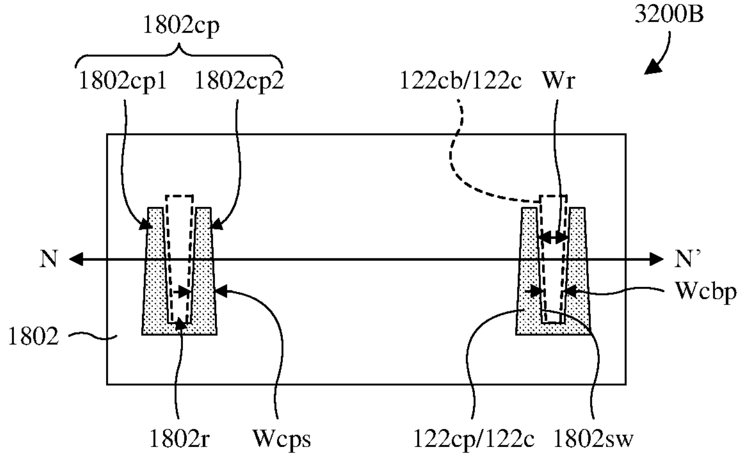

Focusing on a cross-sectional view 3200A of FIG. 32A, and a top layout view 3200B of FIG. 32B, the chip 1802 is provided or otherwise formed. The chip 1802 is as described with regard to FIGS. 18A and 18B, except that the chip protrusions 1802*cp* and the chip pads 122*c* have a different layout. The chip protrusions 1802*cp* accommodate chip protrusion pads 122*cp* respectively at bottoms or ends of the chip protrusions 1802*cp*. Further, the chip protrusions 1802*cp* have the same top geometries as corresponding chip protrusion pads 122*cp*.

The chip protrusions 1802*cp* have individual first protrusion segments 1802*cp*1 and individual second protrusion segments 1802*cp*2. For each chip protrusion 1802*cp*, the first protrusion segment 1802*cp*1 of that chip protrusion 1802*cp* and the second protrusion segment 1802*cp*2 of that chip protrusion 1802*cp* are elongated in parallel and have individual ends that are connected on a single side of that chip protrusion 1802*cp*. As such, the chip protrusions 1802*cp* forms lateral recesses 1802*r*, which have open ends (e.g., to receive the substrate protrusions 1702*sp* of FIGS. 31A and 31B). In alternative embodiments, the first and second protrusion segments 1802*cp*1, 1802*cp*2 are disconnected.

Top geometries of the first and second protrusion segments 1802*cp*1, 1802*cp*2 have an isosceles trapezoid shape and have widths Wcps that taper in a common direction. In alternative embodiments, top geometries of the first and second protrusion segments 1802*cp*1, 1802*cp*2 may be square, rectangular, triangular, rhombic, a trapezoid shape other than an isosceles trapezoid shape, or some other suitable shape. Because the widths Wcps taper, sidewalls 1802*sw* of the chip protrusions 1802*cp* are angled at the first and second protrusion segments 1802*cp*1, 1802*cp*2. Further, widths Wr of the lateral recesses 1802*r* are tapered such that the lateral recesses 1802*r* increase in width away from connected ends of the first and second protrusion segments 1802*cp*1, 1802*cp*2. In other words, the widths Wr of the lateral recesses 1802*r* decrease extending laterally into the lateral recesses 1802*r*.

In some embodiments, top geometries of the first and second protrusion segments 1802*cp*1, 1802*cp*2 are the same as top geometries of the first and second body segments 122*sb*1, 122*sb*2 of FIGS. 31A and 312B. In some embodiments, top geometries the chip protrusions 1802*cp* are the same as top geometries of the substrate body pads 122*sb* of FIGS. 31A and 31B. In some embodiments, top geometries of the lateral recesses 1802*r* are the same as top geometries of the substrate protrusions 1702*sp* of FIGS. 31A and 31B.

In addition to the chip protrusion pads 122*cp*, chip body pads 122*cb* corresponding to the lateral recesses 1802*r* are in and/or on a body of the chip 1802, at the corresponding lateral recesses 1802*r*. Top geometries of the chip body pads 122*cb* have an isosceles trapezoid shape and hence have widths Wcbp that taper (see, e.g., FIG. 32B). In alternative embodiments, top geometries of the chip body pads 122*cb* may be square, rectangular, triangular, rhombic, a trapezoid shape other than an isosceles trapezoid shape, or some other suitable shape. Further, the widths Wcbp of the chip body pads 122*cb* taper in an opposite direction as the widths Wcps of the first and second protrusion segments 1802*cp*1, 1802*cp*2. In some embodiments, top geometries of the chip body pads 122*cb* are the same as top geometries of the lateral recesses 1802*r*. Further, in some embodiments, top geometries of the chip body pads 122*cb* are the same as top geometries of the substrate protrusions 1702*sp* of FIGS. 31A and 31B.

Figure 33A:
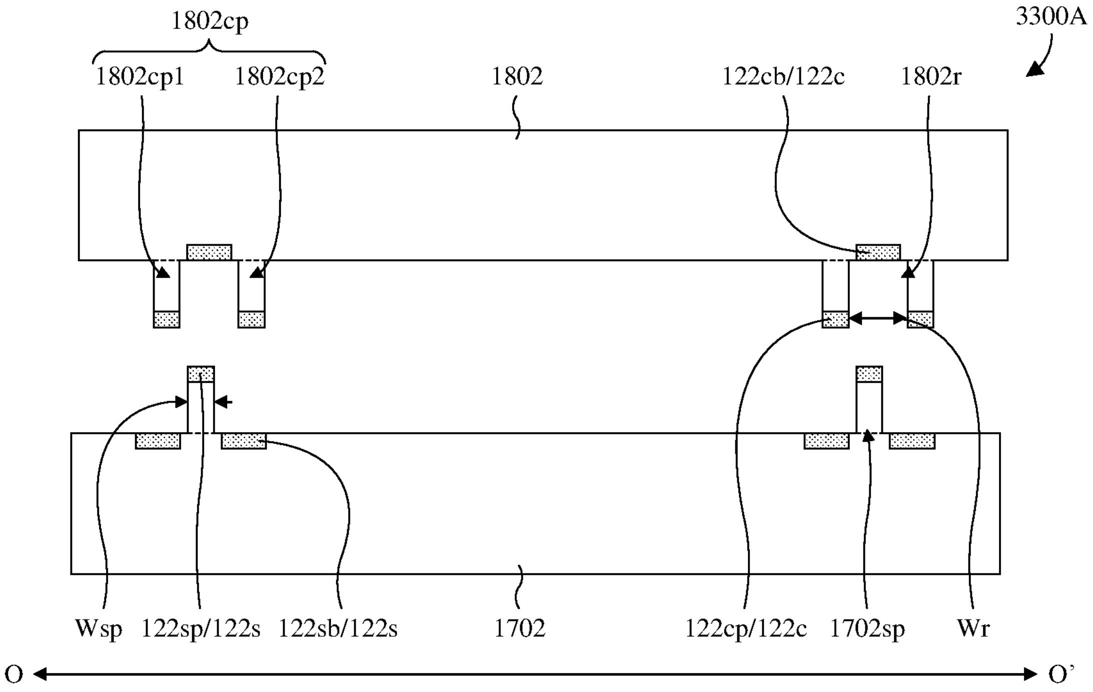
Figure 33B:
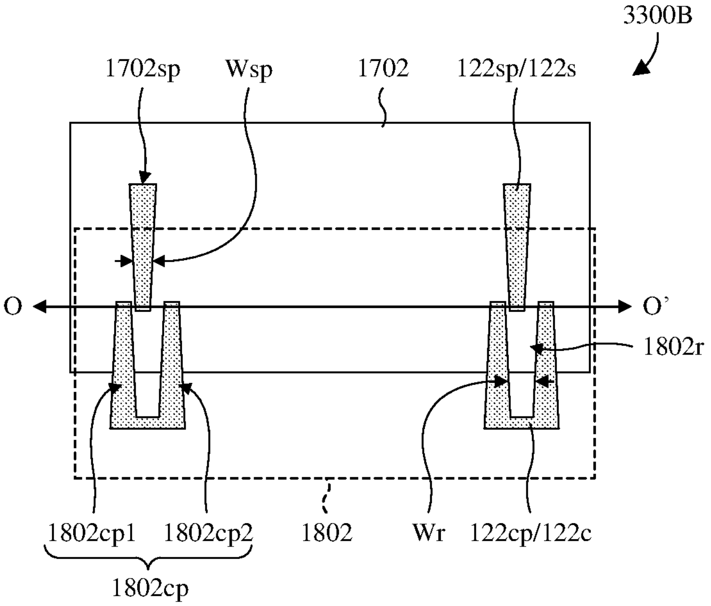

Focusing on a cross-sectional view 3300A of FIG. 33A, and a top layout view 3300B of FIG. 33B, the chip 1802 of FIGS. 32A and 32B is arranged over the substrate 1702 of FIGS. 31A and 31B. Note that the chip body pads 122*cb* of FIGS. 32A and 32B and the substrate body pads 122*sb* of FIGS. 31A and 31B are not shown in FIG. 33B for clarity. Further, the chip 1802 and the substrate 1702 are coarsely aligned, such that open ends of the lateral recesses 1802*r* overlie narrowest ends of the substrate protrusions 1702*sp*. Because the open ends correspond to widest portions of the lateral recesses 1802*r*, the coarse alignment is between widest portions of the lateral recesses 1802*r* and narrowest portions of the substrate protrusions 1702*sp*. This simplifies the coarse alignment compared to what it would be if the lateral recesses 1802*r* had a single width and/or the substrate protrusions 1702*sp* had a single width.

Figure 34:
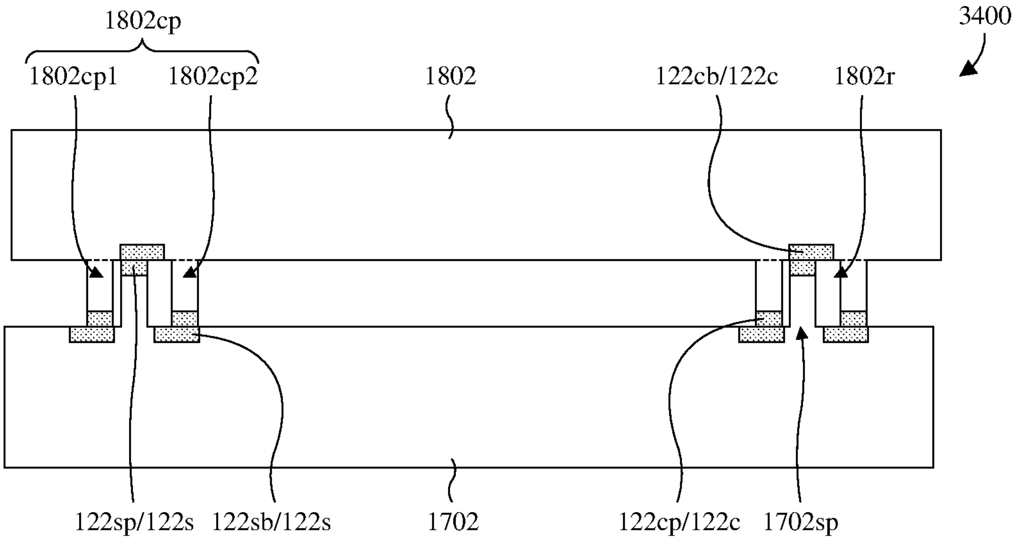

Focusing on a cross-sectional view 3400 of FIG. 34, the chip 1802 is lowered, such that the substrate protrusions 1702*sp* and the substrate pads 122*s* enter corresponding lateral recesses 1802*r*. Further, the chip pads 122*c* come into contact with the substrate pads 122*s*.

Figure 35A:
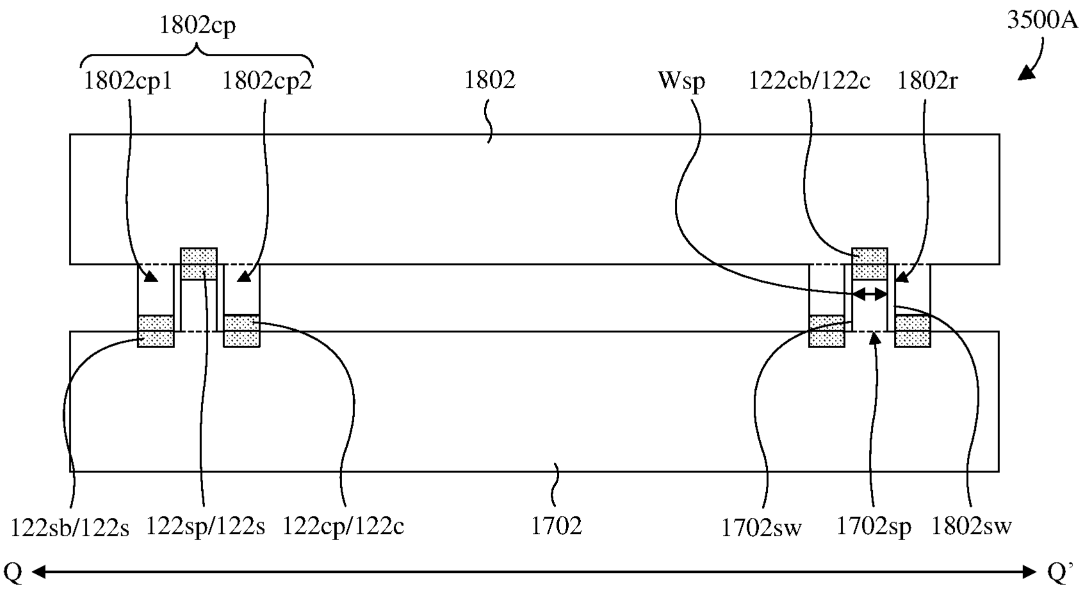
Figure 35B:
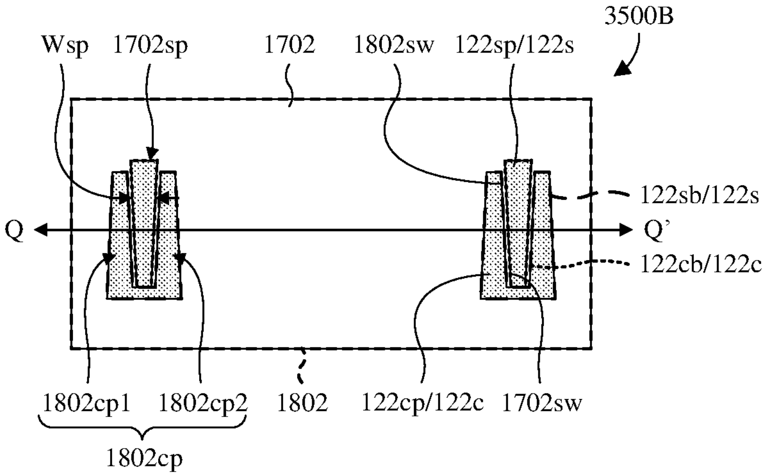

Focusing on a cross-sectional view 3500A of FIG. 35A, and a top layout view 3500B of FIG. 35B, the slant of the sidewalls 1702*sw* of the substrate protrusions 1702*sp* and the slant of the sidewalls 1802*sw* of the chip protrusions 1802*cp* are used to guide the chip pads 122*c* into fine alignment with the substrate pads 122*s*. For example, the chip protrusions 1802*cp* may be laterally moved in a direction along which the widths Wsp of the substrate protrusions 1702*sp* decrease. Such lateral movement may continue until the substrate protrusions 1702*sp* come into contact with the chip protrusions 1802*cp* at the connected ends of the first and second protrusion segments 1802*cp*1, 1802*cp*2. Further, as should be appreciated, because of the slant of the sidewalls 1702*sw* of the substrate protrusions 1702*sp* and the slant of the sidewalls 1802*sw* of the chip protrusions 1802*cp*, alignment between the chip pads 122*c* and the substrate pads 122*s* increases as this lateral movement proceeds.

In view of the foregoing, the top geometries of the substrate and chip protrusions 1702*sp*, 1802*cp* facilitate aligning the chip 1802 to the substrate 1702 while simultaneously bonding and electrically coupling the chip 1802 to the substrate 1702. In some embodiments, after the substrate and chip pads 122*s*, 122*c* are into direct contact and aligned, an annealing process and/or some other suitable process may be performed to strengthen the bond.

Figure 36A:
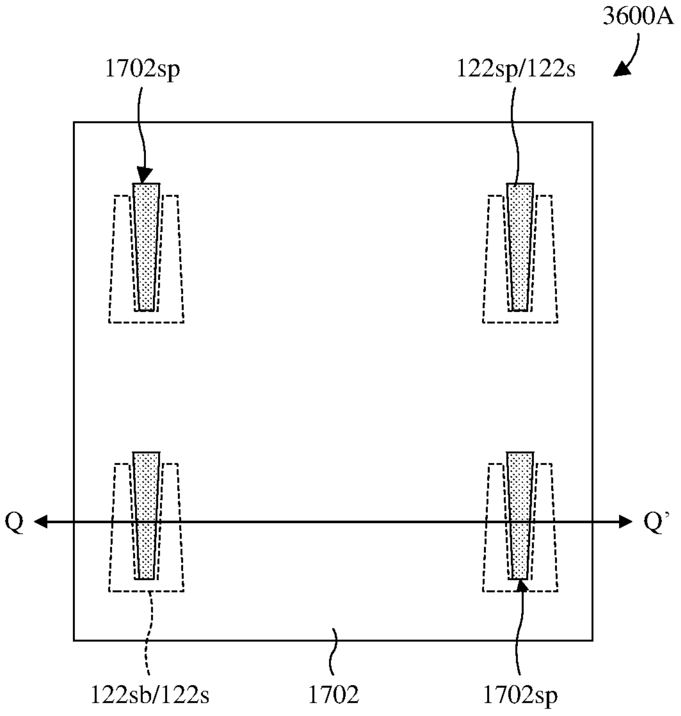
FIGS. 36A and 36B illustrate various top layout views of some alternative embodiments of the substrate and the chip at FIGS. 31A, 31B, 32A, 32B, 33A, 33B, 34, 35A, and 35B.
Figure 36B:
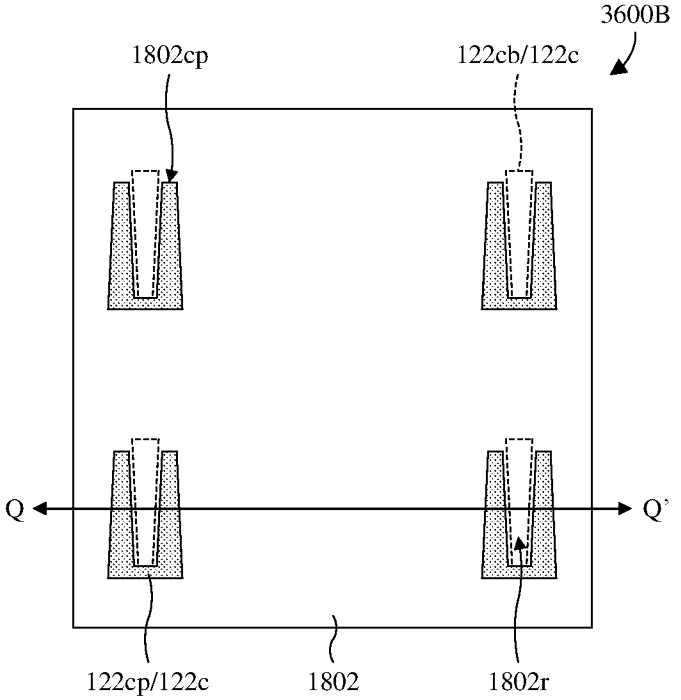

With reference to FIGS. 36A and 36B, various top layout views 3600A, 3600B of some alternative embodiments of the substrate 1702 and the chip 1802 at FIGS. 31A, 31B, 32A, 32B, 33A, 33B, 34, 35A, and 35B are provided in which the substrate 1702 has additional substrate protrusions 1702*sp* and the chip 1802 has additional chip protrusions 1802*cp* corresponding to the additional substrate protrusions 1702*sp*. FIG. 36A corresponds to the substrate 1702, whereas FIG. 36B corresponds to the chip 1802. Further, the cross-sectional view 3500A of FIG. 35A may for example, be taken along line Q-Q' in FIGS. 36A and 36B.

While FIGS. 17 to 36B are described with reference to a method, it will be appreciated that the structures shown in FIGS. 17 to 36B are not limited to the method but rather may stand alone separate of the method. While FIGS. 17 to 36B are described as a series of acts, it will be appreciated that the order of the acts may be altered in other embodiments. While FIGS. 17 to 36B illustrate and describe as a specific set of acts, some acts that are illustrated and/or described may be omitted in other embodiments. Further, acts that are not illustrated and/or described may be included in other embodiments.

With reference to FIGS. 37A-37G, cross-sectional views 3700A-3700G of various different embodiments of semiconductor packages are provided in which constituents have been simultaneously aligned and bonded together according to the methods described with regard to FIGS. 17A to 36B. As seen hereafter, such semiconductor packages correspond to alternative embodiments of the semiconductor packages described with regard to FIGS. 1-16.

Figure 37A:
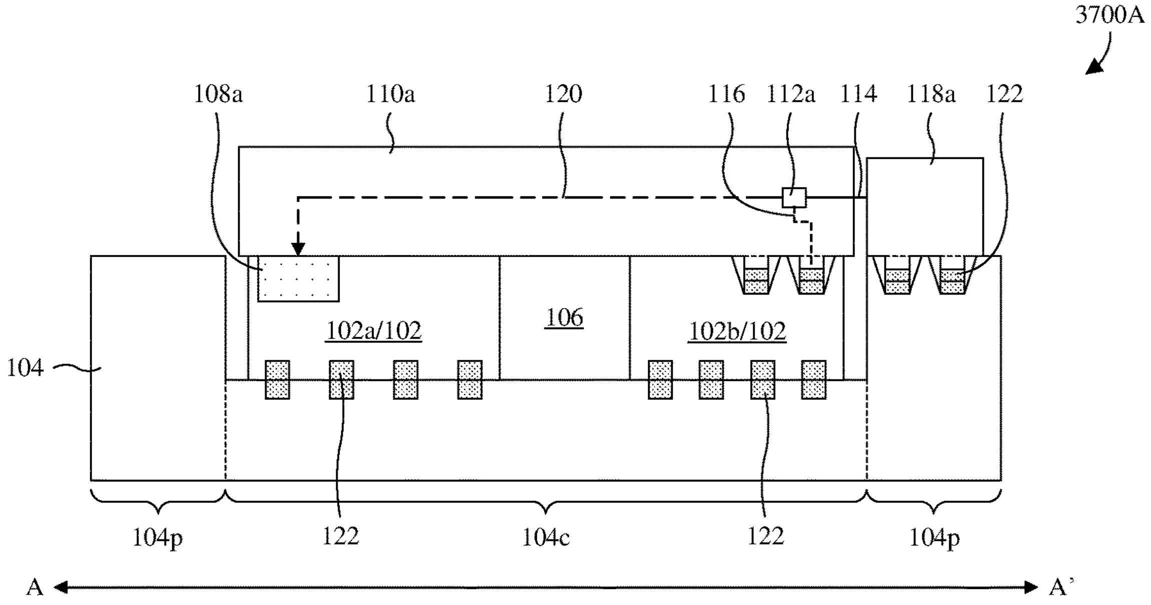
FIGS. 37A-37G illustrate cross-sectional views of various different embodiments of semiconductor packages in which constituents have been simultaneously aligned and bonded together according to the methods described with regard to FIGS. 17A to 36B.
Figure 37B:
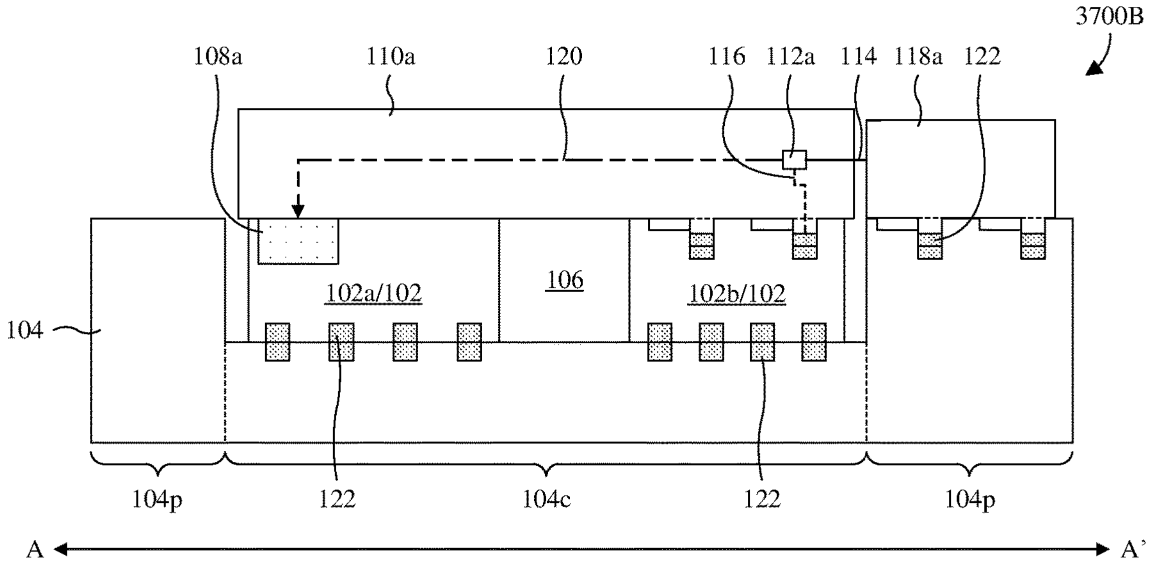
Figure 37C:
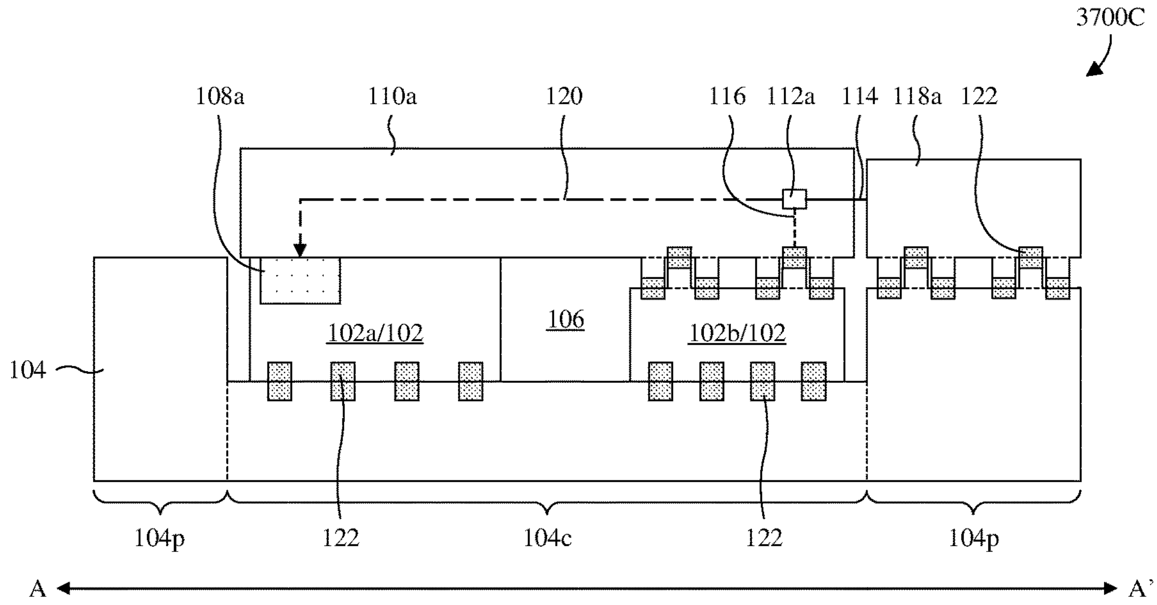

Focusing on the cross-sectional views 3700A-3700C of FIGS. 37A-37C, alternative embodiments of the semiconductor package of FIG. 1 are provided in which the photonic chip 110*a* and the laser device chip 118*a* are aligned and bonded respectively to the second IC chip 102*b* and the carrier substrate 104 according to the methods described with regard to FIGS. 17A to 36B. FIG. 37A uses the methods of FIGS. 17A, 17B, 18A, 18B, and 19-21. FIG. 37B uses the methods of FIGS. 23A, 23B, 24A, 24B, 25, 26, 27A, 27B, 28, and 29. FIG. 37C uses the methods of FIGS. 31A, 31B, 32A, 32B, 33A, 33B, 34, 35A, and 35B.

Figure 37D:
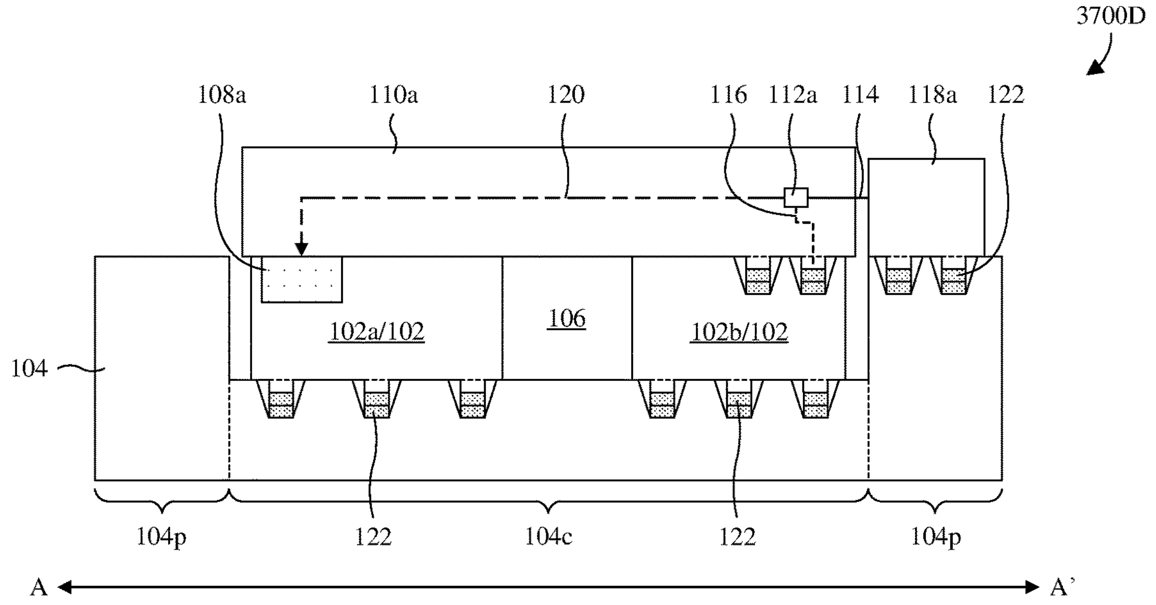

Focusing on the cross-sectional view 3700D of FIGS. 37D, alternative embodiments of the semiconductor package of FIG. 37A are provided in which the first and second IC chips 102*a*, 102*b* are further aligned and bonded to the carrier substrate 104 according to the methods described with regard to FIGS. 17A, 17B, 18A, 18B, and 19-21.

Figure 37E:
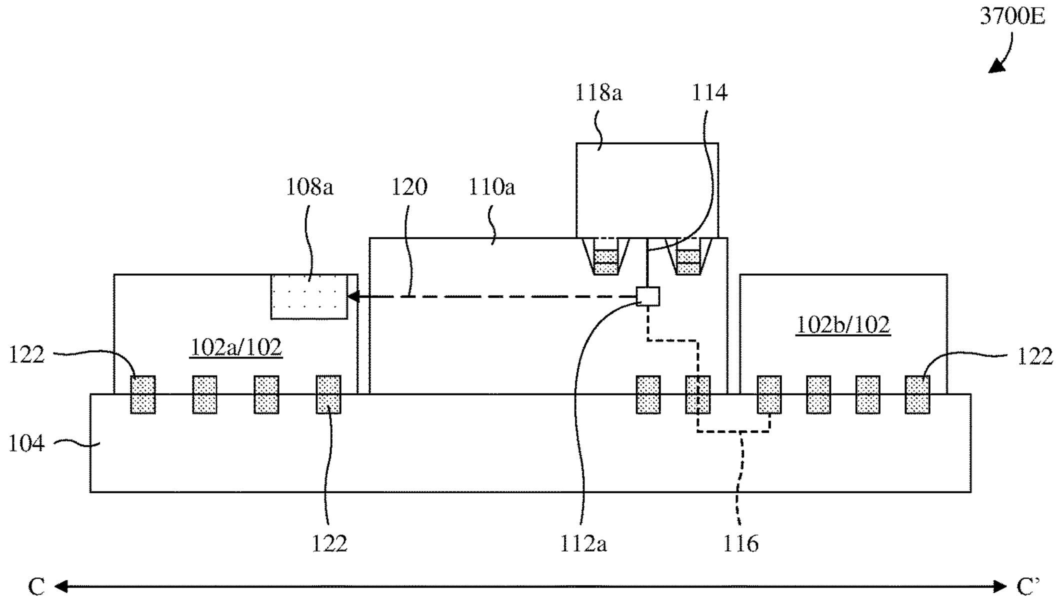

Focusing on the cross-sectional view 3700E of FIGS. 37E, alternative embodiments of the semiconductor package of FIG. 6 are provided in which the laser device chip 118*a* is aligned and bonded to the photonic chip 110*a* according to the methods described with regard to FIGS. 17A, 17B, 18A, 18B, and 19-21.

Figure 37F:
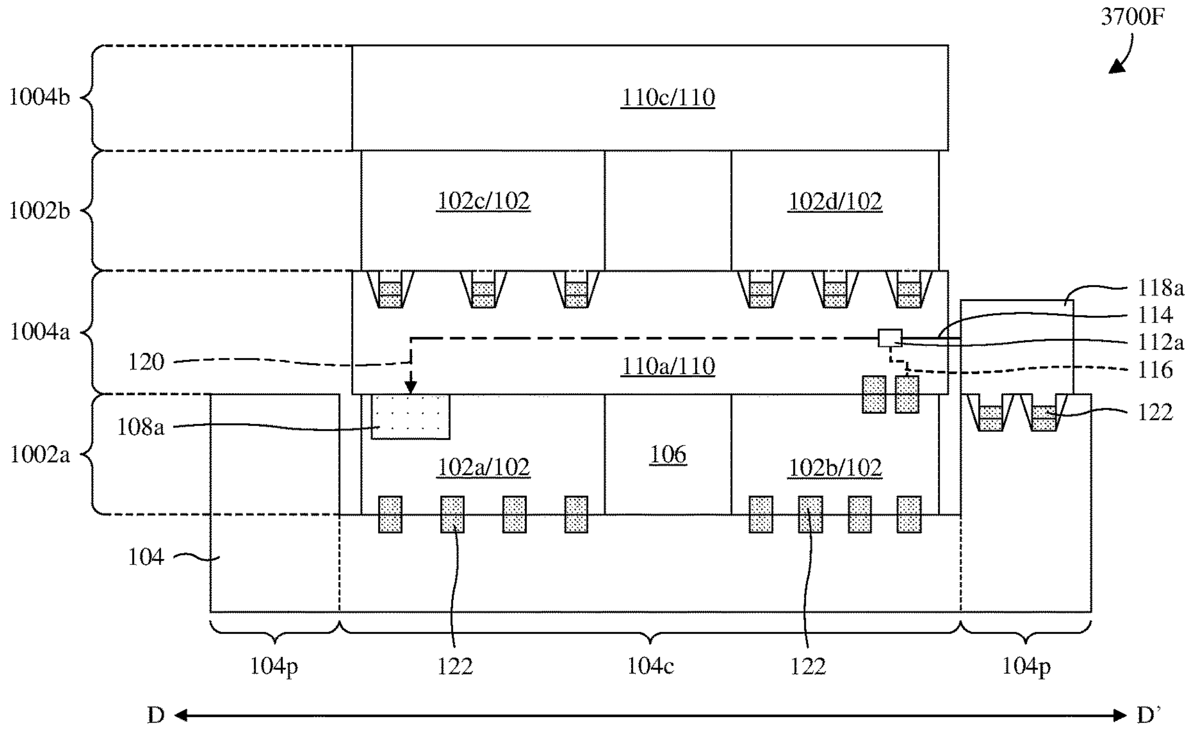

Focusing on the cross-sectional view 3700F of FIGS. 37F, alternative embodiments of the semiconductor package of FIG. 10A are provided in which the level-one laser device chip 118*a* is aligned and bonded to the carrier substrate 104 according to the methods described with regard to FIGS. 17A, 17B, 18A, 18B, and 19-21. Further, the first and second level-two IC chips 102*c*, 102*d* are aligned and bonded to the level-one photonic chip 110*a* according to the methods described with regard to FIGS. 17A, 17B, 18A, 18B, and 19-21.

Figure 37G:
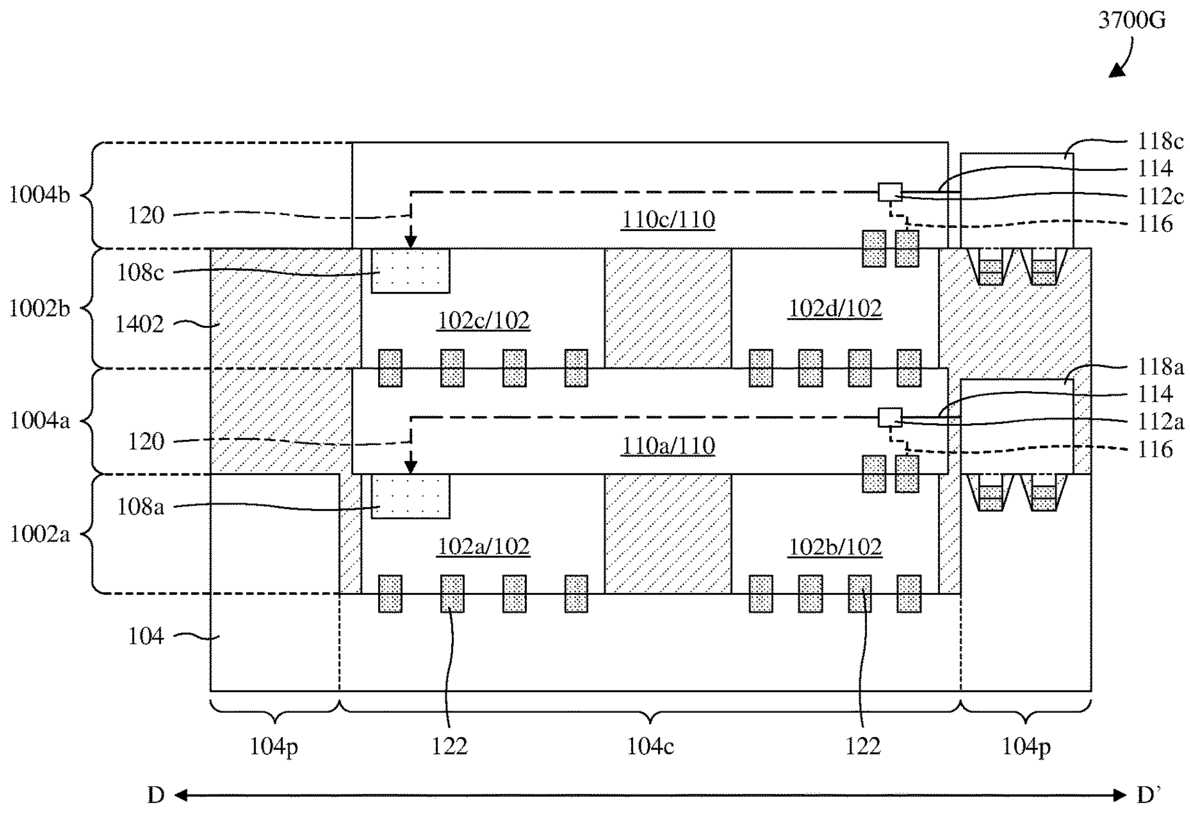

Focusing on the cross-sectional view 3700G of FIGS. 37G, alternative embodiments of the semiconductor package of FIG. 14 are provided in which the level-one laser device chip 118*a* and the level-two laser device chip 118*c* are aligned and bonded respectively to the carrier substrate 104 and the dielectric layer 1402 according to the methods described with regard to FIGS. 17A, 17B, 18A, 18B, and 19-21.

While FIGS. 37D-37G illustrate aligning and bonding constituents according to the methods described with regard to FIGS. 17A, 17B, 18A, 18B, and 19-21, the methods of FIGS. 23A, 23B, 24A, 24B, 25, 26, 27A, 27B, 28, and 29 and/or the methods of FIGS. 31A, 31B, 32A, 32B, 33A, 33B, 34, 35A, and 35B may alternatively be used. Further, while FIGS. 37A-37G provide example applications of the methods of FIGS. 17A-36B to some of the semiconductor packages of FIGS. 1-16, the methods may be applied to any of the semiconductor packages of FIGS. 1-16. More particularly, any of the methods may be applied to any constituents of the semiconductor packages of FIGS. 1-16 that are bonded together at pads 122, where the constituents include IC chips (e.g., 102, 102*a*, 102*b*, 102*c*, 102*d*), photonic chips (e.g., 110, 110*a*, 110*b*, 110*c*, 110*d*), laser device chips (e.g., 118, 118*a*, 118*b*, 118*c*), the dielectric layer 1402, and the carrier substrate 104.

With reference to FIGS. 38-42, a series of cross-sectional views 3800-4200 of some embodiments of a method for forming a semiconductor package comprising IC chips optically coupled together is provided. The semiconductor package may for example, correspond to alternative embodiments of the semiconductor package of FIG. 1 in which the laser device chip 118*a* is aligned and bonded to the carrier substrate 104 according to the methods described with regard to FIGS. 17A, 17B, 18A, 18B, and 19-21.

Figure 38:
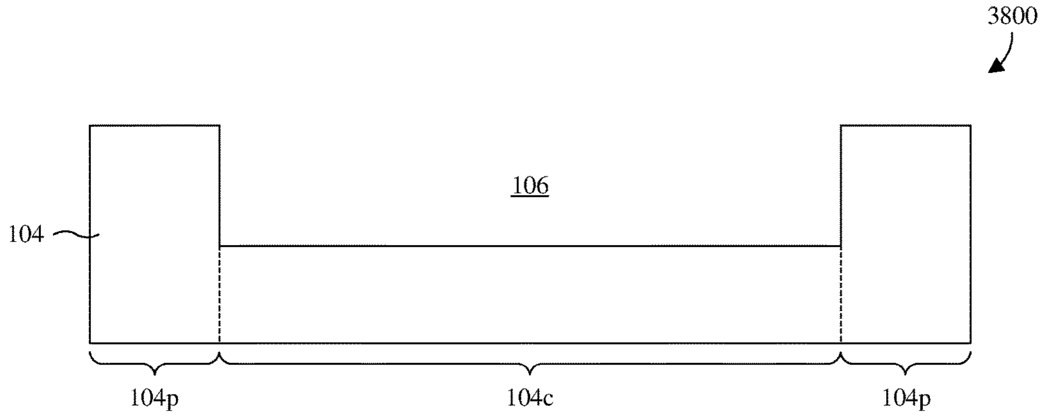
FIGS. 38-42 illustrate a series of cross-sectional views of some embodiments of a method for forming a semiconductor package comprising IC chips optically coupled together.

As illustrated by the cross-sectional view 3800 of FIG. 38, the carrier substrate 104 is provided. The carrier substrate may for example, be a bulk substrate of monocrystalline silicon or some other semiconductor material. In other embodiments, the carrier substrate 104 is a glass substrate or some other suitable type of substrate.

Also illustrated by the cross-sectional view 3800 of FIG. 38, the carrier substrate 104 is patterned to form a recess 106 at a center portion 104*c* of the carrier substrate 104, which is surrounded by a peripheral portion 104*p* of the carrier substrate 104. The patterning may for example, be performed by a photolithography/etching process or some other suitable patterning process.

Figure 39:
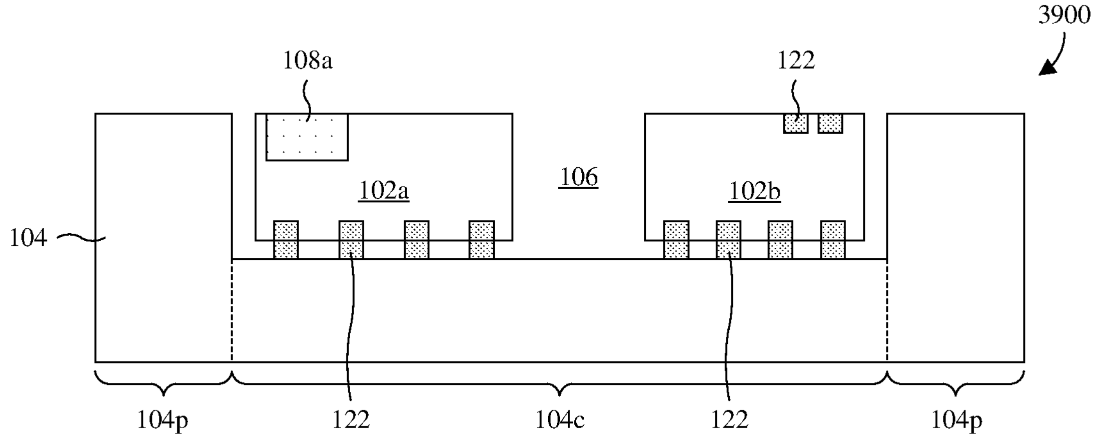

As illustrated by the cross-sectional view 3900 of FIG. 39, pads 122 are formed in the recess 106. The pads 122 may for example, be or comprise metal, metal alloy, some other suitable conductive material(s), or any combination of the foregoing. A process for forming the pads 122 may for example, comprise depositing a metal layer in the recess 106 and subsequently patterning the metal layer into the pads 122.

Note that while not shown for simplicity, the pads 122 may be separated from the carrier substrate 104 by a dielectric layer. Further, note that conductive features (e.g., TSVs, wires, vias, etc.) may be formed in and/or on the carrier substrate 104 to electrically coupling the pads 122 to other pads and/or structures. Such forming may take place before and/or after the pads 122 are formed in the recess 106.

Also illustrated by the cross-sectional view 3900 of FIG. 39, a first IC chip 102*a* and a second IC chip 102*b* are provided or otherwise formed, and are arranged over and bonded to the pads 122 in the recess 106. The first and second IC chips 102*a*, 102*b* are laterally spaced and comprise additional pads 122. Further, the first IC chip 102*a* includes a photodetector 108 to convert an optical signal to an electrical signal. The first and second IC chips 102*a*, 102*b* may for example, be as illustrated and described with regard to FIG. 4A. Further, outside the cross-sectional view 3900 of FIG. 39, the first and second IC chips 102*a*, 102*b* may for example, be as illustrated and described with regard to FIG. 4B.

Figure 40:
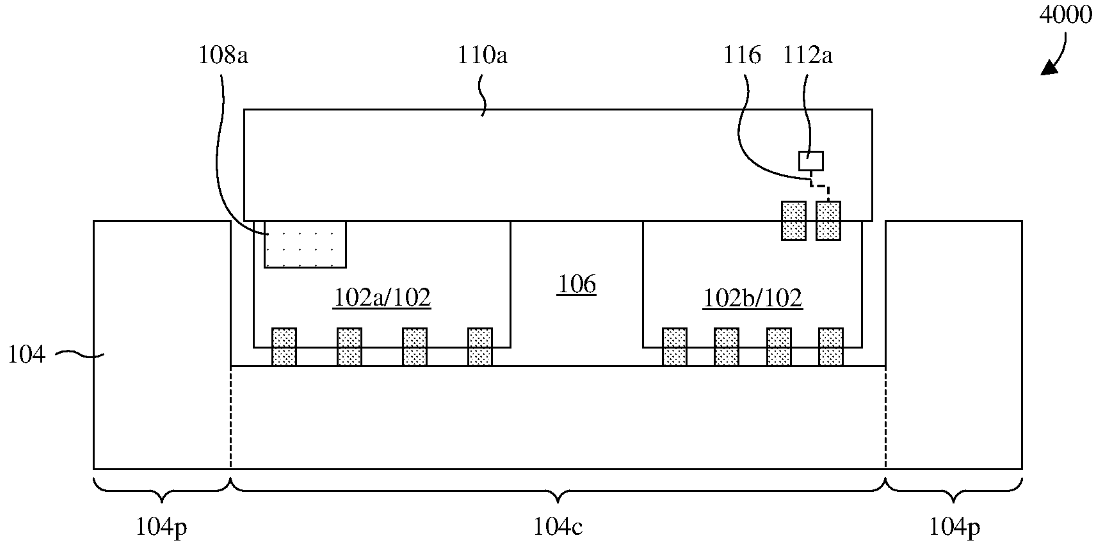

As illustrated by the cross-sectional view 4000 of FIG. 40, a photonic chip 110*a* is provided or otherwise formed, and is arranged over and bonded to the first and second IC chips 102*a*, 102*b*. The bonding provides electrical coupling between the photonic chip 110*a* and the second IC chip 102*b* and, in some embodiments, electrical coupling between the photonic chip 110*a* and the first IC chip 102*a*. The photonic chip 110*a* comprises a light modulator 112 and a plurality of waveguides and couplers (not shown). Non-limiting examples of the waveguides and couplers are shown at, for example, FIGS. 2B and 3B. Further, in some embodiments, a top layout of the photonic chip 110*a* is as shown in FIG. 2B or 3B. For example, the cross-sectional view 4000 may be taken along line A-A' in FIG. 2B or 3B.

The light modulator 112 is configured to modulate a laser beam in accordance with an electrical signal 116 from the second IC chip 102*b*. In other words, the light modulator 112 is configured to convert the electrical signal 116 into an optical signal. The waveguides and couplers are configured to form input and output light paths. An input light path guides an unmodulated laser beam to an input of the light modulator 112*a*, and an output light path guides a modulated laser beam from an output of the light modulator 112*a* to the photodetector 108*a* of the first IC chip 102*a*. Examples of such input and output light paths are shown at FIGS. 2B and 3B.

Figure 41:
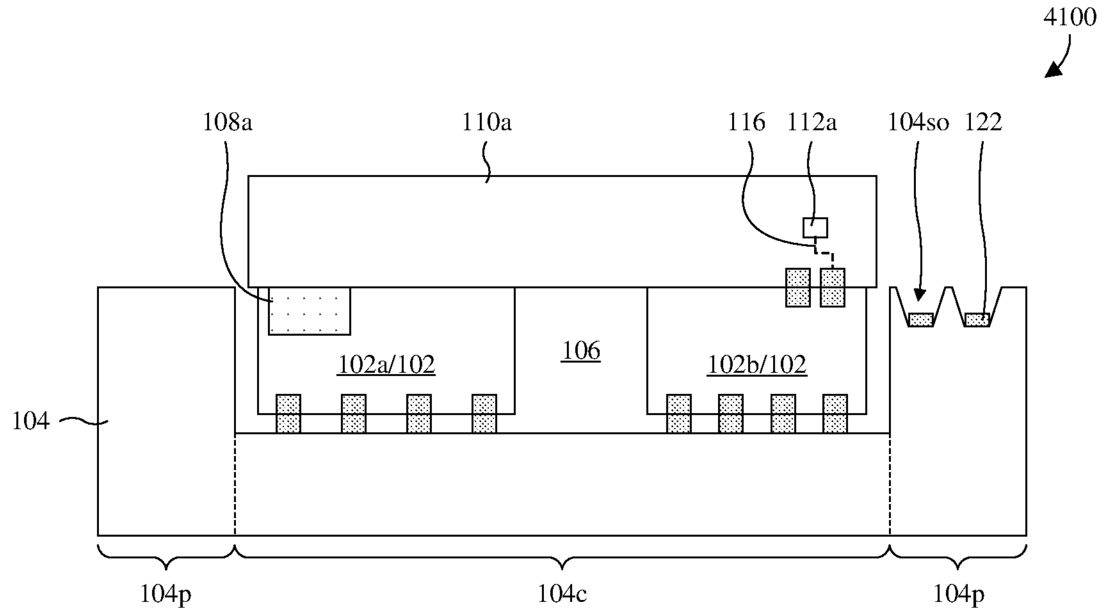
Figure 42:
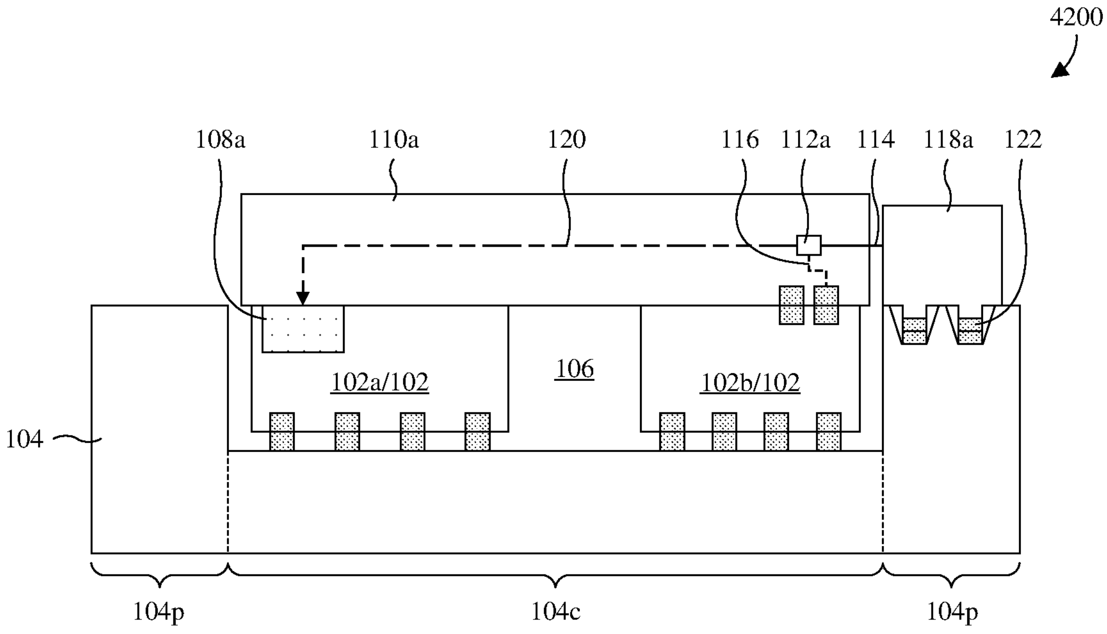

As illustrated by the cross-sectional views 4100, 4200 of FIGS. 41 and 42, a laser device chip 118*a* is provided or otherwise formed, and is arranged over and bonded to the carrier substrate 104. Such bonding is performed by the methods described with regard to FIGS. 17A, 17B, 18A, 18B, and 19-21, whereby the bonding is performed while simultaneously aligning the laser device chip 118*a* to the carrier substrate 104. In alternative embodiments, the bonding is performed by the methods described with regard to FIGS. 23A, 23B, 24A, 24B, 25, 26, 27A, 27B, 28, and 29, the methods described with regard to FIGS. 31A, 31B, 32A, 32B, 33A, 33B, 34, 35A, and 35B, or by some other suitable method.

More specifically, as illustrated by the cross-sectional view 4100 of FIG. 41, the peripheral portion 104*p* of the carrier substrate 104 is patterned to form a plurality of openings 104*so* with an inverse taper. The patterning may for example, be performed by a photolithography/etching process or some other suitable patterning process. Further, the etching of the photolithography/etching process may for example, be performed by dry etching, wet etching, or some other suitable type of etching.

Also illustrated by the cross-sectional view 4100 of FIG. 41, additional pads 122 are formed at bottoms of the openings 104*so*. A process for forming the additional pads 122 may for example, comprise depositing a metal layer in the openings 104*so* and subsequently patterning the metal layer into the additional pads 122.

As illustrated by the cross-sectional view 4200 of FIG. 42, a laser device chip 118*a* is provided or otherwise formed, and is arranged over and bonded to the carrier substrate 104 through the openings 104*so*. The laser device chip 118*a* has a plurality of protrusions on which additional pads 122 are mounted. In accordance with the methods described with regard to FIGS. 17A, 17B, 18A, 18B, and 19-21, the protrusions are inserted into the openings 104*so* so as to bond the pads 122 of the laser device chip 118*a* to the pads 122 in the openings 104*so*. Further, sloped sidewalls of the carrier substrate 104 in the openings 104*so* guide the laser device chip 118*a* into horizontal alignment with the carrier substrate 104 while the protrusions are inserted into the openings 104*so*. Accordingly, bonding and aligning are performed simultaneously.

While FIGS. 38-42 are described with reference to a method, it will be appreciated that the structures shown in FIGS. 38-42 are not limited to the method but rather may stand alone separate of the method. While FIGS. 38-42 are described as a series of acts, it will be appreciated that the order of the acts may be altered in other embodiments. While FIGS. 38-42 illustrate and describe as a specific set of acts, some acts that are illustrated and/or described may be omitted in other embodiments. Further, acts that are not illustrated and/or described may be included in other embodiments. For example, the acts may be varied to form the semiconductor packages as in any of FIGS. 1-16 or FIGS. 37A-37G.

In alternative embodiments, when the acts described with regard to FIGS. 41 and 42 are performed by the methods described with regard to FIGS. 31A, 31B, 32A, 32B, 33A, 33B, 34, 35A, and 35B, the patterning at FIG. 41 forms protrusions in the carrier substrate 104 instead of openings. FIGS. 31A and 31B provide examples of such protrusions. Further, the protrusions of the laser device chip 118*a* are formed as illustrated at FIGS. 32A and 32B. In alternative embodiments, when the acts described with regard to FIGS. 41 and 42 are performed by the methods described with regard to FIGS. 23A, 23B, 24A, 24B, 25, 26, 27A, 27B, 28, and 29, the patterning at FIG. 41 forms the openings 104*so* as illustrated at FIGS. 23A and 23B. Further, the protrusions of the laser device chip 118*a* are formed as illustrated at FIGS. 24A and 24B.

Figure 43:
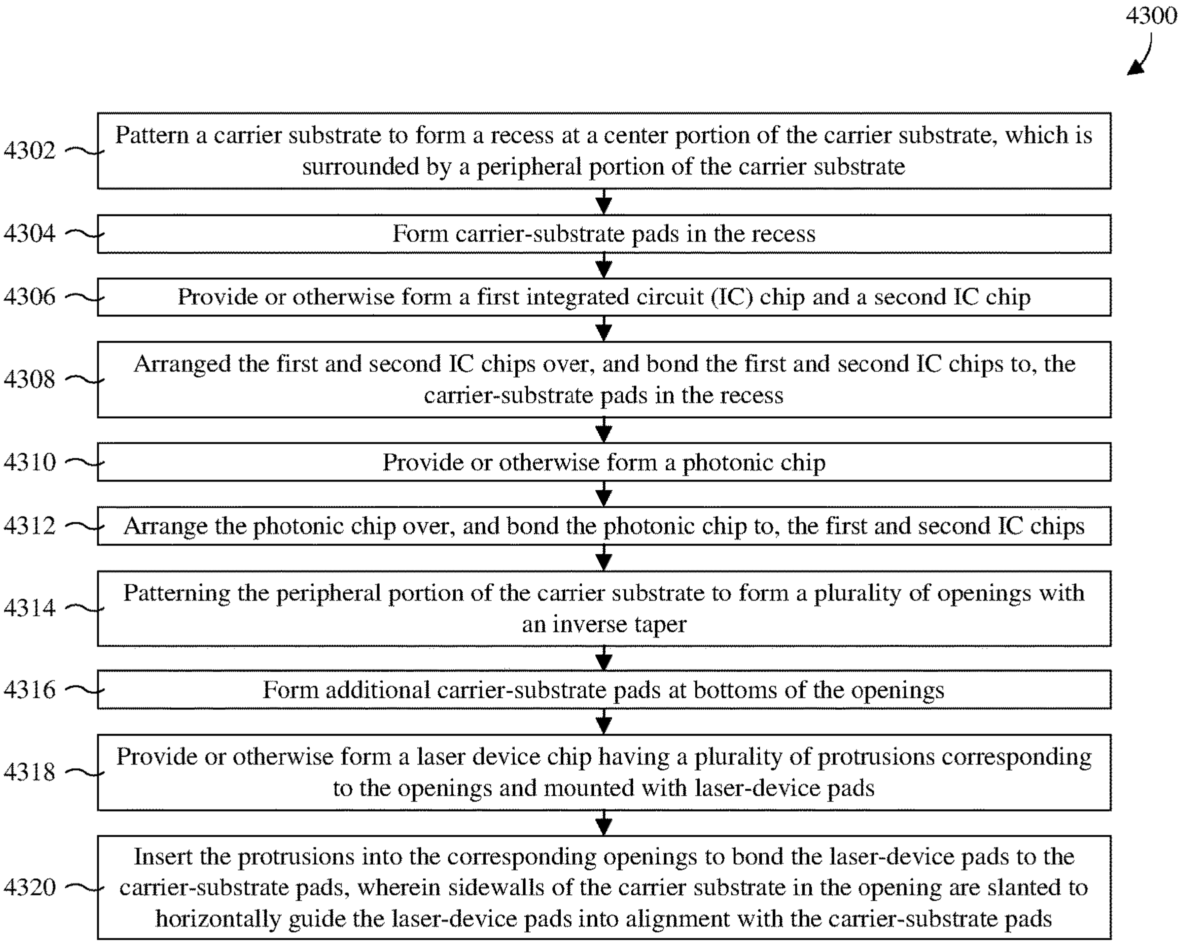
FIG. 43 illustrates a block diagram of some embodiments of the method of FIGS. 38-42.

With reference to FIG. 43, a block diagram 4300 of some embodiments of the method of FIGS. 38-42 is provided.

At 4302, a carrier substrate is patterned to form a recess at a center portion of the carrier substrate, which is surrounded by a peripheral portion of the carrier substrate. See, for example, FIG. 38.

At 4304, carrier-substrate pads are formed in the recess. See, for example, FIG. 39.

At 4306, a first IC chip and a second IC chip are provided or otherwise formed. See, for example, FIG. 39.

At 4308, the first and second IC chips are arranged over, and bonded to, the carrier-substrate pads in the recess. See, for example, FIG. 39.

At 4310, a photonic chip is provided or otherwise formed. See, for example, FIG. 40.

At 4312, the photonic chip over is arranged over, and bonded to, the first and second IC chips. See, for example, FIG. 40.

At 4314, the peripheral portion of the carrier substrate is patterned to form a plurality of openings with an inverse taper. See, for example, FIG. 41.

At 4316, additional carrier-substrate pads are formed at bottoms of the openings.

See, for example, FIG. 41.

At 4318, a laser device chip is provided or otherwise formed, wherein the laser device chip has a plurality of protrusions corresponding to the openings and mounted with laser-device pads. See, for example, FIG. 42.

At 4320, the protrusions are inserted into the corresponding openings to bond the laser-device pads to the carrier-substrate pads, wherein sidewalls of the carrier substrate in the opening are slanted to horizontally guide the laser-device pads into alignment with the carrier-substrate pads. See, for example, FIG. 42.

While the block diagram 4300 of FIG. 43 is illustrated and described herein as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts may be required to implement one or more aspects or embodiments of the description herein, and one or more of the acts depicted herein may be carried out in one or more separate acts and/or phases.

In some embodiments, the present disclosure provides a semiconductor package, including: a substrate; a first IC chip and a second IC chip overlying the substrate, wherein the first and second IC chips are recessed into the substrate at a center of the substrate; a laser device (LD) chip overlying the substrate at a periphery of the substrate, wherein the LD chip borders the second IC chip and is configured to generate a laser beam; and a photonic chip overlying the first and second IC chips and level with the LD chip, wherein the photonic chip is configured to modulate the laser beam in response to an electrical signal from the second IC chip and to guide the modulated laser beam to the first IC chip. In some embodiments, the substrate has an opening accommodating a first pad at the periphery of the substrate, wherein the LD chip has a protrusion mounted with a second pad and within the opening. In some embodiments, a top surface of the second IC chip is about level with a top surface of the substrate at the periphery of the substrate. In some embodiments, the first IC chip includes a photodetector configured to receive the modulated laser beam and to convert the modulated laser beam into a second electrical signal. In some embodiments, the semiconductor package further includes: a second LD chip overlying the substrate at the periphery of the substrate, wherein the second LD chip borders the first IC chip and is configured to generate a second laser beam; and a second photonic chip overlying the first and second IC chips and level with the second LD chip, wherein the second photonic chip is configured to modulate the second laser beam in response to a second electrical signal from the first IC chip and to guide the second modulated laser beam to the second IC chip. In some embodiments, the semiconductor package further includes: a third IC chip and a fourth IC chip overlying the photonic chip and respectively overlying the first and second IC chips; and a second photonic chip overlying the third and fourth IC chips, wherein the second photonic chip is configured to modulate a second laser beam in response to a second electrical signal from the fourth IC chip and to guide the second modulated laser beam to the third IC chip. In some embodiments, the semiconductor package further includes a second LD chip overlying the LD chip and level with the second photonic chip, wherein the second LD chip borders the fourth IC chip and is configured to generate the second laser beam. In some embodiments, the semiconductor package further includes: a second LD chip overlying the substrate at the periphery of the substrate and level with the photonic chip, wherein the second LD chip borders the second IC chip and is configured to generate the second laser beam; wherein the photonic chip includes a reflector configured to reflect the second laser beam to the second photonic chip.

In some embodiments, the present disclosure provides another a semiconductor package, including: a substrate; a first IC chip and a second IC chip overlying the substrate; a photonic chip overlying the first and second IC chips, wherein the photonic chip is configured to modulate a laser beam in response to an electrical signal from the second IC chip and to guide the modulated laser beam to the first IC chip; and a LD chip overlying the substrate, adjacent to the photonic chip, wherein the LD chip is configured to generate the laser beam; wherein a top of the substrate has a first alignment feature accommodating a first pad, wherein a bottom of the LD chip has a second alignment feature accommodating a second pad, and wherein one of the first and second alignment features is an opening, or has a recess, within which another one of the first and second alignment features is arranged. In some embodiments, the first alignment feature is the opening, wherein the opening extends into a top surface of the substrate and accommodates the first pad at a bottom of the opening, and wherein the second alignment feature is a protrusion mounted with the second pad and arranged in the opening. In some embodiments, the opening has a width that decreases from the top surface of the substrate to the bottom of the opening. In some embodiments, the opening has a shallow portion and a deep portion that adjoin to define a stepped profile of the opening and a stepped top geometry of the opening, wherein the deep portion accommodates the first pad, and wherein a top geometry of the shallow portion is larger than a top geometry of the deep portion. In some embodiments, lateral dimensions of the opening at the second pad are about the same as corresponding lateral dimensions of the protrusion.

In some embodiments, the second alignment feature is a downward protrusion having the recess, wherein the first alignment feature is an upward protrusion laterally recessed into a side of the downward protrusion at the recess. In some embodiments, the downward protrusion has a pair of protrusion segments respectively on opposite sides of the upward protrusion, wherein the protrusion segments are elongated in parallel and have individual ends that are connected on a single side of the upward protrusion.

In some embodiments, the present disclosure provides a method for forming a semiconductor package, the method including: arranging a first IC chip and a second IC chip adjacent to each other on a central portion of a substrate; arranging a photonic chip overlying the first and second IC chips; patterning a peripheral portion of the substrate adjacent to the photonic chip and the second IC chip to form a first alignment feature; forming a first pad at the first alignment feature; forming a second alignment feature on a LD chip, wherein the second alignment feature has a downward protrusion at which a second pad is arranged; and moving the first and second alignment features towards each other, wherein the first and second alignment features interact to guide the first and second pads into alignment. In some embodiments, the first alignment feature is an opening accommodating the first pad at a bottom of the opening, wherein sidewalls of the substrate in the opening slant outward away from the first pad, and wherein the moving moves the downward protrusion and the second pad into the opening and follows a slant of the sidewalls towards the first pad. In some embodiments, the first alignment feature is an opening having a stepped profile and a stepped top geometry, wherein a depth of the opening increases and a width of the opening decreases from a first side of the opening to a second side of the opening opposite the first side, and wherein the moving moves the downward protrusion and the second pad into the opening and follows the stepped profile and the stepped top geometry towards the first pad. In some embodiments, the first alignment feature is an upward protrusion, wherein the downward protrusion has a lateral recess with a top geometry complementary to a top geometry of the upward protrusion and configured to receive the upward protrusion, and wherein the moving laterally moves the downward protrusion around the upward protrusion, such that the lateral recess receives the upward protrusion. In some embodiments, a width of the upward protrusion and a width of the lateral recess increase in a direction along which the downward protrusion is moved around the upward protrusion.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor package, comprising:

a substrate;

a first integrated circuit (IC) chip and a second IC chip overlying the substrate, wherein the first and second IC chips are recessed into the substrate at a center of the substrate;

a laser device (LD) chip overlying the substrate at a periphery of the substrate, wherein the LD chip borders the second IC chip and is configured to generate a laser beam; and a photonic chip overlying the first and second IC chips and level with the LD chip, wherein the photonic chip is configured to modulate the laser beam in response to an electrical signal from the second IC chip and to guide the modulated laser beam to the first IC chip.

2. The semiconductor package according to claim 1, wherein the substrate has an opening accommodating a first pad at the periphery of the substrate, and wherein the LD chip has a protrusion mounted with a second pad and within the opening.

3. The semiconductor package according to claim 1, wherein a top surface of the second IC chip is about level with a top surface of the substrate at the periphery of the substrate.

4. The semiconductor package according to claim 1, wherein the first IC chip comprises a photodetector configured to receive the modulated laser beam and to convert the modulated laser beam into a second electrical signal.

5. The semiconductor package according to claim 1, further comprising:

a second LD chip overlying the substrate at the periphery of the substrate, wherein the second LD chip borders the first IC chip and is configured to generate a second laser beam; and a second photonic chip overlying the first and second IC chips and level with the second LD chip, wherein the second photonic chip is configured to modulate the second laser beam in response to a second electrical signal from the first IC chip and to guide the second modulated laser beam to the second IC chip.

6. The semiconductor package according to claim 1, further comprising:

a third IC chip and a fourth IC chip overlying the photonic chip and respectively overlying the first and second IC chips; and a second photonic chip overlying the third and fourth IC chips, wherein the second photonic chip is configured to modulate a second laser beam in response to a second electrical signal from the fourth IC chip and to guide the second modulated laser beam to the third IC chip.

7. The semiconductor package according to claim 6, further comprising:

a second LD chip overlying the LD chip and level with the second photonic chip, wherein the second LD chip borders the fourth IC chip and is configured to generate the second laser beam.

8. The semiconductor package according to claim 6, further comprising:

a second LD chip overlying the substrate at the periphery of the substrate and level with the photonic chip, wherein the second LD chip borders the second IC chip and is configured to generate the second laser beam;

wherein the photonic chip comprises a reflector configured to reflect the second laser beam to the second photonic chip.

9. A semiconductor package, comprising:

a substrate;

a first integrated circuit (IC) chip and a second IC chip overlying the substrate;

a photonic chip overlying the first and second IC chips, wherein the photonic chip is configured to modulate a laser beam in response to an electrical signal from the second IC chip and to guide the modulated laser beam to the first IC chip; and a laser device (LD) chip overlying the substrate, adjacent to the photonic chip, wherein the LD chip is configured to generate the laser beam;

wherein a top of the substrate has a first alignment feature accommodating a first pad, wherein a bottom of the LD chip has a second alignment feature accommodating a second pad, and wherein one of the first and second alignment features is an opening, or has a recess, within which another one of the first and second alignment features is arranged.

10. The semiconductor package according to claim 9, wherein the first alignment feature is the opening, wherein the opening extends into a top surface of the substrate and accommodates the first pad at a bottom of the opening, and wherein the second alignment feature is a protrusion mounted with the second pad and arranged in the opening.

11. The semiconductor package according to claim 10, wherein the opening has a width that decreases from the top surface of the substrate to the bottom of the opening.

12. The semiconductor package according to claim 10, wherein the opening has a shallow portion and a deep portion that adjoin to define a stepped profile of the opening and a stepped top geometry of the opening, wherein the deep portion accommodates the first pad, and wherein a top geometry of the shallow portion is larger than a top geometry of the deep portion.

13. The semiconductor package according to claim 10, wherein lateral dimensions of the opening at the second pad are about the same as corresponding lateral dimensions of the protrusion.

14. The semiconductor package according to claim 9, wherein the second alignment feature is a downward protrusion having the recess, and wherein the first alignment feature is an upward protrusion laterally recessed into a side of the downward protrusion at the recess.

15. The semiconductor package according to claim 14, wherein the downward protrusion has a pair of protrusion segments respectively on opposite sides of the upward protrusion, and wherein the protrusion segments are elongated in parallel and have individual ends that are connected on a single side of the upward protrusion.

16. A semiconductor package, comprising:

a substrate;

a first integrated circuit (IC) chip and a second IC chip overlying the substrate;

a first laser device (LD) chip overlying the substrate, wherein the first LD chip borders the second IC chip and is configured to generate a first laser beam;

a first photonic chip overlying the first and second IC chips and level with the first LD chip;

a third IC chip and a fourth IC chip overlying the first photonic chip; and a second photonic chip overlying the third and fourth IC chips;

wherein the first photonic chip comprises a reflector configured to reflect the first laser beam to generate a first reflected laser beam, which passes to the second photonic chip through the fourth IC chip.

17. The semiconductor package according to claim 16, wherein the second photonic chip comprises a light modulator configured to modulate the first reflected laser beam in response to an electrical signal from the fourth IC chip and to guide the modulated laser beam to the third IC chip.

18. The semiconductor package according to claim 16, further comprising:

a second LD chip overlying the substrate on an opposite side of the substrate as the first LD chip and configured to generate a second laser beam;

a third photonic chip overlapping with the first and second IC chips; and a fourth photonic chip overlapping with the third and fourth IC chips;

wherein the third photonic chip comprises a reflector configured to reflect the second laser beam to generate a second reflected laser beam, which passes to the fourth photonic chip.

19. The semiconductor package according to claim 16, further comprising:

a second LD chip overlying the substrate, wherein the second LD chip borders the second IC chip and is configured to generate a second laser beam, wherein the first photonic chip is configured to modulate the second laser beam in response to an electrical signal from the second IC chip and to guide the modulated laser beam to the first IC chip.

20. The semiconductor package according to claim 16, further comprising:

a second LD chip overlying the substrate, on an opposite side of the substrate as the first LD chip, and configured to generate a second laser beam; and a third photonic chip overlapping with the first and second IC chips, wherein the third photonic chip is configured to modulate the second laser beam in response to an electrical signal from the first IC chip and to guide the modulated laser beam to the second IC chip.

* * * * *